US010653962B2

(12) United States Patent
Gadre et al.

(10) Patent No.: US 10,653,962 B2
(45) Date of Patent: May 19, 2020

(54) GENERATING AND UTILIZING DIGITAL AVATAR DATA FOR ONLINE MARKETPLACES

(71) Applicant: eBay Inc., San Jose, CA (US)

(72) Inventors: Akshay Gadre, North Wales, PA (US); Kerri Breslin, Woodland Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/450,177

(22) Filed: Aug. 1, 2014

(65) Prior Publication Data
US 2016/0035061 A1 Feb. 4, 2016

(51) Int. Cl.
G06K 9/00 (2006.01)
A63F 13/65 (2014.01)
A63F 13/00 (2014.01)
G06T 19/00 (2011.01)
A63F 13/213 (2014.01)
G06Q 30/06 (2012.01)

(52) U.S. Cl.
CPC ............. *A63F 13/65* (2014.09); *A63F 13/00* (2013.01); *A63F 13/213* (2014.09); *G06Q 30/0601* (2013.01); *G06T 19/00* (2013.01); *G06T 2210/16* (2013.01)

(58) Field of Classification Search
None
See application file for complete search history.

(56) References Cited

U.S. PATENT DOCUMENTS

| 5,930,769 A | 7/1999 | Rose |
| 5,937,081 A * | 8/1999 | O'Brill ................. G06T 11/00 345/632 |
| 6,546,309 B1 | 4/2003 | Gazzuolo |

(Continued)

FOREIGN PATENT DOCUMENTS

| WO | WO-2015200617 A1 | 12/2015 |
| WO | WO-2016019033 A2 | 2/2016 |

(Continued)

OTHER PUBLICATIONS

"About Fits.me—Virtual Fitting Room", [Online]. Retrieved from the Internet: <URL: http://fits.me/about/about-fits-me/>, (Accessed May 27, 2014), 5 pgs.

(Continued)

*Primary Examiner* — Soo Jin Park
(74) *Attorney, Agent, or Firm* — Schwegman Lundberg & Woessner, P.A.

(57) ABSTRACT

Disclosed are a system comprising a computer-readable storage medium storing at least one program and a computer-implemented method for digital avatars. An interface module receives a request message to determine measurements of a user. A graphics engine sub-module accesses a first set of data that is indicative of locations in a first image of a user. The locations are points of the user's body in the first image. The graphics engine sub-module accesses a second set of data that is indicative of a first physical-space measurement of the user. A computational sub-module determines, based at least partly on the locations and the first physical-space measurement characteristic, an estimate of a second physical-space measurement of the user.

17 Claims, 26 Drawing Sheets

(56) References Cited

U.S. PATENT DOCUMENTS

| | | | |
|---|---|---|---|
| 6,901,379 B1* | 5/2005 | Balter | G06Q 30/06 434/395 |
| 6,968,075 B1* | 11/2005 | Chang | G06K 9/00214 382/111 |
| 7,062,454 B1 | 6/2006 | Giannini et al. | |
| 7,133,839 B2* | 11/2006 | Inoue | G06Q 10/087 705/27.2 |
| 7,194,327 B2* | 3/2007 | Lam | A41H 3/007 341/87 |
| 7,328,177 B1 | 2/2008 | Lin-Hendel | |
| 7,617,016 B2* | 11/2009 | Wannier | A41H 3/007 700/132 |
| 8,256,664 B1 | 9/2012 | Balfanz et al. | |
| 8,401,914 B1 | 3/2013 | Kim | |
| 8,437,871 B2* | 5/2013 | Ko | D04H 1/4374 700/132 |
| 8,655,053 B1 | 2/2014 | Hansen | |
| 8,660,902 B2* | 2/2014 | Coulter | G06Q 30/02 705/26.1 |
| 8,700,392 B1 | 4/2014 | Hart et al. | |
| 8,818,883 B2* | 8/2014 | Lawrence | G06F 3/011 705/26.1 |
| 8,982,109 B2* | 3/2015 | Vilcovsky | H04N 7/144 345/204 |
| 9,064,184 B2 | 6/2015 | Ruan | |
| 9,412,192 B2 | 8/2016 | Mandel et al. | |
| 9,418,378 B2* | 8/2016 | Staicut | G06Q 30/0643 |
| 9,589,535 B2 | 3/2017 | Poon et al. | |
| 9,607,419 B2* | 3/2017 | Kim | G06T 13/40 |
| 9,724,600 B2 | 8/2017 | Willoughby et al. | |
| 9,799,064 B2 | 10/2017 | Ohnemus et al. | |
| 9,898,742 B2* | 2/2018 | Higgins | G06T 17/00 |
| 10,311,508 B2 | 6/2019 | Reed et al. | |
| 10,332,176 B2* | 6/2019 | Gadre | G06Q 30/0623 |
| 10,529,009 B2* | 1/2020 | Gadre | G06Q 30/0623 |
| 2002/0004763 A1* | 1/2002 | Lam | G06F 1/26 705/26.44 |
| 2002/0045959 A1 | 4/2002 | Van Overveld | |
| 2002/0178061 A1 | 11/2002 | Lam | |
| 2005/0086126 A1 | 4/2005 | Patterson | |
| 2005/0246278 A1 | 11/2005 | Gerber et al. | |
| 2005/0275638 A1 | 12/2005 | Kolmykov-zotov et al. | |
| 2006/0184993 A1 | 8/2006 | Goldthwaite et al. | |
| 2007/0198120 A1 | 8/2007 | Wannier et al. | |
| 2008/0004116 A1 | 1/2008 | Van Luchene et al. | |
| 2008/0262944 A1* | 10/2008 | Wu | G06Q 30/0603 705/27.2 |
| 2009/0018926 A1 | 1/2009 | Buehlman | |
| 2009/0019053 A1 | 1/2009 | Burgess et al. | |
| 2009/0115777 A1 | 5/2009 | Reyers Moreno | |
| 2009/0167719 A1 | 7/2009 | Woolley | |
| 2010/0030578 A1 | 2/2010 | Siddique et al. | |
| 2010/0034462 A1 | 2/2010 | Nevatia et al. | |
| 2010/0191770 A1 | 7/2010 | Cho et al. | |
| 2010/0217685 A1 | 8/2010 | Melcher et al. | |
| 2010/0245555 A1 | 9/2010 | Talluri et al. | |
| 2010/0269054 A1* | 10/2010 | Goldberg | G06Q 30/0603 715/757 |
| 2010/0306082 A1 | 12/2010 | Wolper et al. | |
| 2011/0022965 A1* | 1/2011 | Lawrence | G06F 3/011 715/747 |
| 2011/0078055 A1 | 3/2011 | Faribault et al. | |
| 2011/0246329 A1 | 10/2011 | Geisner et al. | |
| 2012/0022978 A1 | 1/2012 | Manea et al. | |
| 2012/0086783 A1 | 4/2012 | Sareen et al. | |
| 2012/0137259 A1 | 5/2012 | Campbell et al. | |
| 2012/0162218 A1 | 6/2012 | Kim et al. | |
| 2012/0239513 A1 | 9/2012 | Oliver et al. | |
| 2012/0257035 A1 | 10/2012 | Larsen | |
| 2012/0264510 A1 | 10/2012 | Wigdor et al. | |
| 2012/0299912 A1 | 11/2012 | Kapur et al. | |
| 2013/0030915 A1 | 1/2013 | Statler et al. | |
| 2013/0110679 A1 | 5/2013 | Spadafora et al. | |
| 2013/0166407 A1 | 6/2013 | Sullaj | |
| 2013/0179288 A1* | 7/2013 | Moses | G06Q 10/00 705/26.1 |
| 2013/0185679 A1 | 7/2013 | Fretwell et al. | |
| 2013/0215116 A1 | 8/2013 | Siddique et al. | |
| 2013/0254066 A1 | 9/2013 | Amacker et al. | |
| 2013/0304578 A1 | 11/2013 | Kannan et al. | |
| 2013/0315475 A1* | 11/2013 | Song | G06K 9/00369 382/154 |
| 2014/0035913 A1* | 2/2014 | Higgins | G06T 17/00 345/420 |
| 2014/0040041 A1 | 2/2014 | Ohnemus et al. | |
| 2014/0052567 A1 | 2/2014 | Bhardwaj et al. | |
| 2014/0115059 A1 | 4/2014 | Van Wie et al. | |
| 2014/0132635 A1 | 5/2014 | Murdoch et al. | |
| 2014/0168217 A1* | 6/2014 | Kim | G06T 13/40 345/420 |
| 2014/0176565 A1 | 6/2014 | Adeyoola et al. | |
| 2014/0180873 A1 | 6/2014 | Rijhwani | |
| 2014/0225978 A1 | 8/2014 | Saban et al. | |
| 2014/0279192 A1 | 9/2014 | Selby | |
| 2014/0285522 A1 | 9/2014 | Kim et al. | |
| 2014/0330670 A1 | 11/2014 | Ainsworth, III et al. | |
| 2014/0358738 A1 | 12/2014 | Ohnemus et al. | |
| 2014/0368499 A1 | 12/2014 | Kaur | |
| 2015/0058083 A1 | 2/2015 | Herrero | |
| 2015/0154453 A1* | 6/2015 | Wilf | G06K 9/00711 382/103 |
| 2015/0154691 A1 | 6/2015 | Curry et al. | |
| 2015/0279098 A1* | 10/2015 | Kim | G06T 17/20 345/420 |
| 2015/0324103 A1* | 11/2015 | Tepmongkol | G06F 3/0484 715/757 |
| 2015/0379623 A1* | 12/2015 | Gadre | G06Q 50/01 705/27.2 |
| 2016/0042402 A1 | 2/2016 | Gadre et al. | |
| 2016/0063588 A1 | 3/2016 | Gadre et al. | |
| 2016/0063613 A1 | 3/2016 | Zhao et al. | |
| 2016/0071321 A1* | 3/2016 | Nishiyama | G06T 19/00 345/632 |
| 2016/0088284 A1* | 3/2016 | Sareen | G06N 3/006 348/47 |
| 2016/0110595 A1* | 4/2016 | Wang | G06K 9/00375 705/27.2 |
| 2018/0137515 A1 | 5/2018 | Higgins et al. | |
| 2019/0266654 A1 | 8/2019 | Gadre et al. | |

FOREIGN PATENT DOCUMENTS

| | | |
|---|---|---|
| WO | WO-2016019033 A3 | 2/2016 |
| WO | WO-2016022937 A1 | 2/2016 |

OTHER PUBLICATIONS

"Fitnect", Fitnect Interactive, [Online]. Retrieved from the Internet: <URL: http://www.fitnect.hu/>, (Accessed May 27, 2014), 2 pgs.

"Online clothes-shopping: is an avatar the answer?", The Guardian, [Online]. Retrieved from the Internet: <URL: http://www.theguardian.com/fashion/shortcuts/2012/feb/29/online-clothes-shopping-avatar>, (Accessed May 27, 2014), 4 pgs.

"Virtual Dressing Room", Wikipedia, the free encyclopedia, [Online]. Retrieved from the Internet: <URL: http://en.wikipedia.org/wiki/Virtual_dressing_room>, (Accessed May 27, 2014), 6 pgs.

Pierrepont, Nathalie, "Amongst Promises of a Perfect Fit, What Fits and What Doesn't?", Business of Fashion, [Online]. Retrieved from the Internet: <URL: http://www.businessoffashion.com/2012/12/fashion-2-0-amongst-promises-of-a-perfect-fit-what-fits-and-what-doesn't.html>, (Dec. 19, 2012), 5 pgs.

Wulfhart, Neil, "The Future of Shopping: An Avatar Lets You Find the Perfect Fit", The Slate Group, [Online]. Retrieved from the Internet: <URL: http://www.slate.com/blogs/future_tense/2012/07/19/me_ality_body_scanner_creates_an_avatar_to_make_clothes_shopping_a_breeze_.html>, (Jul. 19, 2012), 3 pgs.

"U.S. Appl. No. 14/315,230, Non-Final Office Action dated Dec. 30, 2016", 23 pgs.

(56) References Cited

OTHER PUBLICATIONS

"International Application Serial No. PCT/US2015/037663, International Preliminary Report on Patentability dated Jan. 5, 2017", 10 pgs.
"International Application Serial No. PCT/US2015/037663, International Search Report dated Sep. 14, 2015", 2 pgs.
"International Application Serial No. PCT/US2015/037663, Written Opinion dated Sep. 14, 2015", 8 pgs.
"International Application Serial No. PCT/US2015/042683, International Search Report dated Mar. 29, 2016", 2 pgs.
"International Application Serial No. PCT/US2015/042683, Written Opinion dated Mar. 29, 2016", 5 pgs.
"International Application Serial No. PCT/US2015/044249, International Search Report dated Oct. 23, 2015", 2 pgs.
"International Application Serial No. PCT/US2015/044249, Written Opinion dated Oct. 23, 2015", 5 pgs.
"U.S. Appl. No. 14/315,230, Response filed May 30, 2017 to Non-Final Office Action dated Dec. 30, 2016", 14 pgs.
"U.S. Appl. No. 14/472,125, Non Final Office Action dated May 31, 2017", 17 pgs.
"International Application Serial No. PCT/US2015/042683, International Preliminary Report on Patentability dated Feb. 16, 2017", 7 pgs.
"International Application Serial No. PCT/US2015/044249, International Preliminary Report on Patentability dated Feb. 16, 2017", 7 pgs.
"HowStuffWorks: Electronics", [Online]. Retrieved from the Internet: URL: http: electronics.howstuffworks.com , (Accessed Feb. 14, 2013), 2 pgs.
"A Brief Overview of Gesture Recognition", This page is maintained by Charles Cohen and sponsored by Cybernet Systems Corporation,, [Online]. Retrieved from the Internet: URL: http: homepages.inf.ed.ac.uk rbf CVonline LOCAL_COPIES COHEN gesture_o, (Accessed Feb. 14, 2013), 17 pgs.
"Skyrim Kinect—YouTube", [Online]. Retrieved from the Internet: URL: http: www.youtube.com watch?v=Z83wzJwrBK0, (Accessed Feb. 14, 2012), 2 pgs.
"GestureTek", GestureTeck Inc. is Purchased Back by Co-Founder Vincent John Vincent, [Online]. Retrieved from the Internet: URL: http: www.gesturetek.com , (Accessed Feb. 15, 2013), 1 pg.
"Kinect—Wikipedia, the free encyclopedia", (Accessed Feb. 15, 2013), 16 pgs.
"3D Scanning Services—Konica Minolta 3D Scanning Labs", [Online]. Retrieved from the Internet: URL: http: sensing.konicaminolta. us search-by-services 3d-scanning-services , (Accessed Feb. 15, 2013), 2 pgs.
"My Style Rules—The way you were meant to dress", [Online]. Retrieved from the Internet: URL: http: mystylerules.com , (Accessed Feb. 15, 2013), 1 pg.
"Kinect Body Scanning—Body Scanning Reinvented", [Online]. Retrieved from the Internet: URL: http: www.styku.com business benefits bodyscanning , (Accessed Feb. 15, 2013), 2 pgs.
"U.S. Appl. No. 13/725,209, Response filed Apr. 17, 2014 to Non Final Office Action dated Jan. 17, 2014", 15 pgs.
"U.S. Appl. No. 13/725,209, Response filed Sep. 8, 2014 to Final Office Action dated May 8, 2014", 10 pgs.
"U.S. Appl. No. 13/725,209, Final Office Action dated Apr. 8, 2015", 10 pgs.
"U.S. Appl. No. 13/679,498, Response filed Apr. 30, 2015 to Non Final Office Action dated Jan. 30, 2015", 16 pgs.
"U.S. Appl. No. 13/725,209, Response filed Jul. 8, 2015 to Final Office Action dated Apr. 18, 2015", 19 pgs.
"U.S. Appl. No. 13/679,498, Response filed Aug. 18, 2015 to Non Final Office Action dated Jun. 18, 2015", 12 pgs.
"U.S. Appl. No. 13/725,209, Non Final Office Action dated Oct. 6, 2015", 12 pgs.
"U.S. Appl. No. 13/679,498, Response filed Dec. 4, 2015 to Non Final Office Action dated Sep. 4, 2015", 13 pgs.
"U.S. Appl. No. 13/725,209, Response filed Jan. 6, 2016 to Non Final Office Action dated Oct. 6, 2015", 17 pgs.
"U.S. Appl. No. 13/725,209, Final Office Action dated Feb. 26, 2016", 12 pgs.
"U.S. Appl. No. 13/679,498, Response filed May 23, 2016 to Final Office Action dated Jan. 22, 2016", 14 pgs.
"U.S. Appl. No. 13/725,209, Response filed May 26, 2016 to Final Office Action dated Feb. 26, 2016", 10 pgs.
"U.S. Appl. No. 13/725,209, Non Final Office Action dated Sep. 9, 2016", 11 pgs.
"U.S. Appl. No. 13/679,498, Response filed Sep. 30, 2016 to Non Final Office Action dated Jun. 30, 2016", 15 pgs.
"U.S. Appl. No. 14/474,116, Non Final Office Action dated Jul. 25, 2017", 18 pgs.
"U.S. Appl. No. 13/679,498, Response filed Apr. 4, 2017 to Final Office Action dated Nov. 4, 2016", 13 pgs.
"U.S. Appl. No. 14/474,116, Response filed Apr. 25, 2017 to Non Final Office Action dated Jan. 25, 2017", 10 pgs.
"U.S. Appl. No. 14/474,116, Final Office Action dated Jul. 20, 2017", 12 pgs.
"U.S. Appl. No. 13/679,498, Response filed Aug. 31, 2017 to Non Final Office Action dated May 15, 2017", 12 pgs.
"U.S. Appl. No. 14/472,125, Response filed Aug. 31, 2017 to Non Final Office Action dated May 31, 2017", 14 pgs.
"U.S. Appl. No. 14/474,116, Respone filed Sep. 28, 2017 to Final Office Action dated Jul. 20, 2017", 11 pgs.
"U.S. Appl. No. 13/679,498, Notice of Allowance dated Oct. 5, 2017", 12 pgs.
"U.S. Appl. No. 14/472,125, Final Office Action dated Oct. 13, 2017", 19 pgs.
"U.S. Appl. No. 14/474,116, Non Final Office Action dated Nov. 1, 2017", 12 pgs.
"U.S. Appl. No. 13/679,498, Corrected Notice of Allowance dated Jan. 8, 2018", 12 pgs.
"U.S. Appl. No. 14/474,116, Response filed Feb. 1, 2018 to Non Final Office Action dated Nov. 1, 2017", 11 pgs.
"U.S. Appl. No. 14/315,230, Response filed Feb. 12, 2018 to Final Office Action dated Sep. 14, 2017", 13 pgs.
"U.S. Appl. No. 14/472,125, Response filed Feb. 13, 2018 to Final Office Action dated Oct. 13, 2017", 10 pgs.
"U.S. Appl. No. 14/454,619, Response filed Jun. 4, 2018 to Non Final Office Action dated Jan. 3, 2018", 17 pgs.
""Non-Final Office Action received for U.S. Appl. No. 14/474,116 dated Mar. 28, 2018"", (Mar. 28, 2018), 12 pages.
"Augmented Reality Virtual Fitting Room", Retrieved from the Internet URL: https: www.youtube.com watch?v=F-3qC4q8toU, (Feb. 12, 2012), 2 pages.
"Online Fitting Room Shopping Augmented Reality", Retrieved from the Internet URL: https: www.youtube.com watch?v= OHAyOtluqtY, (Apr. 29, 2011), 2 pages.
"Final Office Action received for U.S. Appl. No. 14/474,116, dated Jul. 27, 2018", (Jul. 27, 2018), 11 pages.
"Response to Final Office Action filed on Sep. 28, 2018, for U.S. Appl. No. 14/474,116, dated Jul. 27, 2018", (Sep. 28, 2018), 15 pages.
"Using a Clinometer to Measure Height", http: www.instructables. com id Using-a-clinometer-to-measure-height , (Apr. 23, 2013), 16 pages.
Cordier, Frederic, "Made-to-Measure Technologies for Online Clothing Store", [Online]. Retrieved from the Internet: URL: http: www.miralab.ch repository papers 25.pdf, (Accessed Feb. 15, 2013), 12 pgs.
Crawford, Stephanie, "HowStuffWorks: How Microsoft Kinect Works", [Online]. Retrieved from the Internet: URL: http: electronics. howstuffworks.com microsoft-kinect.htm, (Accessed Feb. 14, 2013), 2 pgs.
Higgins, Krystal, "Designing Kinect-Based Experiences", [Online]. Retrieved from the Internet: URL: http: www.kryshiggins.com thoughts-on-designing-kinect-based-experiences , (Apr. 4, 2011), 12 pgs.
Saldanha, Carlos, "System and Method for Displaying Selected Garments on a Computer-Simulated Mannequin", [Online]. Retrieved from the Internet: URL: http: www.faqs.org patents app 20100302275, (Dec. 2, 2010), 10 pgs.

(56) References Cited

OTHER PUBLICATIONS

Slawski, Bill, "Would You Give a Search Engine a 3D Model of Your Body?—SEO by the Sea", [Online]. Retrieved from the Internet: URL: http: www.seobythesea.com 2009 01 would-you-give-a-search-engine-a-3d-model-of-your-body , (Jan. 16, 2009), 11 pgs.

Response to Final Office Action filed on Jan. 29, 2019 for U.S. Appl. No. 14/454,619, dated Nov. 2, 2018, 18 pages.

Notice of Allowance received for U.S. Appl. No. 14/472,125, dated Feb. 7, 2019, 9 pages.

Non-Final Office action received for U.S. Appl. No. 15/868,167, dated Mar. 21, 2019, 28 pages.

Gesturetek, "Gesture Recognition & Computer Vision Control Technology & Motion Sensing Systems for Presentation & Entertainment", Retrieved from the Internet URL: <http://www.gesturetek.com/>, Accessed on Apr. 26, 2018, 1 page.

Kinect, "Kinect-Virtual Dressing Room", X-Tech Creative Studio, Retrieved from the Internet URL: <http://x-tech.am/kinect-virtual-dressing-room/>, 2014, 5 pages.

"Trying on Shoes Made Easy at the Adidas Shop in Paris", [Online]. Retrieved from the Internet: URL: http: www.geeksugar.com Trying-Shoes-Made-Easy-Adidas-Shop-Paris-159420, (Mar. 6, 2007), 5 pgs.

"The Future of Shopping Is Here", [Online]. Retrieved from the Internet: URL: http: www.simplyzesty.com advertising-and-marketing the-future-of-shopping-is-here-video , (Jun. 12, 2012), 9 pgs.

"Get Your Converse Shoes on Virtually Using Augmented Reality", 2012 Digital Analog an Online Publication for Creativity Code, [Online]. Retrieved from the Internet: URL: http: digitalanalog.in 2011 03 14 get-your-converse-shoes-on-virtually-using-augmented-reality , (Mar. 14, 2011), 7 pgs.

"Gesture Design Blog: Gestural Intent", [Online]. Retrieved from the Internet: URL: http: gesturedesignblog.com ? page_id=63, (Mar. 15, 2010), 4 pgs.

"Top 10 Best Kinect Hacks", [Online]. Retrieved from the Internet: URL: http: www.kinecthacks.com top-10-best-kinect-hacks, (Accessed Feb. 15, 2013), 6 pgs.

"Gesture Technology Virtual Dressing rooms!! Punitatannas Blog", [Online]. Retrieved from the Internet: URL: http: punitatanna.wordpress.com 2010 08 31 gesture-technology-virtual-dressing-rooms , (Aug. 31, 2010), 5 pgs.

"Gesture recognition—Wikipedia, the free encyclopedia", [Online]. Retrieved from the Internet: URL: http: en.wikipedia.org wiki Gesture_recognition, (Accessed Feb. 15, 2013), 6 pgs.

"Kinect_calibration technical—ROS Wiki", [Online]. Retrieved from the Internet: URL: http: www.ros.org wiki kinect_calibration technical, (Accessed Feb. 15, 2013), 8 pgs.

"Metail: translating cutting edge research into commercial success", [Online]. Retrieved from the Internet: URL: http: www.eng.cam.ac.uk new stories 2012 Me_tail , (Mar. 15, 2012), 5 pgs.

"SketchUp—How to Information | eHow.com", [Online]. Retrieved from the Internet: URL: http: www.ehow.com sketchup , (Accessed Feb. 15, 2013), 27 pgs.

"Gestures control true 3D display,", [Online]. Retrieved from the Internet: URL: Info collage around internet: Gestures control 3D display, (Dec. 29, 2004), 2 pgs.

"U.S. Appl. No. 13/725,209, Non Final Office Action dated Jan. 17, 2014", 8 pgs.

"U.S. Appl. No. 13/725,209, Final Office Action dated May 8, 2014", 7 pgs.

"U.S. Appl. No. 13/725,209, Non Final Office Action dated Oct. 20, 2014", 8 pgs.

"U.S. Appl. No. 14/474,116, Preliminary Amendment filed Dec. 1, 2014", 7 pgs.

"U.S. Appl. No. 13/679,498, Non Final Office Action dated Jan. 30, 2015", 31 pgs.

"U.S. Appl. No. 13/725,209, Response filed Mar. 20, 2015 to Non Final Office Action dated Oct. 20, 2015", 23 pgs.

"U.S. Appl. No. 13/679,498, Final Office Action dated Jun. 18, 2015", 37 pgs.

"U.S. Appl. No. 13/679,498, Non Final Office Action dated Sep. 4, 2015", 30 pgs.

"U.S. Appl. No. 13/679,498, Final Office Action dated Jan. 22, 2016", 38 pgs.

"U.S. Appl. No. 13/679,498, Examiner Interview Summary dated May 2, 2016", 3 pgs.

"U.S. Appl. No. 13/679,498, Non Final Office Action dated Jun. 30, 2016", 38 pgs.

"U.S. Appl. No. 13/679,498, Final Office Action dated Nov. 4, 2016", 37 pgs.

"U.S. Appl. No. 13/679,498, Non Final Office Action dated May 15, 2017", 40 pgs.

"U.S. Appl. No. 13/679,498, Examiner Interview Summary dated Aug. 21, 2017", 3 pgs.

"U.S. Appl. No. 14/315,230, Final Office Action dated Sep. 14, 2017", 23 pgs.

"U.S. Appl. No. 14/474,116, Examiner Interview Summary dated Sep. 19, 2017", 3 pgs.

"U.S. Appl. No. 14/454,619, Non Final Office Action dated Jan. 3, 2018", 20 pgs.

"U.S. Appl. No. 15/868,167, Preliminary Amendment filed Jan. 18, 2018", 9 pgs.

"U.S. Appl. No. 14/474,116, Examiner Interview Summary dated Feb. 1, 2018", 3 pgs.

"U.S. Appl. No. 14/472,125, Non Final Office Action dated Jul. 12, 2018", 21 pgs.

"U.S. Appl. No. 14/315,230, Non Final Office Action dated Sep. 18, 2018", 30 pgs.

"Applicant-Initiated Interview Summary received for U.S. Appl. No. 14/474,116, dated Aug. 14, 2018", (Aug. 14, 2018), 3 pages.

"Applicant Initiated Interview Summary Received for U.S. Appl. No. 14/474,116 dated Apr. 27, 2018", (Apr. 27, 2018), 3 pages.

""Response to Non-Final Office Action filed on Jun. 27, 2018, for U.S. Appl. No. 14/474,116 , dated Mar. 28, 2018"", (Jun. 27, 2018), 27 pages.

Andrew, "Robust High-Resolution Cloth Using Parallelism, History-Based Collisions and Accurate Friction", IEEE Transactions on Visualization and Computer Graphics, vol. 15, No. 2, 2009, (Mar.-Apr. 2009), pp. 339-350.

Baudel, Thomas, "CHARADE: Remote Control of Objects using Free-Hand Gestures", [Online]. Retrieved from the Internet: URL: http: thomas.baudel.name Morphologie cacm.html, (Accessed Feb. 15, 2013), 9 pgs.

Billinghurst, Mark, "Chapter 14: Gesture Based Interaction", [Online]. Retrieved from the Internet: URL: http: www.billbuxton.com input14.Gesture.pdf , (Aug. 24, 2011), 35 pgs.

Daly, Erica, "This is the Year of the Virtual Fit Assistant | Techli", [Online]. Retrieved from the Internet: URL: http: techli.com 2011 11 year-of-virtual-fit-assistant , (Nov. 16, 2011), 3 pgs.

Horsey, Julian, "Augmented Reality App Allows You to Try Clothes Before You Buy in a Virtual Dressing Room video", [Online]. Retrieved from the Internet: http: www.geeky-gadgets.com augmented-reality-app-allows-you-to-try-clothes-before-you-buy-in-a-virtual-dressing-room, (Sep. 29, 2010), 9 pgs.

Hunter, Seth, "WordPlay: A Table-Top Interface for Collaborative Branstorming and Decision Making", Proceedings of IEEE Tabletops and Interactive Surfaces, 2008, [Online]. Retrieved from the Internet: URL: http: fluid. media.mit.edu sites default files WordPlayFinalIEEE_AffiliationIncluded.pdf, (2008), 4 pgs.

Kimbrel, Heather, "How to Create a Virtual Model of My Body Measurements | eHow.com", [Online]. Retrieved from the Internet: URL: http: www.ehow.com how_6817795_create-virtual-model-body-measurements.html, (Accessed Feb. 15, 2013), 3 pgs.

Li, Rong, "Research of Interactive 3D Virtual Fitting Room on Web Environment", ISCID Proceedings of the 2011 Fourth International Symposium on Computational Intelligence and Design—vol. 01, [Online]. Retrieved from the Internet: URL: http: ieeexplore.ieee.org xpl articleDetails.jsp? reload=trueandarnumber=6079627andcontent-Type=Conference+Publications, (2011), 32-35.

(56) References Cited

OTHER PUBLICATIONS

Maccormick, John, "How does the Kinect work?", [Online]. Retrieved from the Internet: URL: http: users.dickinson.edu ~jmac selected-talks kinect.pdf, (Accessed Feb. 15, 2013), 52 pgs.

Newitz, Annalee, "10 physical gestures that have been patented", (Jun. 6, 2011), 5 pgs.

Nickinson, Phil, "Front-facing cameras mean hand-free gesture commands for Android", [Online]. Retrieved from the Internet: URL: http: www.androidcentral.com front-facing-cameras-mean-hands-free-gesture-co . . . , (Accessed Feb. 14, 2013), 6 pgs.

Rosenfeld, Azriel, "Picture Processing by Computer", Academic Press, (1969), 28 pgs.

Sterling, Bruce, "Beyond the Beyond—Augmented Reality: Kinect fitting-room for TopShop, Moscow", [Online]. Retrieved from the Internet: URL: http: www.wired.com beyond_the_beyond 2011 05 augmented-reality-kinect-fitting-room-for-topshop-moscow , (May 10, 2011), 2 pgs.

Stevens, Tim, "Apple patent application opens the door to free-form acoustic gesture commands", [Online]. Retrieved from the Internet: URL: http: www.engadget.com 2011 02 21 apple-patent-application-opens-the-door-to . . . , (Feb. 21, 2011), 3 pgs.

Woolley, Richard, "Gesture Commands Performed in Proximity but Without Make Physical Contact with a Touchpad", [Online]. Retrieved from the Internet: URL: http: www.faqs.org patents app 20090167719, (Jul. 2, 2009), 4 pgs.

"U.S. Appl. No. 14/454,619, Final Office Action dated Nov. 2, 2018", 25 pgs.

"U.S. Appl. No. 14/472,125, Response filed Nov. 20, 2018 to Non Final Office Action dated Jul. 12, 2018", 15 pgs.

"U.S. Appl. No. 14/315,230, Response filed Dec. 18, 2018 to Non Final Office Action dated Sep. 18, 2018", 17 pgs.

Applicant Initiated Interview Summary Received for U.S. Appl. No. 15/868,167, dated Apr. 18, 2019, 4 pages.

Final Office Action received for U.S. Appl. No. 14/315,230 , dated Apr. 16, 2019, 30 pages.

Non-Final Office action received for U.S. Appl. No. 14/454,619, dated Apr. 15, 2019, 31 pages.

Applicant—Initiated Interview Summary received for U.S. Appl. No. 14/315,230, dated Jun. 14, 2019, 3 pages.

Notice of Allowance received for U.S. Appl. No. 14/315,230, dated Aug. 21, 2019, 23 pages.

Response to Final Office Action filed on Jul. 10, 2019, for U.S. Appl. No. 14/315,230, dated Apr. 16, 2019, 16 pages.

Response to Non-Final Office Action filed on Aug. 14, 2019, for U.S. Appl. No. 14/454,619, dated Apr. 15, 2019, 17 pages.

Response to Non-Final Office Action filed on Jun. 13, 2019, for U.S. Appl. No. 15/868,167, dated Mar. 21, 2019, 20 pages.

Yu, et al., "On Generating Realistic Avatars: Dress in your Own Style", Multimedia Tools and Applications, © Springer Science + Business Media, LLC 2011, Mar. 16, 2011, pp. 973-990.

Final Office Action Received for U.S. Appl. No. 14/454,619, dated Nov. 27, 2019, 21 pages.

Applicant Initiated Interview Summary Received for U.S. Appl. No. 15/868,167, dated Dec. 9, 2019, 3 pages.

Final Office Action Received for U.S. Appl. No. 15/868,167, dated Oct. 15, 2019, 34 pages.

Response to Final Office Action filed on Dec. 12, 2019 for U.S. Appl. No. 15/868,167, dated Oct. 15, 2019, 14 pages.

Non-Final Office Action received for U.S. Appl. No. 15/868,167, dated Jan. 10, 2020, 37 pages.

Preliminary Amendment filed on Jan. 23, 2020, for U.S. Appl. No. 16/704,294, 7 pages.

Advisory Action Received for U.S. Appl. No. 14/454,619, dated Feb. 13, 2020, 3 pages.

Response to Final Office Action filed on Jan. 27, 2020 for U.S. Appl. No. 14/454,619, dated Nov. 27, 2019, 12 pages.

\* cited by examiner

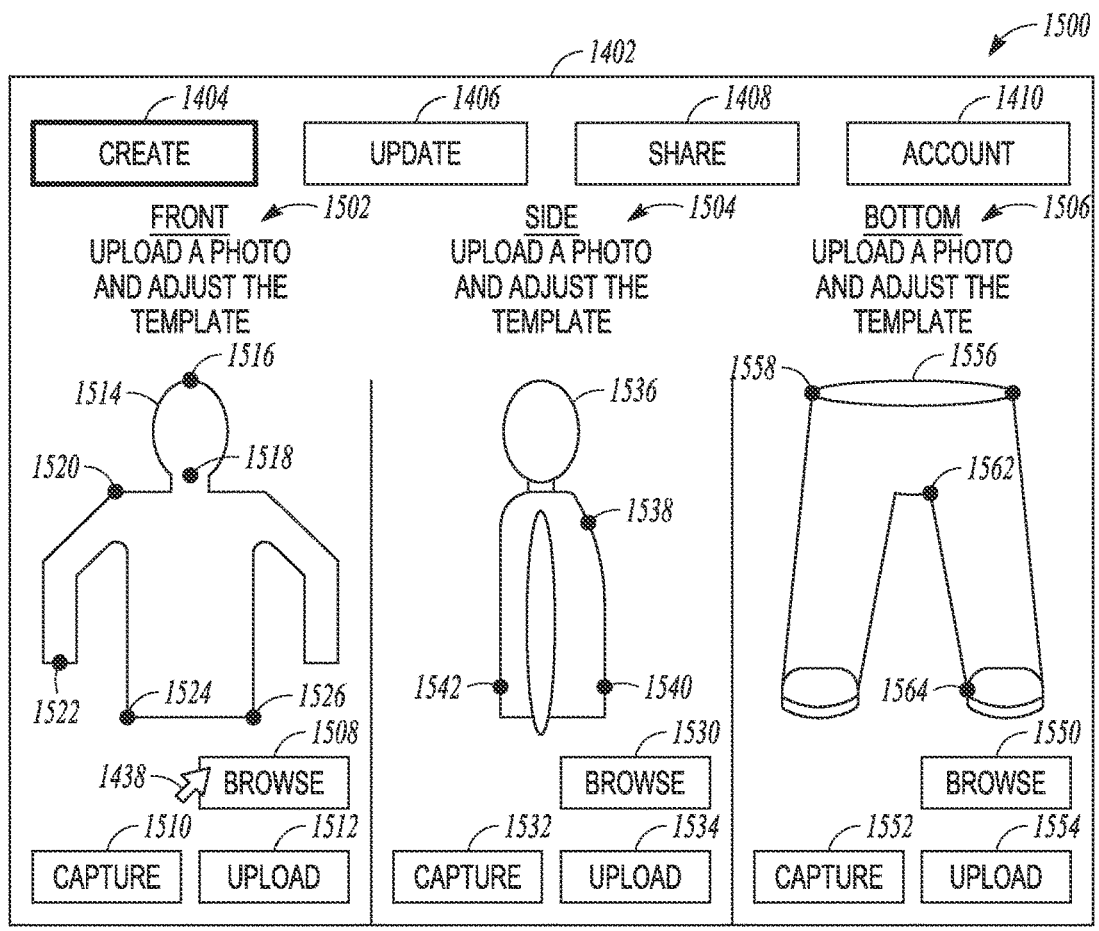

GENERATING AND UTILIZING DIGITAL AVATAR DATA FOR ONLINE MARKETPLACES

TECHNICAL FIELD

Example embodiments of the present application generally relate to processing data and, more particularly in one embodiment, to a system and method for facilitating virtual representations of users and products.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world marketplaces may have websites that allow users to view inventory or interact with the real-world marketplace. Any of these online browsing environments may serve online advertisements to users during the course of their pursuits of online activities.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

FIGS. 14-20 are interface diagrams illustrating example user interfaces with multiple display elements delivered to a client device for managing user accounts, according to example embodiments.

DETAILED DESCRIPTION

Figure 1:
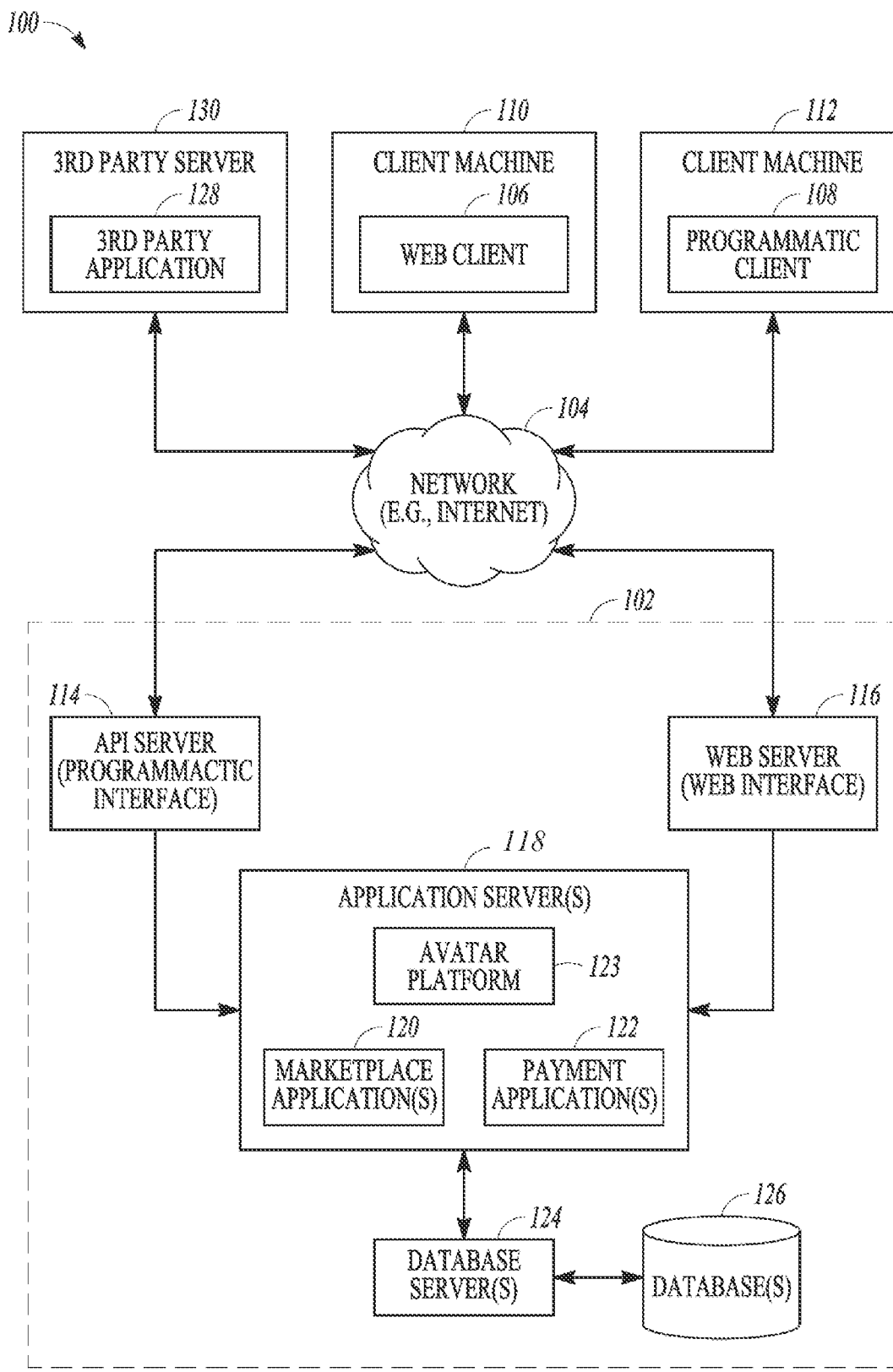
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems for providing data to display digital avatars to be displayed on devices are described. In the following description, for purposes of explanation, numerous specific details are set forth in order to provide a thorough understanding of example embodiments. It will be evident, however, to one skilled in the art that the present inventive subject matter may be practiced without these specific details.

One of the biggest concerns for e-commerce sellers is how to provide a shopping experience that is similar to shopping at a brick-and-mortar store. Seeing the clothing, touching the products, hearing the store music, and seeing how one looks in the apparel may all contribute positively to the user's shopping experience. There can also be a social aspect to shopping at a brick-and-mortar retail store. Groups of people may shop together, thereby facilitating providing recommendations of outfits, feedback on how items look on their friends, and any number of social interactions.

In contrast, online marketplaces of e-commerce shopping may display an image of the item on a professional model. It may be difficult for users to visualize how that item may look on the user instead of the model. Accordingly, the user may not be confident in buying the item, and thus the online marketplace may lose a potential sale. Moreover, online marketplaces may not effectively facilitate social interactions between users. That is, e-commerce shopping may provide a more solitary experience than shopping at a brick-and-mortar store. E-commerce shopping, therefore, may not include some of the fun, social aspects that may be enjoyed by shopping at brick-and-mortar stores.

One result of online marketplaces not being able to match these in-store experiences is that the online marketplaces may not capture some sale opportunities. Then, the problem that arises is how to provide an e-commerce shopping experience that has some of the features of shopping at a brick and mortar store to improve the user experience and to increase sales.

In an example embodiment, a digital avatar system provides data for displaying a digital avatar of the user. For example, online marketplaces, such as websites or mobile applications, may support features that facilitate configuring a digital avatar to be shown as wearing the items of the online marketplace. In operation, a user shopping on the online marketplace may select one or more products to be displayed on a digital avatar of the user. Moreover, the digital avatar may be generated based on the measurement data of the user and the size of the selected product. In this way, the user may see a digital representation of the user wearing the product so that the user can evaluate how the product looks on the user. As such, the user may be more confident in making purchases.

Additionally or alternatively, the digital avatar system may facilitate automatic or semi-automatic detection of user measurements for their digital avatar. In an example embodiment, the digital avatar system may receive one or more digital images of the user as input in combination with a request message for determining measurement data of the user. For example, the user may be prompted to upload one or more images (including still images and/or video images). In response to receiving the images, the digital avatar system may process the images to determine user measurements. In one aspect, the user measurements may be usable to generate model data for rendering a digital avatar of the user. Examples of user measurements may include body measurements and/or clothing sizes.

Additionally or alternatively, the data for generating the digital avatars may be shared between users, for example, by using a social network. In one aspect, a user may dress the digital avatar of a friend. Moreover, the user may share the "dressed up" digital avatar of the friend with the friend as a way to recommend an item, such as a shirt, a pair of jeans, a hat, or the like. Additionally or alternatively, a user may share his or her own digital avatar configured with one or more selected products in order to obtain comments from friends and/or contacts.

By allowing users to share digital avatar data with other users, a digital avatar system may facilitate "e-stylists" services. For example, a user ("customer") may hire a professional e-stylists who has access to the digital avatar data of the customer. The e-stylist may send to the customer one or more versions of the user's digital avatar. Each version may correspond to a different look, such as a different outfit. The professional e-stylists may receive compensation for products purchased based on the e-stylist's recommendations. It will be appreciated that friends of the user may serve as an e-stylist, with or without compensation. Moreover, online marketplaces may provide paid or free e-stylists services to recommend targeted products to the customers.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines/devices 110 and 112. The client machine 110 may also be referred to as a "user machine" or "user device."

An Application Program Interface (API) server 114 and a web server 116 are coupled to, and provide programmatic and web interfaces respectively to, one or more application servers 118. The application servers 118 host one or more marketplace applications 120, payment applications 122, and the avatar platform 123. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the marketplace applications 120.

Further, while the system 100 shown in FIG. 1 employs a client-server architecture, the present inventive subject matter is of course not limited to such an architecture, and could equally well find application in a distributed, or peer-to-peer, architecture system, for example. The various marketplace and payment applications 120, 122 could also be implemented as standalone software programs, which do not necessarily have networking capabilities.

In addition, while the various marketplace and payment applications 120, 122 have been described above as having separate functionalities, in alternative embodiments these functionalities may be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Example Mobile Device

Figure 2:
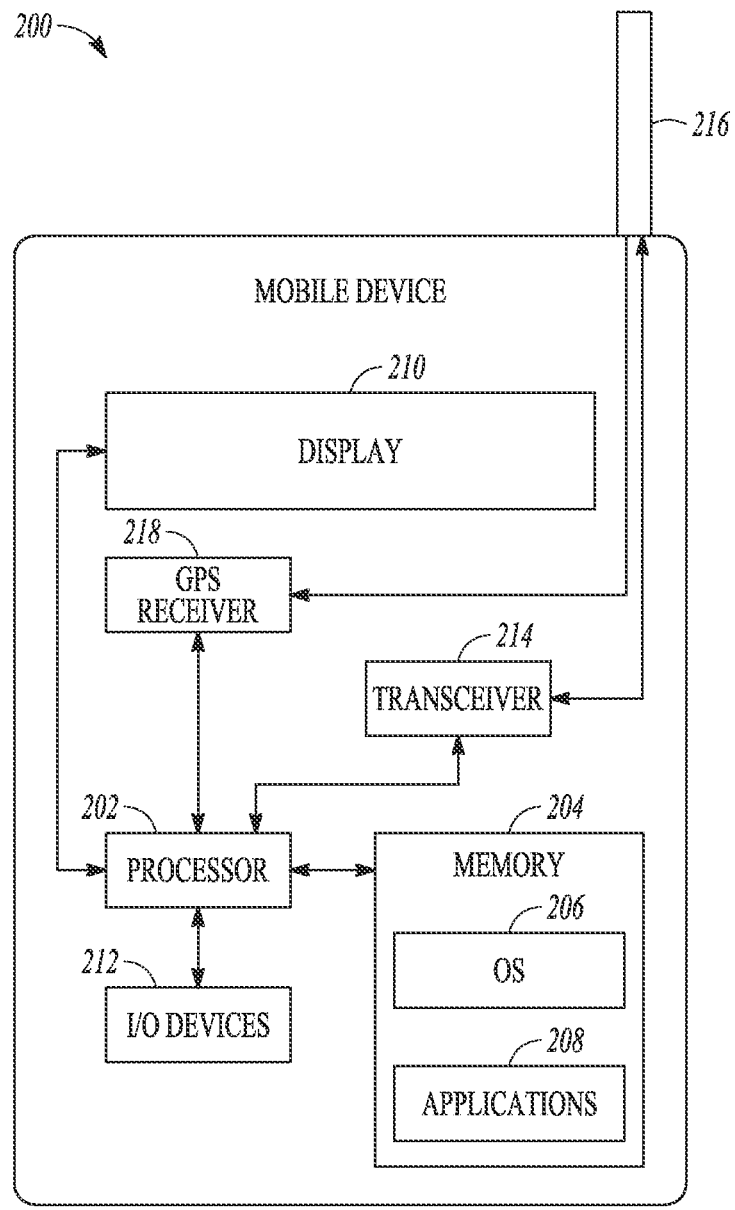
FIG. 2 is a block diagram illustrating a mobile device, according to an example embodiment.

FIG. 2 is a block diagram illustrating a mobile device 200, according to an example embodiment. The mobile device 200 may include a processor 202. The processor 202 may be any of a variety of different types of commercially available processors suitable for mobile devices (for example, an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor 202. The memory 204 may be adapted to store an operating system (OS) 206, as well as application programs 208, such as a mobile location enabled application that may provide Location Based Services (LBSs) to a user. The processor 202 may be coupled, either directly or via appropriate intermediary hardware, to a display 210 and to one or more input/output (I/O) devices 212, such as a keypad, a touch panel sensor, a microphone, and the like. Similarly, in some embodiments, the processor 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Example Digital Avatar Networks and Systems

Figure 3:
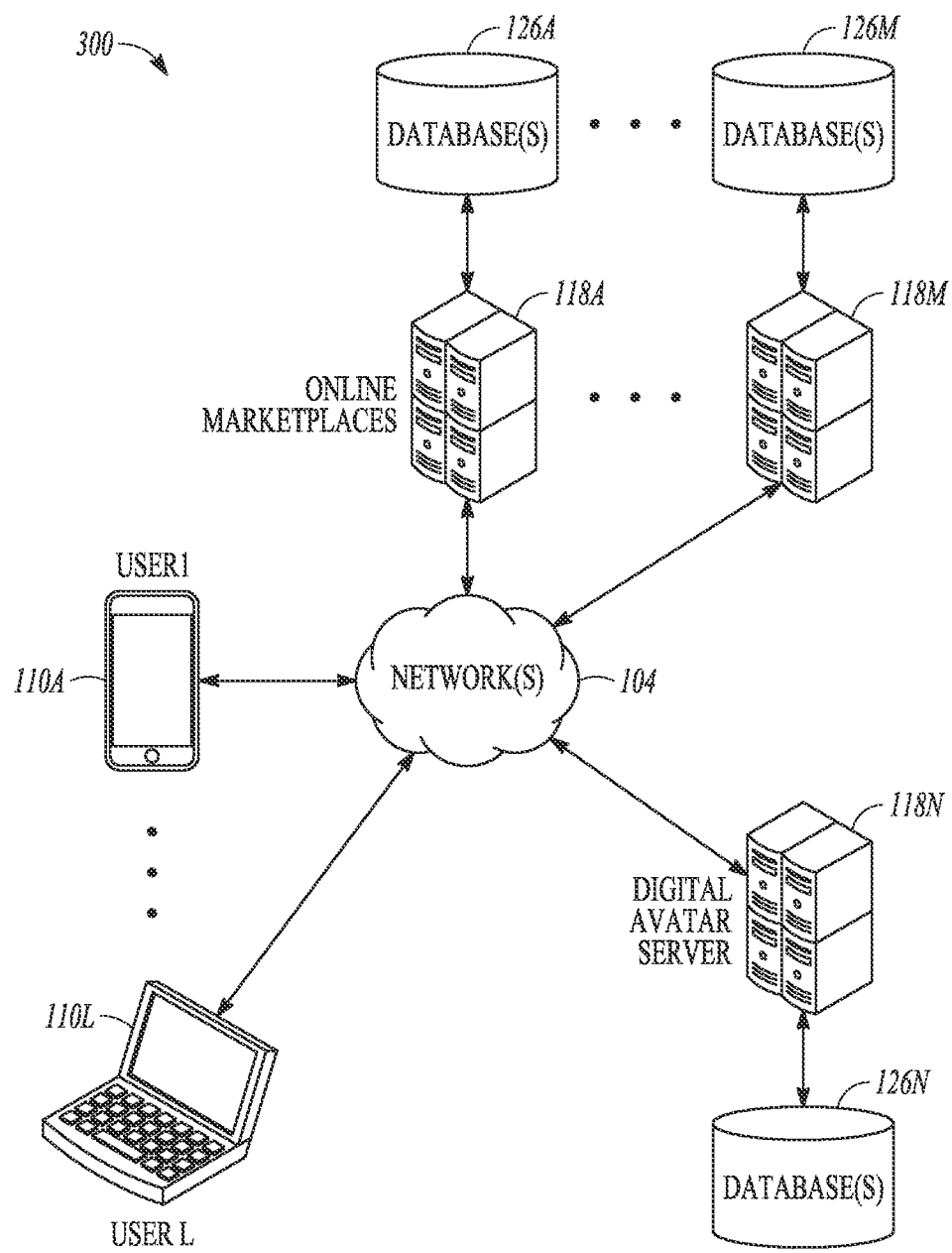
FIG. 3 is a network diagram depicting an example embodiment of a digital avatar network including multiple devices forming at least a portion of the client-server system of FIG. 1.

FIG. 3 is a network diagram depicting an example embodiment of a digital avatar network 300 including multiple devices forming at least a portion of the client-server system 100 of FIG. 1. The digital avatar network 300 may include one or more user devices 110A-L, one or more servers 118A-N, one or more databases 126A-N.

In the illustrated embodiment, the one or more user devices 110A-110L are interconnected to one or more online marketplace servers 118A-118M via the network 104 for communicating online marketplace resources and/or data (e.g., data or code related to a webpage or software application of the online marketplace). The databases 126A-M may store data of the respective online marketplaces and/or marketplace accounts of the users of the devices 11 OA-L. Additionally, the digital avatar server 118N may be interconnected to the user devices 110A-L and the online marketplace servers 118A-M via the network 104 for providing digital inventory and/or digital avatar services for the user's and/or the online marketplaces.

In operation, the user devices 110A-L may render user interfaces of online marketplaces to browse and purchase items. The user interfaces may be rendered based on data provided by the online marketplace servers 118A-M. Each of the online marketplace servers 118A-M may correspond to different vendors (e.g., retailers). In one example embodiment, the online marketplaces may correspond to clothing retailers. However, it will be appreciated that in alternative embodiments, other types of marketplaces are contemplated. For example, example marketplaces may include any marketplace selling items that may be placed on the user's person (e.g., makeup and other cosmetics) and/or the user may be placed in or on the item (e.g., a car, furniture, and the like).

As will be described in greater detail below, user interfaces may display a digital avatar of a user for showing the digital avatar with a selected item. For example, the users of the user devices 110A-L may create respective user accounts for storing data related to digital avatars. For example, the user device 110A may connect to the digital avatar server 118N via a dedicated website, via a marketplace website, or an application executing on the user device 11 OA-L. Once connected, the user device 110A may transmit data to the digital avatar server 118N for creating or modifying a user account. The user account may include data for generating the digital avatar of the user, which will be described in greater detail later in connection with FIG. 8.

On the vendor side, the respective online marketplace servers 118A-M may create vendor accounts. An example of a data structure of a vendor account will be described in greater to detail later in connection with FIG. 8. With a vendor account, an online marketplace server (e.g., one of the servers 118A-M) may provide the digital avatar server 118N data for creating a product record. The product record may be used in conjunction with data of a selected user account for generating a digital avatar in the selected product.

In an example embodiment, each of the online marketplace servers 118A-M may access the digital avatar server 118N to access the user accounts stored in the database 126N. In this way, for example, the digital avatar server 118N may provide avatar data as a service. Moreover, in some embodiments, the digital avatar network 300 may define interfaces and protocols for providing avatar services such that a user account may be used by the plurality of online marketplace servers 118A-M. As such, an avatar may be generated as wearing items from two or more online marketplaces. In another embodiment, users of the user devices 11 OA-L may share avatar data with other users, as will be described in greater detail.

Figure 4:
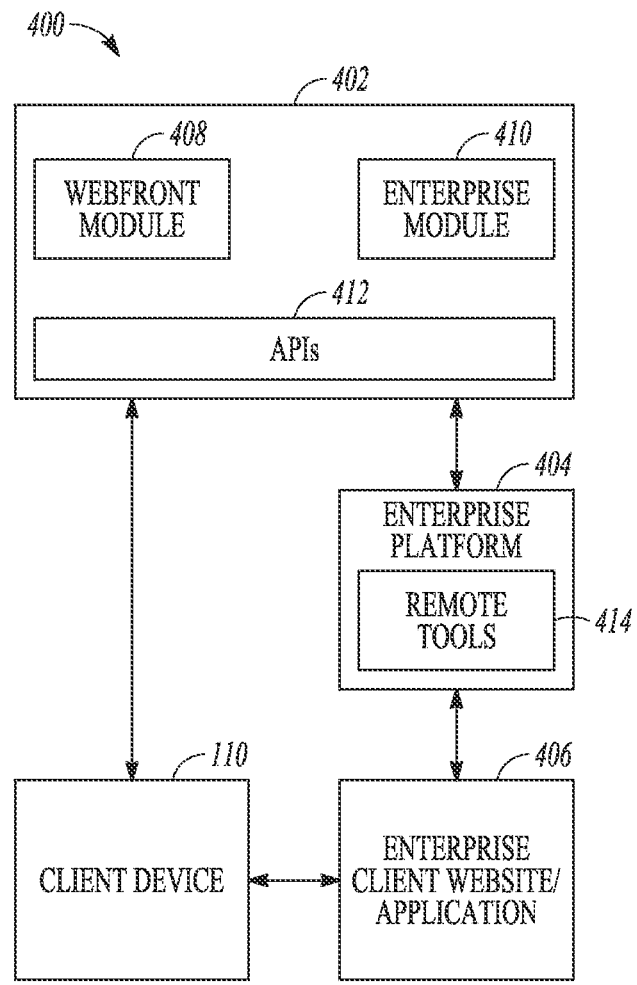
FIG. 4 is a block diagram illustrating an example embodiment of a digital avatar network forming at least a portion of the client-server system of FIG. 1.

FIG. 4 is a block diagram illustrating an example embodiment of a digital avatar network 400 forming at least a portion of the client-server system 100 of FIG. 1. The digital avatar network 400 includes an avatar platform 402, an enterprise platform 404, an enterprise client 406, and a client device 110 of FIG. 1. The avatar platform 402 may include a web front module 408, an enterprise module 410, and one or more APIs 412 for interfacing with the enterprise platform 404 and/or the client device 110. The enterprise platform 404 may include remote tools 414. The avatar platform 402 may correspond to the digital avatar server 118N of FIG. 3. The enterprise platform 404 and the enterprise client 406 may correspond to one or more of the online marketplace servers 118A-M of FIG. 3. In alternative embodiments, the components of FIG. 4 may be included by alternative components of FIG. 1.

The enterprise module 410 of the avatar platform 402 may facilitate integrating information for customization with the enterprise platform 404 and the remote tools 414. For example, the enterprise module 410 may provide configuration and rules-based options that provide vendors the capability to decide which digital avatar features are made available to users on their sites. For example, a vendor may provide an avatar-enabled product template that designates that a front view image of the digital avatar must be provided in order for the product to comply with the digital avatar services. The enterprise module 410 may provide options for users to "share" their avatar data with others for pair-shopping (so you can "take your avatar friend" shopping with you). The enterprise module 410 may also provide options for users to go virtual shopping with avatars of family members, friends, contacts, or other users. As stated above, a user may share avatar data with other users so the users can "take you out" shopping on partner websites.

The web front module 408 may provide a customer facing user interface module for capturing the customer attributes. In an example embodiment, a user may upload photos in certain poses (so the system 100 can digitize measurements in a standard manner). Dress attributes for a user may be captured based on, for example, 2-3 photos that user uploaded. As will be described in detail below, by using the photos, as well as the height and/or weight input, the avatar platform 402 may identify dress measurements (e.g., six or more measurements) that, for example, a tailor may use to determine clothing sizes. Accordingly, in one example embodiment, the avatar platform 402 may serve as an "e-tailor" system for automated custom dress measurements and fittings. It will be appreciated that the avatar platform 402 may make measurements of the user digitally based on uploaded user photos using hardware implemented processes or third party APIs.

The web front module 408 may provide a user interface that prompts users to input specified attributes—such as, but not limited to: age, favorite color, style choices, etc. The web front module 408 may prompt users to input other optional features like family identifiers, area of residence, etc. The avatar platform 402 may save this information in a user account (also referred to herein as "user record"). Users may update or edit the user account via the web front module 408 in an example embodiment.

The APIs 412 may make user account data available to third-party applications and/or services. For example, within applications of the avatar platform 402, as well as external applications (e.g., third-party online vendors), APIs 412 may integrate products, webpages, applications, services, and the like with digital avatar data. For example, the remote tools 414 may facilitate creating or modifying product records that support digital avatar services. The data to create or modify product records may be sent to the digital avatar platform 402 through a vendor-facing portion of the APIs 412. Accordingly, the avatar platform 402 may facilitate integration with third party systems, such as Mobile/Tablet apps, B2C (business-to-consumer), web-service calls, etc., and may facilitate licensing avatar data and/or services.

As stated above, the enterprise platform 404 and remote tools 414 may provide the administrator a way to set up an online marketplace for the digital avatar network 400. For example, the administrator may indicate that an item is avatar enabled, whereas other items may not be. The remote tools 414 may prompt the vendor user to enter attributes for the item. The avatar platform 402 may provide a preview of the item on a default avatar profile after which the administrator may confirm and save the settings. The remote tools 414 may also provide the administrator with the ability to apply the same settings to multiple items using a template of attributes.

Figure 5:
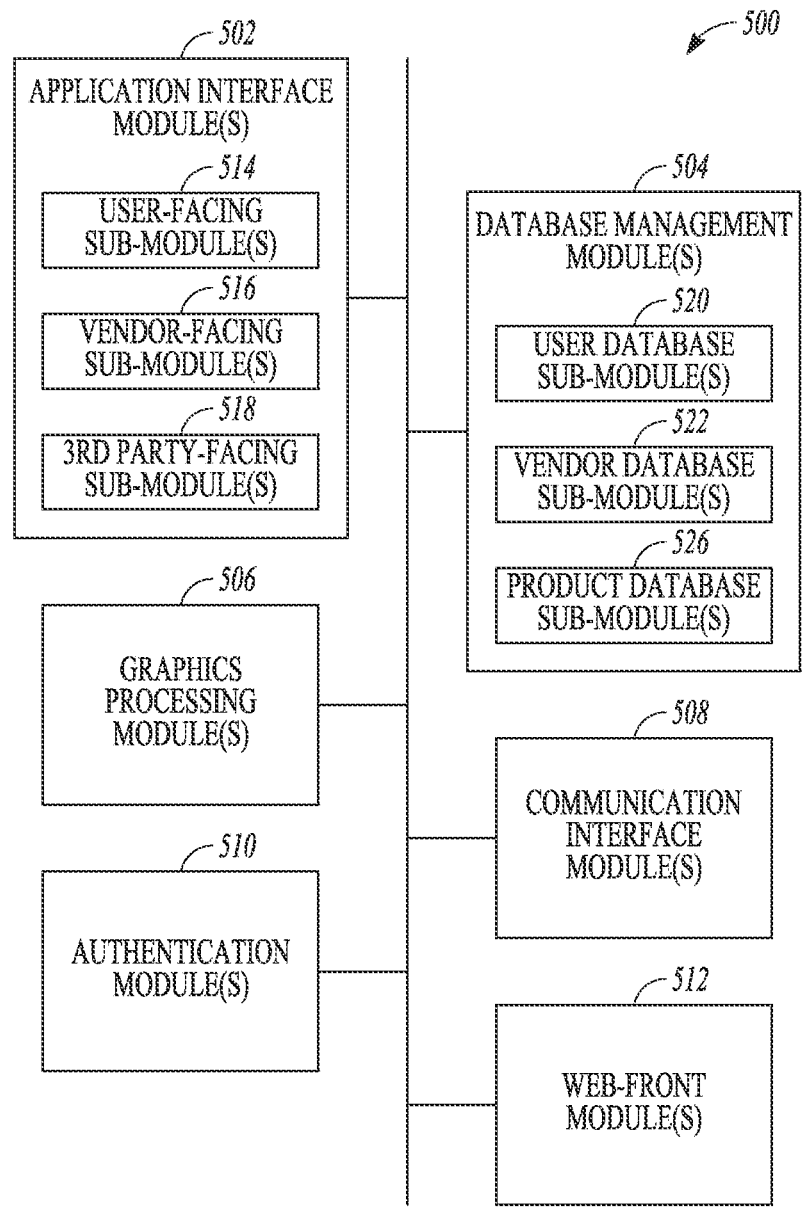
FIG. 5 is a block diagram illustrating an example embodiment of a digital avatar system including multiple modules forming at least a portion of the client-server system of FIG. 1.

FIG. 5 is a block diagram illustrating an example embodiment of a digital avatar system 500 including multiple modules forming at least a portion of the client-server system of FIG. 1. The modules 502-512 of the illustrated digital avatar system 500 include an application interface module(s) 502, a database management module(s) 504, a graphics processing module(s) 506, a communication interface module(s) 508, an authentication module(s) 510, and a web-front module 512. The application interface module 502 includes a user-facing sub-module(s) 514, a vendor-facing sub-module(s) 516, and the third-party-facing sub-module(s) 518, which may correspond to APIs. The database management module(s) 504 may include a user database sub-module(s) 520, a vendor database sub-module(s) 522, and a product database sub-module(s) 526.

In some embodiments, the components of the digital avatar system 500 can be included in the avatar platform 123 of FIG. 1. However, it will be appreciated that in alternative embodiments, one or more components of the digital avatar system 500 described below can be included, additionally or alternatively, in other devices, such as one or more of the applications 120, 122, the servers 114, 116, 118, 130, the network 104, and/or the client devices 110, 112 of FIG. 1.

The modules 502-512 of the digital avatar system 500 may be hosted on dedicated or shared server machines (not shown) that are communicatively coupled to enable communications between server machines. Each of the modules 502-512 are communicatively coupled (e.g., via appropriate interfaces) to each other and to various data sources, so as to allow information to be passed between the modules 502-512 of the digital avatar system 500 or so as to allow the modules 502-512 to share and access common data. The various modules of the digital avatar system 500 may furthermore access one or more databases 126 via the database servers 124.

The digital avatar system 500 may facilitate generating and providing digital avatar data for displaying a digital representation of a user with a selected product. The digital avatar system 500 may interface with client devices, such as devices of consumers and vendors. As used herein, consumers will be referred to as "users." The digital avatar system 500 may receive user data for generating or updating user accounts containing measurement data and/or image data of the user. Likewise, the digital avatar system 500 may receive vendor data for generating or updating vendor accounts, which may include one or more product records. For example, each product record may include one or more variations of image data to provide model data for sizes of the product on various sizes of avatars (e.g., a size-small shirt on a size-15 avatar, a size-medium shirt on a size-15 avatar, a size-medium shirt on a size-15.5 avatar, etc.).

In operation, a user may provide input for configuring a user account. In one aspect, the user account may include avatar data that may be used to generate and display a digital avatar as a digital representation of the user and a selected item (such as, a shirt). Avatar data may include measurements of the user and/or clothing sizes of the user. In one embodiment, avatar data may be generated by estimating the user's measurement based on one or more images that the user has uploaded.

Accordingly, the user may browse an online marketplace and request an avatar representation of the user with a selected item. For example, the user may access a selected user account and a selected product record in order to generate a digital avatar for display. For example, the digital avatar system 500 may receive an avatar request message originating from a user device (e.g., a client machine 110 of FIG. 1). The digital avatar system 500 may, in turn, provide model data to the requesting user device or to another user device in accordance with the avatar request message. Moreover, the user device receiving the model data may share the model data with another user. In these ways, the digital avatar system 500 may also facilitate sharing digital avatars between users.

To this end, the digital avatar system 500 is shown to include the application interface module(s) 502, the database management module(s) 504, the graphics processing module(s) 506, the communication interface module(s) 508, the authentication module(s) 510, and the web-front module(s) 512, which may serve to provide digital avatars.

The application interface module(s) 502 may be a hardware-implemented module which may be configured to communicate data with client devices. Relative to the digital avatar system 500, client devices may include user devices, such as client device 110 of FIG. 1, and/or vendor devices, such as application servers 118 of FIG. 1. For example, the digital avatar system 500 may support digital avatar services for both user devices and vendor devices. For facilitating digital avatar services, the application interface module(s) 502 may include the user-facing and vendor-facing sub-modules 514, 516 for interfacing with user devices and vendor devices, respectively.

Additionally or alternatively, the digital avatar system 500 may communicate with third party devices for providing or receiving data or services. Third party devices may include vendors that provide data storage or processing, such as image processing or social networking services. Another example of a third-party device may be e-stylists who utilize data and services of the digital avatar system 500 for making recommendations to, and/or purchases on the behalf of, other users. It will be appreciated that an e-stylist may provide free or paid services. For example, a professional e-stylist may receive a commission from either the user or vendors for purchases. As another example, an e-stylist may be a friend or contact of the user and may provide recommendations as a free social activity. Accordingly, the application interface module 502 may include the third-party-facing sub-module(s) 518 for interfacing with third-party devices and facilitating third-party services.

In operation, the application interface module(s) 502 may receive a request message for determining measurements of a user. For example, a user device 110 of FIG. 1 may transmit the request message to the digital avatar system 500 over the network 104. The request message may correspond to a request by the user to generate user avatar data. The request message may be generated, as a result of user input, by a webpage or software application having a user interface rendered by the user device. For example, the web-front module(s) 512 may provide user interface data for populating the user interface of a webpage or an application for generating a user account. User avatar data may include, but be not limited to, measurement data of the user, clothing size data of the user, image data of the user, user input indicative of one or more physical measurements of the user.

As will be described in greater detail below, measurement data of the user may be generated in automatic (e.g., without user intervention) or semi-automatic manner (e.g., with optional user intervention or partial automation). For example, the digital avatar system 500 may receive one or more images of the user through the user-facing sub-module(s) 514. The application interface module(s) 502 may store or provide the images for access by the graphics processing module(s) 506 for processing. The graphics processing module(s) 506 may generate estimates of the user's measurements and/or clothing sizes. In some embodiments, the estimates may be based on comparing the images to one or more reference measurements that may indicate a scale of the subjects of the images.

In some example embodiments, the application interface module(s) 502 may also receive an avatar request message that corresponds to a request to render a digital representation of a target user combined with a target product. For example, the target user may correspond to the requesting user or a contact who provided access privileges to the contact's avatar data. An example of a digital representation of a target user combined with the target product includes the digital avatar of the target user being displayed as wearing the target product, which may be an article of clothing or a fashion accessory.

In an example embodiment, the user-facing sub-module(s) 514 of the application interface module(s) 502 may receive the avatar request message as an input from a client device 110. The client device 110 may have transmitted the avatar request message in response to user input, such as the user selecting a user interface element for displaying the digital avatar of the target user with the target product. Accordingly, the avatar request message may be associated with a user identifier indicative of the target user and a product identifier indicative of the target product. For example, the avatar request message may correspond to a data packet that includes the user identifier and/or the product identifier. It will be appreciated, however, that in alternative embodiments, the request message need not include the user identifier or the product identifier. For example, the user identifier and/or the product identifier may be determinable from the avatar request message, in particular, based on user login data, stored user account data, previous user actions, or the like. Furthermore, as stated, the avatar data of one user may be requested by another user—that is, the user who generated the avatar request message may be different from the target user.

The vendor-facing sub-module(s) 516 of the application interface module(s) 502 may facilitate interfacing the digital avatar system 500 with a vendor application, such as the online marketplace servers 118A-M of FIG. 3. The vendor-facing sub-module(s) 516 may receive data from a vendor application as input and may provide data to a vendor application as output. Moreover, the vendor-facing sub-module(s) 516 may facilitate transcoding messages from one format to another format for supporting multiple interface definitions.

In one aspect, the vendor-facing sub-module(s) 516 may receive vendor data and/or product data from an online marketplace client device for generating vendor accounts and product records. For example, a vendor application may register an account with the digital avatar server 118N (FIG. 3) by providing the vendor-facing sub-module(s) 516 account data. Moreover, the vendor application may create one or more product records suitable for providing at least a portion of a digital avatar, as well as defining one or more attributes. Example embodiments of a vendor account and a product record will be described later in greater detail in connection with FIG. 8.

As stated, the third-party-facing sub-module(s) 518 of the application interface module(s) 502 may facilitate interfacing the digital avatar system 500 with third party devices. The third-party-facing sub-module(s) 518 may receive data from third-party applications as inputs and transmit data to the third party applications as output. Example of third-party applications may include server and/or client applications that may facilitate generating avatar data, linking data between users, providing data storage, and the like.

The database management module(s) 504 may be a hardware-implemented module which may maintain account and record data, such as user accounts, vendor accounts, and/or product accounts, for facilitating digital avatar services. Accordingly, in the illustrated embodiment, the database management module 504 includes sub-modules 520, 522, 526, for managing respective user account, vendor account, and product record databases. The database management module(s) 504 may interface with one or more data storage devices, such as the database(s) 126 of FIG. 1, to read or write data.

In operation, the database management module(s) 504 may update the data storage devices based on data received by the application interface module(s) 502. For example, the user-facing sub-module(s) 514 may provide data to the user database sub-module(s) 520 as an input for creating, updating, or linking user accounts. Likewise, the vendor-facing sub-module(s) 516 may provide data to the vendor database sub-module(s) 522 as an input for creating or updating vendor accounts and/or product records.

Moreover, the database management module(s) 504 may facilitate providing model data for rendering digital avatars by accessing data stored in the user and product databases. For example, in response to an avatar request message, the database management module(s) 504 may select and/or access a first user account (or "user record") from a user database stored on the storage devices. The selection may be based on a user identifier associated with, or included by, the avatar request message. The user account may include measurement data and image data of the corresponding user (collectively forming at least a portion of the user's "avatar data"). Furthermore, the database management module(s) 504 may select a product record from a second database based on the product identifier. The product record may include one or more images for generating, with the user's avatar data, model data of the digital avatar.

Additionally or alternatively, the database management module(s) 504 may facilitate sharing avatar data between users. For example, the application interface module(s) 502 may receive a share request message for requesting that data of a first user account be shared with a second user. For example, the share request message may include a first identifier indicative of a first user record and a second identifier indicative of a second user record.

The database management module(s) 504 may, in turn, provide or write linking data to the second user account. The linking data may facilitate access to the user record of the first user for the second user. In one embodiment, the database management module(s) 504 may access, based on the second identifier, the second user record from the first database. The database management module(s) 504 may also write linking data to the second user record. The linking data, as stated, may provide access privileges to the first user record for the second user. Consequently, a friend or contact of a user may gain access privileges to the user's avatar data.

The graphics processing module(s) 506 may be a hardware-implemented module which may be configured to process image data. For example, the graphics processing module(s) 506 may facilitate determining measurement data of users and/or generating model data for displaying a digital avatar. For example, in one embodiment, the user-facing sub-module(s) 514 may receive one or more images of the users and provide the images to the graphics processing module(s) 506 for processing. In turn, the graphics processing module(s) 506 may determine, with or without user intervention, measurement data of the user based on the one or more images. For example, in one embodiment, the graphics processing module(s) 506 identifies a plurality of points ("POIs") in the images of the user. Based on a reference measurement, such as the user's height, the graphics processing module(s) 506 may determine one or more measurements of the users from the distances between the identified POIs.

The measurements may include body measurements of the user and/or clothing sizes measurements. That is, the graphics processing module(s) 506 may determine one or more measurements of the user's body, such as the neck size, chest size, arm's-length, waist size, legs size, and the like "body," "tailoring," or "dress" type measurements suitable for selecting clothing sizes. Additionally or alternatively, measurements may include clothing sizes, such as shirt sizes, pant sizes (waist, inseam, drop, etc.), shoe sizes (length, width, etc.), hat sizes (small, medium, large, diameter, etc.), glove sizes (S, M, L, etc.), neck sizes and the like. It will be appreciated that measurements may be in accordance with any designation or standard, such as United States standard clothing sizes, EN 13402 (European Union standard sizes), International Organization for Standardization ("ISO") 3635, ISO 4416, ISO 5971, ISO 8559, ISO/Technical Report ("TR") 10652, and the like.

As stated, the graphics processing module(s) 506 may also determine or generate model data of the target user and the target product for displaying the digital avatar. For example, the graphics processing module(s) 506 may determine the model data based on the selected user account and the selected product account. The selected user account may provide measurement data of the user, which may be used to select image data of the product record. Furthermore, the selected user account may include image data of the user, such as an image of the user's head and neck. The model data may be generated based on combining the image data of the selected user accounts and the data of the product record. The graphics processing module(s) 506 will be discussed later in greater detail in connection with FIG. 6.

The communication interface module(s) 508 may be a hardware-implemented module which may which may facilitate the flow of the information, data, and/or signals between the web-front modules 512. In addition, the communication interface module(s) 508 can be configured to support communication of the digital avatar system 500 between the servers and client machines of FIG. 1. For instance, the communication interface module(s) 508 may be configured to provide a response message including the model data to display the digital avatar on a user device.

The authentication module(s) 510 may be a hardware-implemented module which may facilitate authentication of data provided from user devices and vendor devices. For example, the authentication module(s) 510 may receive an authentication request message for authenticating a client device. Based on the authentication request message, the authentication module(s) 510 may determine whether the client device passes authentication. The database management module(s) 504 may provide access to the user database in accordance with a determination that the client device passes authentication.

The web-front module(s) 512 may be a hardware-implemented module which may provide data for displaying web resources on client devices. For example, the digital avatar system 500 may provide a webpage for users and vendors to log in and create accounts and update the account information. The web-front module(s) 512 may provide user interfaces for users to provide measurement data and manage a personal closet and for vendors to create and manage product records.

Figure 6:
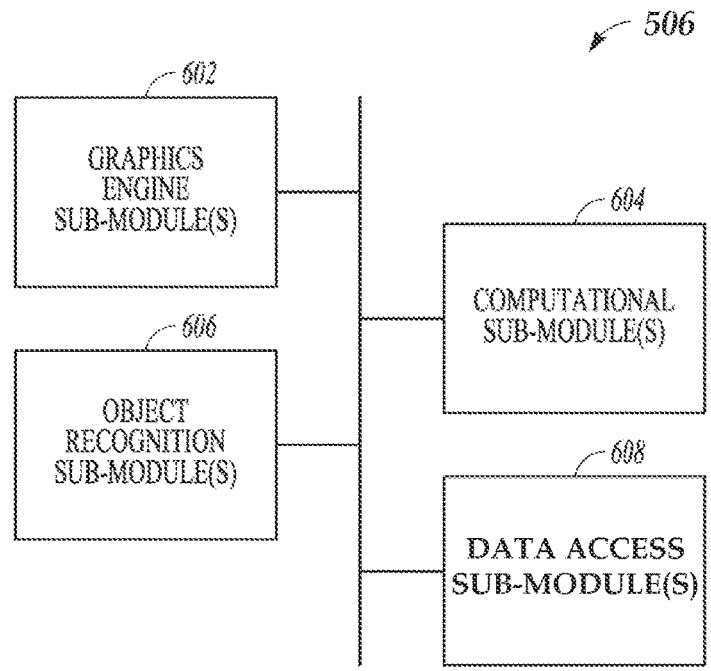
FIG. 6 is a block diagram illustrating an example embodiment of a graphics processing module including multiple sub-modules forming at least a portion of the digital avatar system of FIG. 5.

FIG. 6 is a block diagram illustrating an example embodiment of a graphics processing module 506 including multiple sub-modules 602-608 forming at least a portion of the digital avatar system 500 of FIG. 5. The sub-modules 602-608 of the illustrated graphics processing module 506 include graphics engine sub-module(s) 602, computational sub-module(s) 604, object recognition sub-module(s) 606, and data access sub-module(s) 608.

In some embodiments, the components of the graphics processing module 506 may be included by the avatar platform 123 of FIG. 1. However, it will be appreciated that in alternative embodiments, one or more components of the graphics processing module 506 described below can be included, additionally or alternatively, by other devices, such as one or more of the applications 120, 122, the servers 114, 116, 118, 130, the network 104, and/or the client devices 110, 112 of FIG. 1.

The sub-modules 602-608 of the graphics processing module(s) 506 may be hosted on dedicated or shared server machines (not shown) that are communicatively coupled to enable communications between server machines. Each of the sub-modules 602-608 are communicatively coupled (e.g., via appropriate interfaces) to each other and to various data sources, so as to allow information to be passed between the sub-modules 602-608 of the graphics processing module(s) 506 or so as to allow the sub-modules 602-608 to share and access common data. The various modules of the graphics processing module(s) 506 may furthermore access one or more databases 126 via the database servers 124 (FIG. 1). In example embodiments, the sub-modules 602-608 may correspond to a processing unit of a graphics processor, a microchip controller, a digital signal processor, or the like hardware processors, electronics, or circuitry coupled to a data storage device including instructions for execution by the sub-modules 602-608.

The graphics processing module(s) 506 may facilitate generating digital avatar data and providing model data. In an example aspect, the graphics processing module(s) 506 may generate estimates of measurements of a user by processing one or more images uploaded by the user. Additionally or alternatively, the graphics processing module(s) 506 may facilitate generating model data for rendering an image of a digital avatar of the user with a selected product.

Accordingly, the graphics processing module(s) 506 may include the graphics engine sub-module(s) 602 being interconnected with the sub-modules 604-608 for controlling functions of the graphics processing module(s) 506. For example, the graphics engine sub-module(s) 602 may be a hardware-implemented module which may facilitate execution of the sub-modules 604-608 of the graphics processing module(s) 506 in response to receiving user input and performing processes of the graphics processing module(s) 506.

The computational sub-module(s) 604 of the graphics processing module(s) 506 may be a hardware implemented module which may facilitate performing computational operations on data. The computational sub-module(s) 604, being interconnected with the graphics engine sub-module(s) 602, may receive data as input in order to perform operations specified by the graphics engine sub-module(s) 602 and may provide the graphics engine sub-module(s) 602 the processed data as output.

The object recognition sub-module(s) 606 of the graphics processing module(s) 506 may be a hardware implemented module which may facilitate object recognition services, such as identifying POIs of an image of a user. The object recognition sub-module(s) 606 may receive image data as input and may provide the results of the image processing as output. The object recognition sub-module(s) 606 may execute or include one or more image processing routines, including, but not limited to, edge-detection, edge matching, grayscale matching, gradient matching, model bases matching, feature detection, and the like functions for supporting computer vision object recognition. For example, facial recognition processing may be based on principal component analysis using eigenfaces, linear discriminate analysis, elastic bunch graph matching using a Fisherface algorithm, hidden Markov model, multi-linear subspace learning using tensor representation, dynamic link matching, and the like facial recognition algorithms. The graphics engine sub-module(s) 602 may control the operation of the object recognition sub-module(s) 606.

The data access sub-module 608 of the graphics processing module(s) 506 may be a hardware implemented module configured to facilitate data writes and/or data reads to a data storage device, such as hard disk drives, flash memory devices, solid state drives. DRAM, SRAM, or the like. The data access sub-module 608 may be operatively coupled to the sub-modules 602-606. Accordingly, the data access sub-module 608 may provide an interface for data storage access to the sub-modules 602-606.

In operation, in an example embodiment, the graphics engine sub-module(s) 602 may receive an indication that the digital avatar system 500 received a request message from a client device of a user. The request message may correspond to a request to determine measurements of the user. In an example embodiment, the request message may be received through the application interface module(s) 502 of FIG. 5.

In an example embodiment, the graphics engine sub-module(s) 602 may access data for determining measurements of the user in response to the request message. For example, a first set of data may be indicative of locations of POIs ("POI locations") of a user's body in an image. The graphics engine sub-module(s) 602 may determine measurements of the user's body based at least partly on distances between the POI locations. Example POI locations may include the top of the head, bottom of the head (e.g., chin), a shoulder, an elbow, a wrist, a fingertip, the chest, the waist, the drop of the seat, a knee, an ankle, a foot, and the like locations of the user that are usable for determining clothing measurements.

As will be described in greater detail, the graphics engine sub-module(s) 602 may access the first set of data by POI accessing location data, or by accessing the image data and by processing the image data via the object recognition sub-module(s) 606 to determine the locations. In an example embodiment, the graphics engine sub-module(s) 602 may receive one or more images of the user and may determine the locations automatically. For example, the graphics engine sub-module(s) 602 may invoke, in response to receiving the request message, the object recognition sub-module(s) 606 to match a template (e.g., a geometric model of a human body) to a first image. Points of the template may correspond to the POIs whose locations in the image are to be determined. Accordingly, the template or portions of the template may be translated, scaled, and/or rotated within the image to match the template to the user in the image. As a result, the graphics engine sub-module(s) 602 may determine the locations within the image based on location and orientation of the template. Furthermore, in another example embodiment, the user may adjust the results of the processing to improve the accuracy of the locations. An example method performed by the object recognition sub-module(s) 606 will be described later in greater detail in connection with FIG. 13.

Distances between two POI locations may be indicative of a body measurement. If the distance between POI locations is computed using the coordinate system of the image, the distances may be in units of the image space (e.g., a number of pixels or virtual units of the image coordinates) rather than the physical space (e.g., the actual physical measurement of the user). To adjust image space distances, a scale of the image may be determined and used to map an image-space distance to a physical-space distance, as will be described below.

The graphics engine sub-module(s) 602 may access a second set of data that is indicative of a reference characteristic, such as the user's height and/or the user's weight, to determine a scale of the image. Furthermore, the graphics engine sub-module(s) 602 may use the computational sub-module(s) 604 to compute a distance between two predetermined POI locations, such as a POI located at the top of the user's head and a POI located about the user's feet, in the image. This image-space distance may be compared to the reference characteristic (e.g., the user's height) in accordance with a relationship between the image-space distance and the reference characteristic.

For example, the scale c of the image can be computed based on the reference characteristic R which may correspond to the height of the user and based on the distance $[D_1]_{image}$ between the head and feet of the user in the image space by the following approximation:

$$C = R/[D_1]_{image}. \quad \text{(Eqn. 1)}$$

Accordingly, the graphics processing module(s) 506 may use the scale c to determine estimates of physical-space measurements of the user based on the image of the user. For example, the graphics engine sub-module(s) 602 may compute the distance between two POI locations and scale the distance to map or convert the image-space distance to a physical-space distance. Moreover, the graphics engine sub-module(s) 602 may use one of the estimated distances from a first image to determine a scale of a second image.

In an example embodiment, the graphics processing module(s) 506 may receive multiple images, such as a full-length front view of the user, a profile side view of the user, a waist-down view of the user, and the like images in order to determine one or more body measurements of the user. Using multiple images may increase the accuracy of the estimates of the measurements of the user. Each pair of images may have two or more POIs in common. Accordingly, as previously stated, the graphics engine sub-module(s) 602 may receive input corresponding to a reference characteristic usable to determine the scale the first image. Furthermore, a physical-space distance between two of the common POI locations in the first image may be used as a reference characteristic for the second image.

The graphics processing module(s) 506 may receive the reference characteristic as an input from a user device 110. In one example embodiment, the user device 110 may provide the reference characteristic in response to receiving user input through a user interface, such as the example user interface described later in connection with FIGS. 14-20, during a process to create or edit a user account.

Based on the estimates of the user's body measurements, the graphics engine sub-module(s) 602 may determine estimates of the user's clothing sizes. In an example embodiment, the graphics engine sub-module(s) 602 may determine the estimated clothing sizes by performing a data-lookup operation. For example, the graphics engine sub-module(s) 602 may use the data access sub-module 608 to access a lookup table that contains one or more rows that match the user measurements to clothing sizes. Accordingly, the graphics engine sub-module(s) 602 may select a row of the lookup table that most closely matches the estimated measurements to determine the estimated clothing sizes. An example method performed by the computational sub-module(s) 604 will be described later in greater detail in connection with FIG. 12.

In an example embodiment, the graphics engine sub-module(s) 602 may store a portion of the image data in a data storage device. For instance, the graphics engine sub-module(s) 602 may pass image data of the user to the object recognition sub-module(s) 606 to identify the user's face using facial recognition. Accordingly, the object recognition sub-module(s) 606 may provide the location of the user's face within the image as an output. Accordingly, based on the output of the object recognition sub-module(s) 606, the graphics engine sub-module(s) 602 may store at least the portion of the image data corresponding to the user's face. The stored image data may facilitate generating digital avatar data for rendering a model avatar with the stored image superimposed on the head of the model avatar.

Example Data Structures

Figure 7:
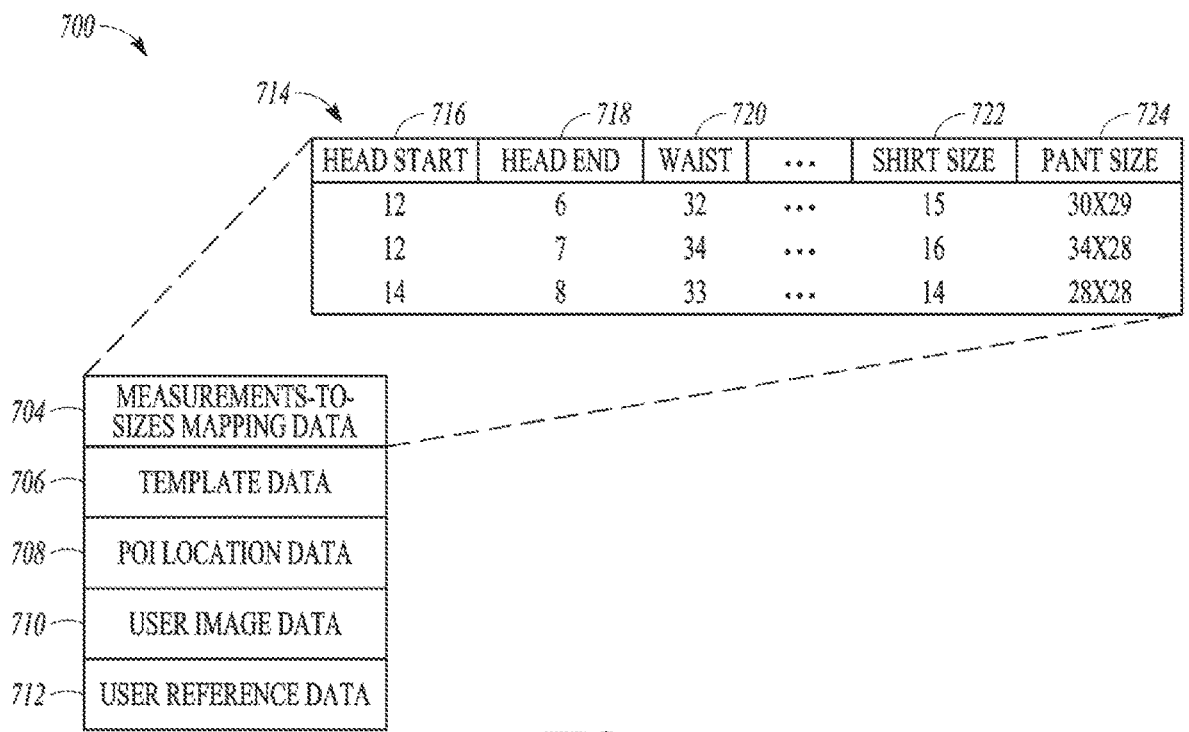
FIGS. 7 and 8 are block diagrams illustrating example data structures for a digital avatar system, in accordance with example embodiments.
Figure 8:
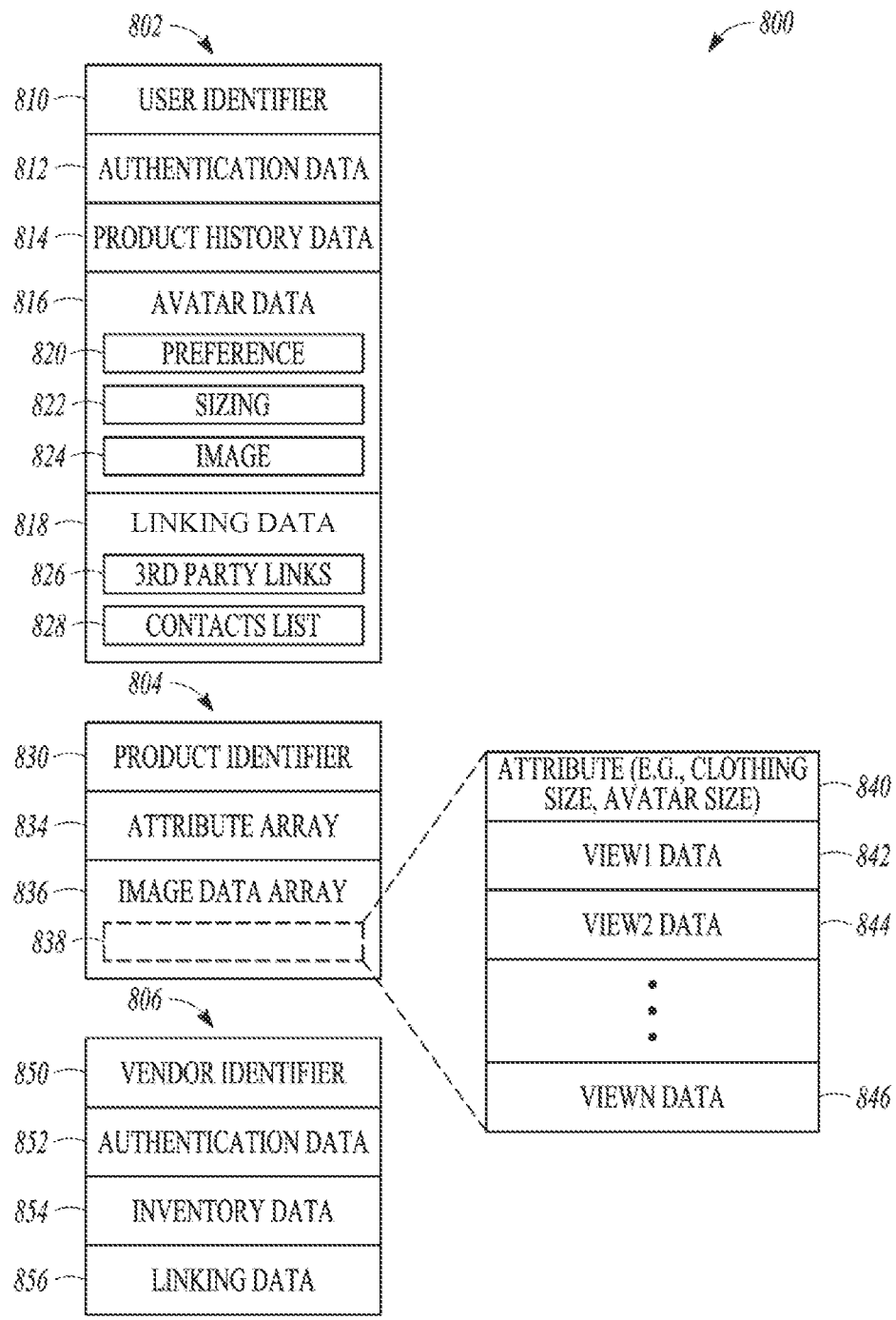

FIGS. 7 and 8 are block diagrams illustrating example data structures for a digital avatar system, in accordance with example embodiments. FIG. 7 is a block diagram illustrating an example data structure 700 for the digital avatar system 500, in accordance with an example embodiment. In an example embodiment, the data structure 700 may facilitate a determination of user measurements and/or clothing sizes based on processing one or more images of the user. Accordingly, the data structure 700 may include a measurements-to-sizes mapping data field 704, a template data field 706, a POI location data field 708, a user image data field 710, and a user reference data field 712. The measurements-to-sizes mapping data field 704 may correspond to a lookup table 714 having columns 716-724.

The measurements-to-sizes mapping data field 704 may store data for mapping user body measurements to clothing sizes. In the illustrated example embodiment, the columns 716-720 of the lookup table 714 may correspond to user body measurements and columns 722, 724 may correspond to clothing sizes. It will be appreciated that in alternative embodiments the measurements-to-sizes mapping data field 704 may correspond to functions (mathematical functions curve-fitted to data), logic (e.g., crisp or fuzzy rules), and the like mappings.

The template data field 706 may store data for identifying locations of POIs of an image of the user. A template may be data for generating a model (e.g., a geometric model or outline of a body) that may be scaled, translated, and/or rotated in the image to match the model to the image of the user. Furthermore, each template may have one or more POIs fixed relative to the corresponding templates. Accordingly, when the template is matched to the image of the user, the locations of the POIs of the template provide the POI locations with respect to the image. The POI location data field 708 may store location data of the POI locations. The user image data field 710 may store image data of the user.

In an example embodiment, in operation, the graphics engine sub-module(s) 602 may utilize the object recognition sub-module(s) 606 to manipulate and match a template of the template data field 706 to an image stored in the user image data field 710 to determine the POI locations. The results may be stored in the POI location data field 708. The graphics engine sub-module(s) 602 may utilize the computational sub-module(s) 604 to determine distances between one or more pairs of the POI locations stored in the POI location data field 708. Furthermore, the graphics engine sub-module(s) 602 may utilize the computational sub-module 604(*s*) to determine a scale of the image stored in the user image data field 710, e.g., in accordance with Equation 1. The scale may be used to map distances of pairs of POI locations to physical-space distances that correspond to estimates of user body measurements. In turn, the estimates of the user body measurements may be used to determine clothing sizes by accessing the measurements-to-sizes mapping data field 704.

In one aspect, each template of the template data field 706 may correspond to a representation or model of a body in a given posture. A template may include one or more parameters that the object recognition sub-module(s) 606 may vary to change the size or shape of the template to match the template to the image of the user. As stated, once the template has been matched to the user's body, the positions of the POI of the template may set the POI locations of the image. For example, a POI corresponding to a shoulder may be determined based on the location of the "shoulder" location of the template as it is matched to the image. If the match is close, the shoulder of the template substantially coincides with the shoulder of the user in the image.

The template data field 706 may include data representative of a plurality of templates, each template corresponding to a particular pose of the user. Furthermore, there may be a plurality of templates to account for variations in poses, image conditions, and/or users. For example, various templates may be included to account for body types, gender, clothing style worn by the user (e.g., loose or tight-fitting clothing), hairstyle (e.g., long or short hair), and the like. Accordingly, the object recognition sub-module(s) 606 may attempt to match one or more of the templates in order to determine a close match. The selection of the template may be based on user input that indicates the particular template variant.

FIG. 8 is a block diagram illustrating example data structures 802, 804, 806 for a digital avatar system 800, in accordance with an example embodiment. The data structure 802 may correspond to a data structure of a user account. The data structure 802 may include an authentication data field 812, a product history data field 814, an avatar data field 816, and a linking data field 818. The avatar data field 816 may include a preferences data field 820, a sizing data field 822, and image data field 824. The linking data field 818 may include a third-party links data field 826 and a contacts list data field 828. The data structure 804 may correspond to a data structure of a product record. The data structure 804 may include a product identifier data field 830, an attributes array 834, and an image data array 836. The element 838 of the image data array 836 may include attributes data field 840, one or more of view data fields 842-846. The data structure 806 may correspond to a vendor account, which may include a vendor identifier data field 850, an authentication data field 852, an inventory data field 854, and a linking data field 856.

In connection with the user account, the user identifier data field 810 may correspond to data usable to identifying a user. For example, each user may have a unique username or code to identify the corresponding user account. In this way, the username or code may be matched to the data field 810 to determine whether or not the data structure 802 corresponds to a particular user. Moreover, the authentication data field 812 may include data for verifying and validating the user. In one embodiment, the authentication data field 812 may correspond to data for determining whether or not a user login data (e.g., a password) matches expected login data.

The product history data field 814 may include data usable to identify one or more products that the user has purchased or owns. Purchase history may be tracked by online marketplace applications. Products that the owner currently owns may be provided by the user. Furthermore, in some embodiments, the product history data field 814 may also be used to identify one or more products of a wish list or gift list. The product history data field 814 may serve to provide an inventory of products that may be used to configure the user's digital avatar and/or to generate recommendations for the user.

The avatar data field 816 may include data that is descriptive of the user. The preferences data field 820 may include attributes. Example attributes may include the user's height, weight, skin color (which may be indicated by a user selection of a color from a palette), age, gender, and the like descriptors. Moreover, the preferences data field 820 may include data corresponding to one or more user preferences, such as whether or not the user prefers certain types of clothing (e.g., shirts, pants, skirts, casual clothing, formal closing, funky clothing, patterns, solids, colors, accessories, or the like). The sizing data field 822 may include body measurements of the user. Example measurements may include measurements of (1) the base of the neck to a "shoulder point" (e.g., where the shoulder meets the arm), (2) the shoulder point to an elbow, (3) the elbow to the knuckle of the middle finger, (4) the top of the head to the chin, (5) the base of the neck to the elbow, (6) the width of the chest, (7) the width of the waist, and (8) elbow to the knuckle the middle finger. It will be appreciated that in alternative embodiments more or fewer measurements may be included. For example, alternative measurements may include measurements related to (1) the top of the belt to just above the sole of the shoe (e.g., the pant length) and (2) the bottom of your crotch to the top of the sole of the shoe (e.g., the pant inseam). The sizing data field 822 may alternatively or additionally include clothing sizes of the user (e.g., as determined from the measurements of the user).

The image data field 824 of the avatar data field 816 may correspond to data indicative of one or more images of the user. As will be described later in greater detail, the user may upload one or more photos of the user and poses in accordance with template poses. For example, the digital avatar system 500 may prompt the user to upload, for example, three photos in which the user is positioned in different poses. From these three photos, the digital avatar system 500 may determine the sizing data field 822 as described above. Moreover, one or more of the images may be used for the model data to generate a digital avatar. In particular, images of the user's face and neck, for example, may be superimposed on "template" bodies wearing the selected products in order to generate a digital avatar.

As stated, the measurement data may be determined in an automatic or semi-automatic way by the digital avatar system 500. In an alternative embodiment, the measurement data may be provided by a third party application via a third-party facing sub-module 518 of the application interface module 502.

The linking data field 818 of the data structure 802 may include data usable to identify one or more users of the digital avatar system 500. For instance, the third-party links data field 826 may include data indicative of third-party users or systems that may access the user account data structure 802. For example, third party links data field 826 may include identifiers of stylists who may access the product history data field 814 and/or the avatar data field 816 in order to generate recommendations or make purchases for the user. In alternative embodiments, the third party links data field 826 may include data indicative of social networks that may access data of the data structure 802. Additionally or alternatively, the contacts list 828 may include one or more users connected to the user of the user accounts 802 for facilitating transferring data between the users.

In connection with the product record of the data structure 804, the product identifier data field 830 may correspond to data usable to identify a product. For example, each product of a vendor may have a unique product name or code to identify the corresponding product record. In this way, the product name or code may be matched to the product identifier data field 830 to determine whether or not the data structure 804 corresponds to a particular product. The attributes array 834 may correspond to one or more attributes of the corresponding product. Example attributes may include one or more of material type, sale descriptors, country of origin descriptors, color descriptors, style descriptors, and the like. In one example embodiment, attributes may be given as a pair of attribute name and attribute value. For instance, one example attributes pair included in the data structure 804 may correspond to the pair (Sale, 30%), wherein the string "Sale" may represent the name of the attribute (e.g., a sale-type attribute) and the value 30% represents the value of the attribute (e.g., the product is on sale at a 30% discount).

The image data array 836 may correspond to one or more data structures that include data for generating model data of a digital avatar. For example, the element 838 of the image data array 836 may include data for rendering a digital avatar of a selected user wearing a selected product. In the illustrated embodiment, the example element 838 may include the attributes data field 840 and one or more view data fields 842-846. The attributes data field 840 may include data that is indicative of attributes or properties shared by the view data fields 842-846. Example of attributes or properties of the attributes data field 840 include size data of the product, size data of the digital avatar wearing the product, product variation (e.g., color), and the like. Different elements of the image data array 836 may correspond to different variations of the product model.

The one or more view data fields 842-846 may include data for rendering one or more versions of a digital avatar wearing the corresponding product. For example, the view data field 842 may correspond to a front facing view of the avatar rendered product, view2 data field 844 may correspond to a side facing view of the avatar rendered product, and so on.

In connection with the vendor account of the data structure 806, the vendor identifier data field 850 may correspond to data usable to identify a vendor. For example, each vendor may have a unique vendor name or code to identify the corresponding vendor account. In this way, the vendor name or code may be matched to the data field 850 to determine whether or not the data structure 806 corresponds to a particular vendor. Moreover, the authentication data field 852 may include data for verifying and validating the vendor. In one embodiment, the authentication data field 852 may correspond to data for determining whether or not vendor login data (e.g., a vendor name and password pair) matches the expected login data.

The inventory data field 854 may correspond to data indicative of the product records associated with the corresponding vendor. For example, the inventory data field 854 may be an array of product records, or pointers to product records, in accordance with data structure 804. The linking data field 856 may correspond to data indicative of users and/or third parties linked to the corresponding vendor. For example, users may connect to the vendor account via a social network or through the vendor's or the digital avatar system's website. Third parties may connect to the vendor account through the vendor's or the digital avatar system's website in order to provide or receive digital avatar services.

Example Image Processing for Measurements and Sizing

FIGS. 9A-D and 10 are schematic diagrams illustrating example image templates for a digital avatar system, in accordance with example embodiments. FIGS. 9A-D illustrate example templates 902, 904, 906, 908 of body poses for images to be uploaded to the digital avatar system 500. Each template 902-908 is associated with one or more POIs 912-968, as will be described below. The graphics processing module 506 of FIG. 5 may overlay a template onto an image of the user to determine the POI locations of the image of the user. In an example embodiment, the templates data may include one or more parameters (e.g., parameters A-K described later in connection with FIG. 9A) to adjust the shape of the templates to match the images of the user.

Figure 9A:
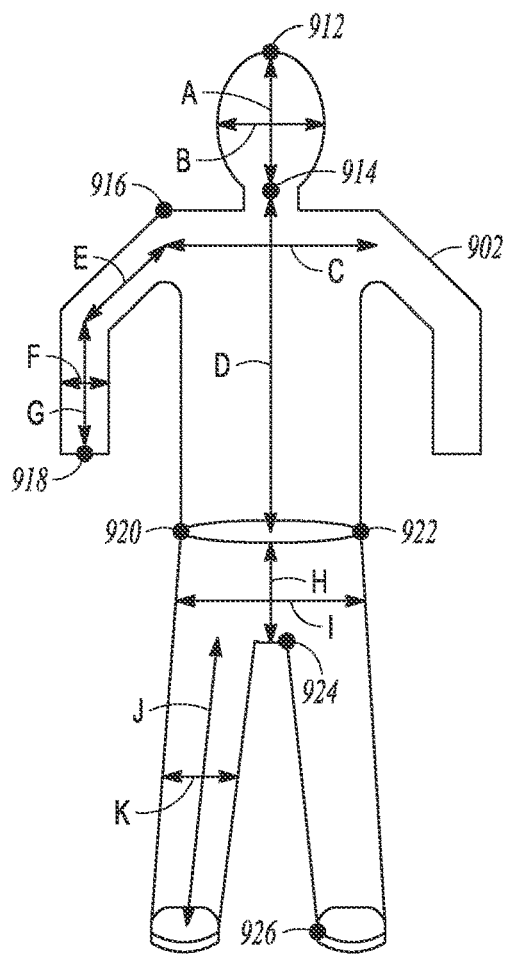
FIGS. 9A-D and 10 are schematic diagrams illustrating example image templates for a digital avatar system, in accordance with example embodiments.

With reference to FIG. 9A, the example template 902 may correspond to a full-body front view. The template 902 may be associated with POIs 912-926. In particular, the POI 912 may correspond to the top of the user's head. The POI 914 may correspond to the bottom of the user's head (e.g., the bottom of the chin). The POI 916 may correspond to a shoulder. The POI 918 may correspond to a tip of the user's finger. In an alternative embodiment, the POI 918 may correspond to a wrist of the user. The POIs 920, 922 may correspond to two points representing the side-to-side width of the hips. The POI 924 may correspond to a lower crotch point or to the drop of the user's pants. The POI 926 may correspond to the bottom of the pant cuff, ankle, top of the shoe, or the like locations. The distance between the POIs 912 and 926 may be indicative of the user's height.

In an example embodiment, the shape of the template 902 may be adjusted by parameters A-K to adapt to variations in postures and body type. For example, the lengths of parameters A and B may be adjusted to match the head of the user. The length of parameter C may be adjusted to adjust the width of the shoulder of the template. The length of parameter D may be adjusted to change the length of the torso of the template. The lengths of parameters E, F, G may be adjusted to change the length and width of the arm of the template. Moreover, the angles between parameters C, E, F may be adjusted to change the posture of the arm. The parameter H may be adjusted to change the drop of the pants of the template. The parameter I may be adjusted to change the width of the hips of the template. The parameters J, K may be adjusted to change the length and the width of the leg of the template. Moreover, the angles between parameters H, J, K may be adjusted to change the posture of the leg. In another example embodiment, the shape of the left arm and the left leg may also be defined by parameters (not shown) in a similar manner as described in connection with the parameters of the right arm and right leg.

Figure 9B:
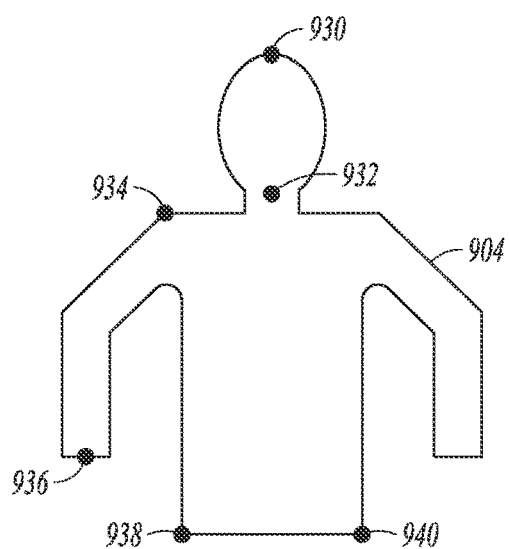

With reference to FIG. 9B, the example template 904 may correspond to a waist-up front view. The template 904 may be associated with POIs 930-940. In particular, the POI 930 may correspond to the top of the user's head. The POI 932 may correspond to the bottom of the user's head (e.g., the bottom of the chin). The POI 934 may correspond to a shoulder. The POI 936 may correspond to a tip of the user's finger. In an alternative embodiment, the POI 936 may correspond to a wrist of the user. The POIs 938, 940 may correspond to two points representing a width of the hips.

Figure 9C:
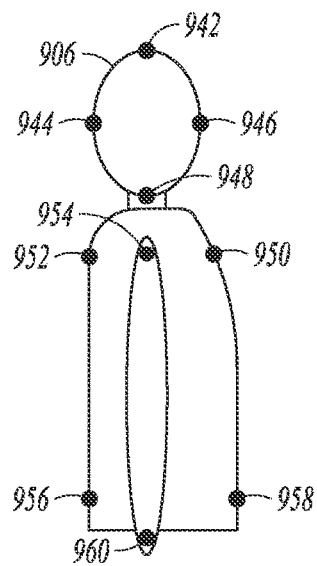

With reference to FIG. 9C, the example template 906 may correspond to a waist-up side view. The template 906 may be associated with POIs 942-960. In particular, the POI 942 may correspond to the top of the user's head. The POIs 944-946 may correspond to the back and front of the user's head. The POI 948 may correspond to the bottom of the user's head (e.g., the bottom of the chin). The POIs 950, 952 may correspond to the front-to-back width of the chest. The POI 954 may correspond to a shoulder. The POIs 956, 958 may correspond to the front-to-back width of the waist. The POI 960 may correspond to a tip of the user's finger. In an alternative embodiment, the POI 960 may correspond to a wrist of the user.

Figure 9D:
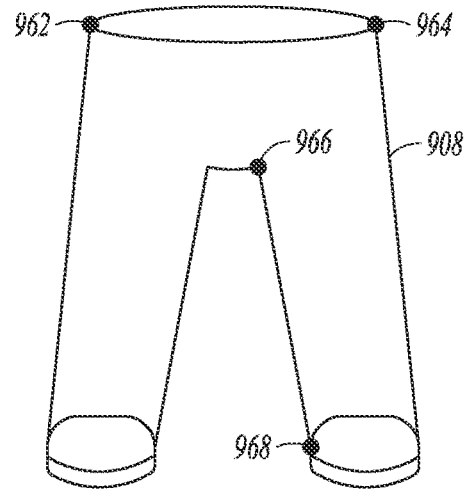

With reference to FIG. 9D, the example template 908 may correspond to a waist-down front view. The template 908 may be associated with POIs 962-968. In particular, the POIs 962, 964 may correspond to two points representing the side-to-side width of the hips. The POI 966 may correspond to a lower crotch point or to the drop of the user's pants. The POI 968 may correspond to the bottom of the pant cuff, ankle, top of the shoe, or the like locations.

One or more POI locations of one template may correspond to POI locations of another template. For example, in the illustrated example embodiment of FIG. 9, each of the templates 902-908 share at least two POIs with another template. In particular, the POIs 912-922 of the template 902 correspond to respective POIs 930-940 of template 904. Accordingly, the scale of one image may be used to determine a scale of another image. As stated, the scale of the first image may be determined based on a reference characteristic provided as input by the user.

Figure 10:
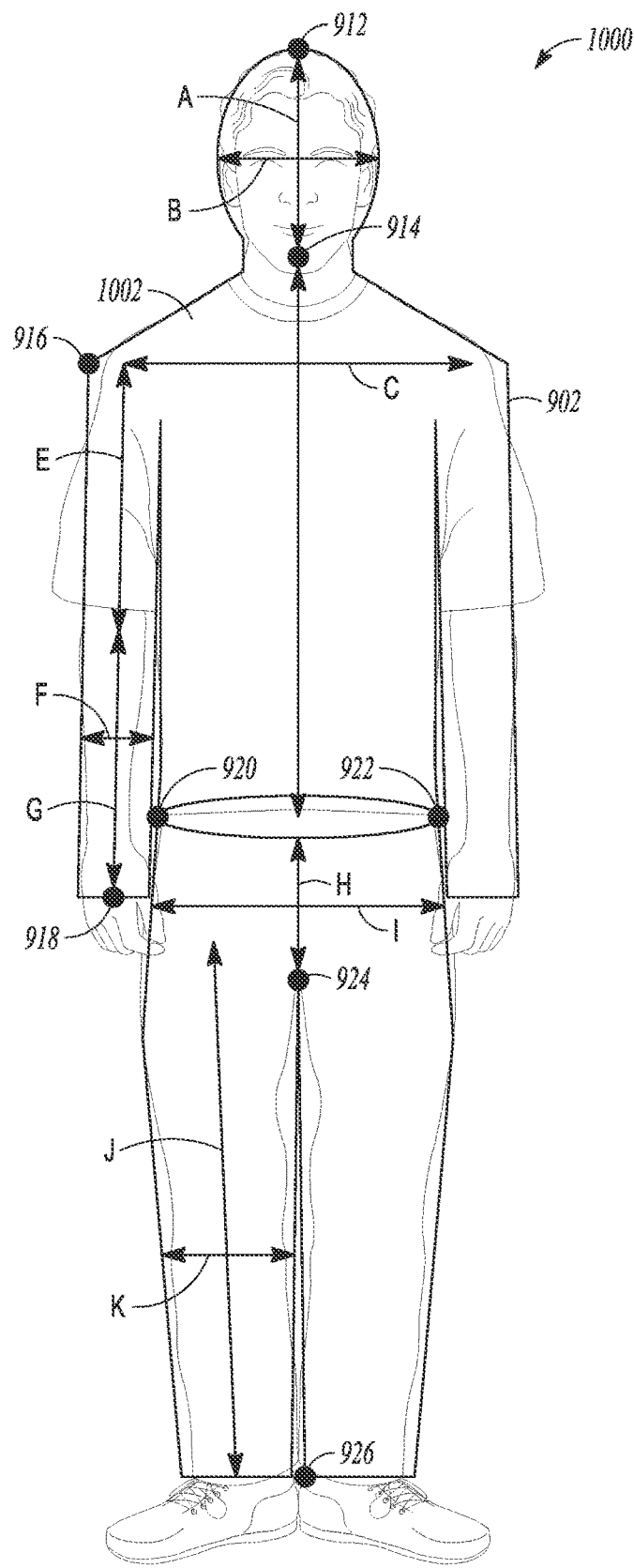

FIG. 10 illustrates a diagram 1000 of an example template 902 applied to an image 1002 uploaded to the digital avatar system 500, in accordance with an example embodiment. Elements common to FIGS. 9A and 10 share common reference indicia, and only differences between the figures are described herein for the sake of brevity. As shown, the lengths and angles of the parameters A-K of template 902 have been adjusted from FIG. 9A to create a close match between the template 902 and the image 1002 of the user. For example, the digital avatar system 500 may receive image data from the application interface module(s) 502 of FIG. 5. The graphics processing module(s) 506 may access the image data and access template data from the data structure 700 of FIG. 7 using the data access sub-module 608. Using the object recognition sub-module(s) 606 of FIG. 6, the graphics processing module(s) 506 may adjust the parameters of the template 902 so that the edges of the template closely matches the edges of the image of the user. The graphics processing module(s) 506 may determine the edges of the user by using an edge detection process and a search or optimization process to adjust the parameters A-K. For example, the parameters A-K may be selected so that a mean square error of the distances between the edges of the template 902 and the edges of the user is below a predetermined threshold.

Figure 11:
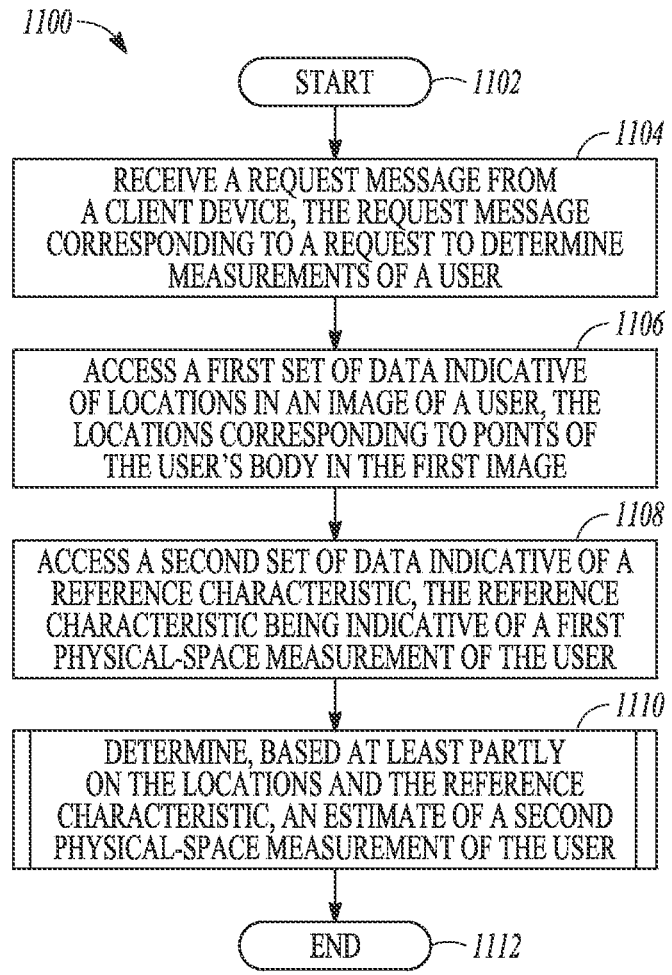
FIG. 11 is a flowchart illustrating an example method of determining estimates of a physical-space measurement of a user, in accordance with an example embodiment.

FIG. 11 is a flowchart illustrating an example method 1100 of determining estimates of a physical-space measurement of a user, in accordance with an example embodiment. In this example, the method 1100 may include operations such as receiving a request message (block 1104), accessing a first set of data that is indicative of POI locations within the first image of the user (block 1106), accessing a second set of data that is indicative of a reference characteristic (block 1108), and determining an estimate of a measurement of the user (block 1110). The example method 1100 will be described below, by way of explanation, as being performed by certain modules. It will be appreciated, however, that the operations of the example method 1100 can be performed in any suitable order by any number of the modules shown in FIGS. 5 and 6.

The method 1100 starts at block 1102 and proceeds to block 1104 for receiving a first request message from a client device. The request message may correspond to a request to determine measurements of the user. Example measurements include body measurements and/or clothing sizes of the user. For example, in an example embodiment, the application interface module(s) 502 of the digital avatar system 500 of FIG. 5 may receive the first request message from the client machine 110 OF FIG. 1, rendering a user interface for creating a user account.

At block 1106, the method 1100 may include accessing a first set of data that is indicative of locations within a first image of the user. As stated, the POI locations may correspond to predetermined points of the user's body in the first image. The accessing of the first set of data may include determining the POI location data from image data and/or accessing a data storage device storing computed POI location data.

In operation, the graphics engine sub-module(s) 602 may access the first set of data which may be stored in the POI location data field 708 of FIG. 7. The accessing of the first set of data may be responsive to the graphics engine sub-module(s) 602 receiving an indication of the request message, from a user, for determining measurements of the user. An example method of generating POI location data will be described in further detail later in connection with FIG. 13.

At block 1108, the method 1100 may include accessing a second set of data that is indicative of a reference characteristic. For example, the graphics engine sub-module(s) 602 may access the second set of data which may be stored in the user image data field 710 of FIG. 7. The accessing of the second set of data may be responsive to the graphics engine sub-module(s) 602 receiving the indication of the request message. As stated, the reference characteristic may be indicative of a first physical space measurement of the user, such as at least one of the user's height and/or weight, and may be received as a user input. For example, the digital avatar system 500 may receive the reference characteristic input from the client machine 110 via a user interface. An example user interface will be described in greater detail later in connection with FIG. 17.

At block 1110, the method 1100 may include determining an estimate of a physical space measurement of the user. For example, the graphics engine sub-module(s) 602 may use the computational sub-module(s) 604 to determine the estimates of the user's measurements based on the distances between two or more of the POI locations and based on the reference characteristic accessed at blocks 1106, 1108. The estimates of the physical-space measurements may include body measurements and/or clothing sizes, given in the physical frame of reference (e.g., not a virtual or image-space frame of reference). A method of block 1110 will be described in greater detail later in connection with FIG. 12. At block 1112, the method 1100 may end.

Figure 12:
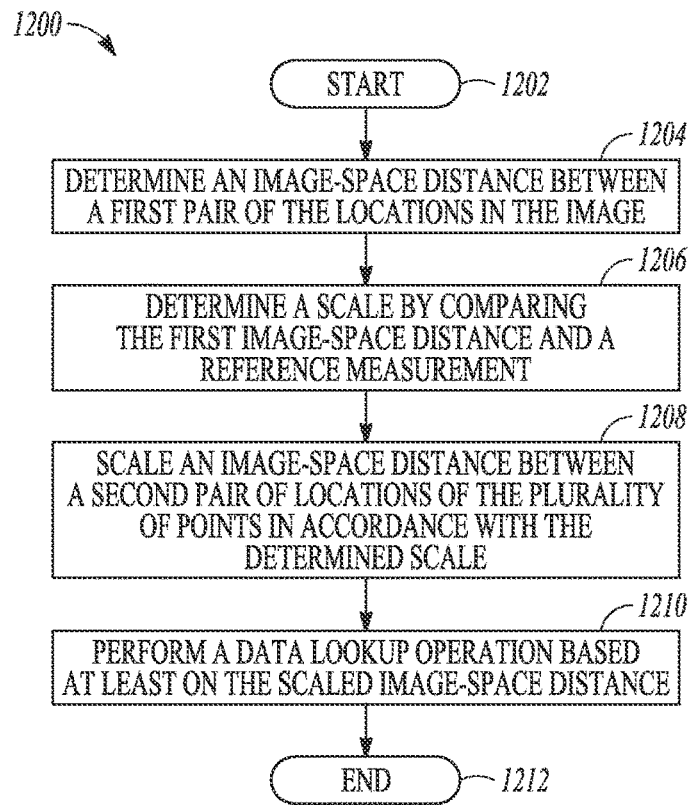
FIG. 12 is a flowchart illustrating an example method of determining estimates of a physical-space measurement of a user based at least on image data of the user, in accordance with an example embodiment.

FIG. 12 is a flowchart illustrating an example method 1200 of determining estimates of a physical-space measurement of a user based at least on image data of the user, in accordance with an example embodiment. The example method 1200 may correspond to the block 110 of FIG. 11. In this example, the method 1200 may include operations such as determining an image-space distance between a first pair of POI locations (block 1204), determining a scale for the POI locations based on the image-space distance and a reference characteristic (block 1206), scaling an image-space distance between a second pair of locations in accordance with the determined scale (block 1208), and performing a data lookup operation based on the scaled image-space distance (block 1210). The example method 1200 will be described below, by way of explanation, as being performed by certain modules. It will be appreciated, however, that the operations of the example method 1200 can be performed in any suitable order by any number of the modules shown in FIGS. 5 and 6.

The method 1200 starts at block 1202 and proceeds to block 1204 for determining an image-space distance between a first pair of locations of the image. For example, the graphics engine sub-module(s) 602 may select the first pair of POI locations from a plurality of POI locations that were determined by processing the image (e.g., as will be described in greater detail later in connection with FIG. 13). The pair of POI locations may correspond to a body measurement having a relationship with the reference characteristic. The graphics engine sub-module(s) 602 may pass the selected pair of POI locations to the computational sub-module(s) 604 to compute the distance in the image space between the pair of POI locations. The distance may be computed based on a Euclidean norm, as one non-limiting example. It will be appreciated that in alternative embodiments that any suitable measures of distance or norm on the image space may be used.

At block 1206, the method 1200 may include determining a scale by comparing the image space distance and a reference characteristic. For example, the graphics engine sub-module(s) 602 may utilize a relationship between the distance $[D_1]_{image}$ between the first pair of POI locations and the reference characteristic R to the scale c. For example, the image-space distance $[D_1]_{image}$ and the reference characteristic R may describe the same distance but in different spaces (e.g., in the image space and the physical space, respectively). Accordingly, the scale c of the image space in terms of a physical space unit may be approximated by the following equation:

$$C = R/[D_1]_{image}. \qquad (Eqn. 2)$$

Accordingly, a distance $[d]_{image}$ in the image space may be converted to a distance $[d]_{physical}$ in the physical space by performing the calculation:

$$[d]_{physical} = c[d]_{image}. \qquad (Eqn. 3)$$

At block 1208, the method 1200 may include scaling an image space distance between a second pair of POI locations of the image. The scaling may be in accordance with the scale determined at block 1206. In an example embodiment, the graphics engine sub-module(s) 602 may use the computational sub-module(s) 604 to scale one or more pairs of the POI locations to convert the distances from image-space units to physical-space units to estimate user measurements, in accordance with Equation 3.

In an example embodiment, estimates of user measurements may be determined based on a plurality of images. As such, the reference characteristic may be used to determine a scale of a first image, and scales for the remaining images may be determined based on the reference characteristic of the first image, based on other reference characteristics provided as input, or based on other reference characteristics determined from the images, as will be described below. Using multiple images may serve to provide data for estimating measurements that a two-dimensional image would not be able to provide.

For example, a reference characteristic $R_2$ of a second image may be determined based on an estimate of a physical-space distance $[d_1]_{physical}$ between two POI locations of the first image. That is, the reference characteristic $R_2$ of the second image may be approximately $R_2 = [d_1]_{physical}$. Furthermore, the first and second images may have a pair of POIs in common such that a scale $C_2$ of the second image may be approximated in accordance with the following equation:

$$c_2 = R_2/[D_1]_{image2}. \qquad (Eqn. 4)$$

In Equation 4, as stated above, the parameter $R_2$ denotes the distance of the reference characteristic in a physical-space unit; and $[D_1]_{image2}$ denotes the distance between a first pair of POI locations in the second image space. Accordingly, a distance $[d]_{image2}$ in the image space of the second image may be converted to a distance $[d]_{physical}$ in the physical space by performing the calculation:

$$[d]_{physical} = C[d]_{image2}. \qquad (Eqn. 5)$$

By way of further description, in an example embodiment, the graphics engine sub-module(s) 602 may match the template 902 to a first image, the template 904 to a second image, the template 906 to a third image, and the template 908 to a fourth image. The templates 902, 904 have POIs in common, such as POIs 912, 914 of the template 902 being in common with POIs 930, 932 of the template 904. The estimate of the physical-space distance between POIs 912, 914 of the first image may serve as a reference characteristic for the second image via POIs 930, 932, in accordance with Equations 4 and 5. Accordingly, the graphics engine sub-module(s) 602 may access, in response to receiving the request message, a third set of data that is indicative of POI locations within a second image of the user.

Likewise, the estimate of the physical-space distance between POIs 912, 914 of the first image may serve as a reference characteristic for the third image via POIs 942, 948. Furthermore, the estimate of the physical-space distance between POIs 920, 922 of the first image (or, alternatively, the second image) may serve as a reference characteristic for each of the fourth image (via POIs 962, 964). It will be appreciated that in alternative embodiments, any common POIs of two images may serve as a basis for a reference characteristic of one of the images.

At block 1210, the method 1200 may include performing a data lookup operation based at least on the scaled image space distance. For example, the graphics engine sub-module(s) 602 may use the data access sub-module 608 to access the measurements-to-sizes mapping data field 704 of the data structure 700 of FIG. 7. Furthermore, the graphics engine sub-module(s) 602 may select a row of the lookup table 714 by matching the estimates of the user measurements that were determined at block 1208 to the columns 716-720. In one embodiment, the row having the columns

716-720 that most closely match (e.g., in terms of absolute error) may be selected by the graphics engine sub-module(s) 602. Accordingly, the corresponding columns 722 through 724 of the selected row may serve as an estimate of clothing sizes (e.g., which is a second type of physical space measurement of the user). At block 1212, the method 1200 may end.

Figure 13:
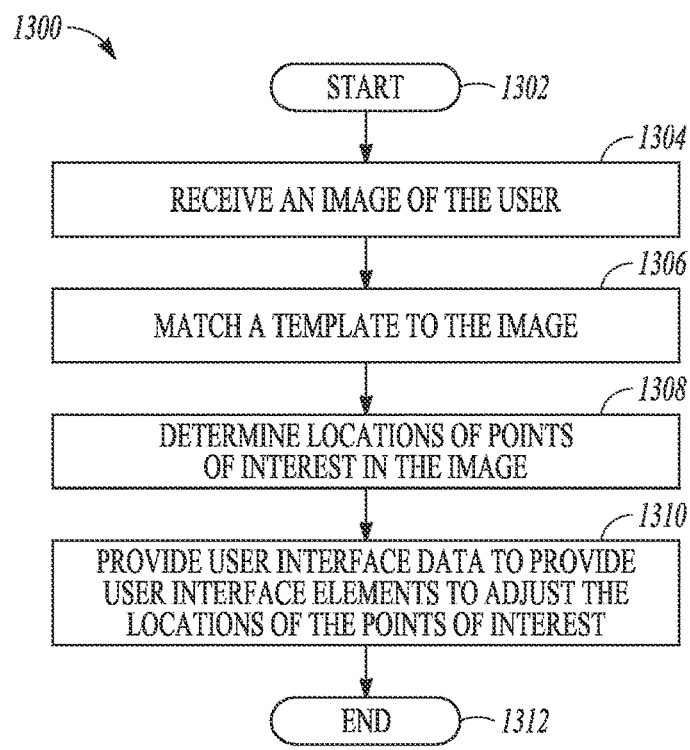
FIG. 13 is a flowchart illustrating an example method of determining points of interest within an image, in accordance with an example embodiment.

FIG. 13 is a flowchart illustrating an example method 1300 of determining locations of POIs within an image, in accordance with an example embodiment. In this example, the method 1300 and may include operations such as receiving in the image of the user (block 1304), matching a template to the image (block 1306), determining locations of POIs in the first image (block 1308), and providing user interface data for user interface elements to adjust the locations of the POI locations (block 1310). The example method 1300 will be described below, by way of explanation, as being performed by certain modules. It will be appreciated, however, that the operations of the example method 1300 can be performed in any suitable order by any number of the modules shown in FIGS. 5 and 6.

The method 1300 starts at block 1302 and proceeds to block 1304 for receiving in the image of the user. For example, the application interface module(s) 502 may receive image data from the user interface rendered on a client machine 110. The image data may correspond to one or more images uploaded by the user, as will be described later in greater detail in connection with FIG. 15-16.

At block 1306, the method 1300 may include matching a template to the image. For example, responsive to receiving a first set of image data, the graphics engine sub-module(s) 602 may access the template data field 706 to retrieve data corresponding to a first template, for example one of templates 902, 904, 906, 908 of FIGS. 9A-D. The selection of the template may be based on the view-type of the image being processed (e.g., based on the image being a full-body front view, a side view, a waist-up front view, a waist down front view, etc.). Furthermore, the graphics engine sub-module(s) 602 may pass the image data and the template data to the object recognition sub-module(s) 606 to match the template to the image data.

The objection recognition sub-module(s) 606 may match the template to the image data so that the template is aligned with features of the image. Accordingly, the objection recognition sub-module(s) 606 may perform feature detection processes to determine one or more features of the user in the image. Features may include POIs of the image or other features of a human, which may be detected based on, but are not limited to, detection of edges, intersections, corners, geometric shapes, ridges, and/or the like structures suitable for discerning features of a person in an image. The user may be posed in known ways in order to facilitate and improve feature detection. The objection recognition sub-module(s) 606 may align the detected features with features and/or POIs of the template. As stated, the template may include parameters which the objection recognition sub-module(s) 606 may adjust in order to improve the match of the template to the detected features of the image. It will be appreciated that object recognition services may be performed by the digital avatar system 500 or by a third party (e.g., via a third-party facing sub-module(s) 518 of the application interface module(s) 502 of FIG. 5).

In an example embodiment, facial recognition may be used to facilitate detection of non-facial features of the image. For example, detection of the location and orientation of the user's face may provide an initial search state for detecting related features based on the structure of the human body. For example, the object recognition sub-module(s) 606 may search a region of the image just below the face to search for body features. In a more example, the object recognition sub-module(s) 606 may search a portion immediately below the detected face to search for neck features.

At block 1308, the method 1300 may include determining locations of POIs in the first image. For example, the graphics engine sub-module(s) 602 may determine the locations of the POIs based on the matching of block 1306. For instance, the POI locations may be determined as the position of the POIs of the template with respect to the image data, where for example, the coordinates of the POIs of the template may be in the image space. After the graphics engine sub-module(s) 602 determines the POI location, the corresponding data may be stored in the POI location data field 708 of the data structure 700 by the data access sub-module 608.

At block 1310, the method 1300 may include providing user interface data to provide user interface elements to adjust the locations of the POI locations. For example, the application interface module(s) 502 may provide the client machine 110 of the user data for rendering user interface elements for displaying the locations of the POI superposed on the image of the user. The user interface elements may be selectable and movable based on user input in order to adjust the positioning of the POI locations. In response to user input corresponding to moving the POI locations, the client machine 110 may provide the digital avatar system 500 data via the application interface module(s) 502 for updating the POI locations. In response, the graphics engine sub-module(s) 602 may use the data access sub-module 608 to update the POI location data field 708 in accordance with the user input. As a result, accuracy of the user measurements may be improved. User adjustment of the POI locations will be described later in connection with FIG. 16. At block 1312, the method 1300 may end.

Example User Interfaces for User Accounts

FIGS. 14-20 are interface diagrams illustrating example user interfaces with multiple display elements delivered to a client device for managing user accounts, according to example embodiments. As illustrated in FIGS. 14-20, the user interfaces may be presented to a user on the display of a client device (e.g., client machine 110). In particular, the user interface 1400 may be rendered on the display 210 of the mobile device of FIG. 2. The display 210 may correspond to a touch sensitive liquid crystal display (LCD) on which the user may select elements of the user interface 1400 by touching the display 210. Moreover, the user may utilize the I/O devices 212 of the mobile device 200 to navigate to a previous user interface. Although FIGS. 14-20 will be described in the context of user interfaces displayed on a mobile phone, it will be appreciated that the user interfaces may be displayed on other types of devices such as a desktop computer, laptop computer, or mobile computing device connected to the network 104.

In the illustrated example embodiment of FIG. 14, the user interface 1400 corresponds to a graphical user interface of a webpage or software application executing on the client device that allows the user to initiate a process to create a user account, such as an account corresponding to the data structure 802 of FIG. 8. In one example embodiment, the user interface 1400 may correspond to the display of a webpage provided by the digital avatar system 500 of FIG. 5.

Figure 16:
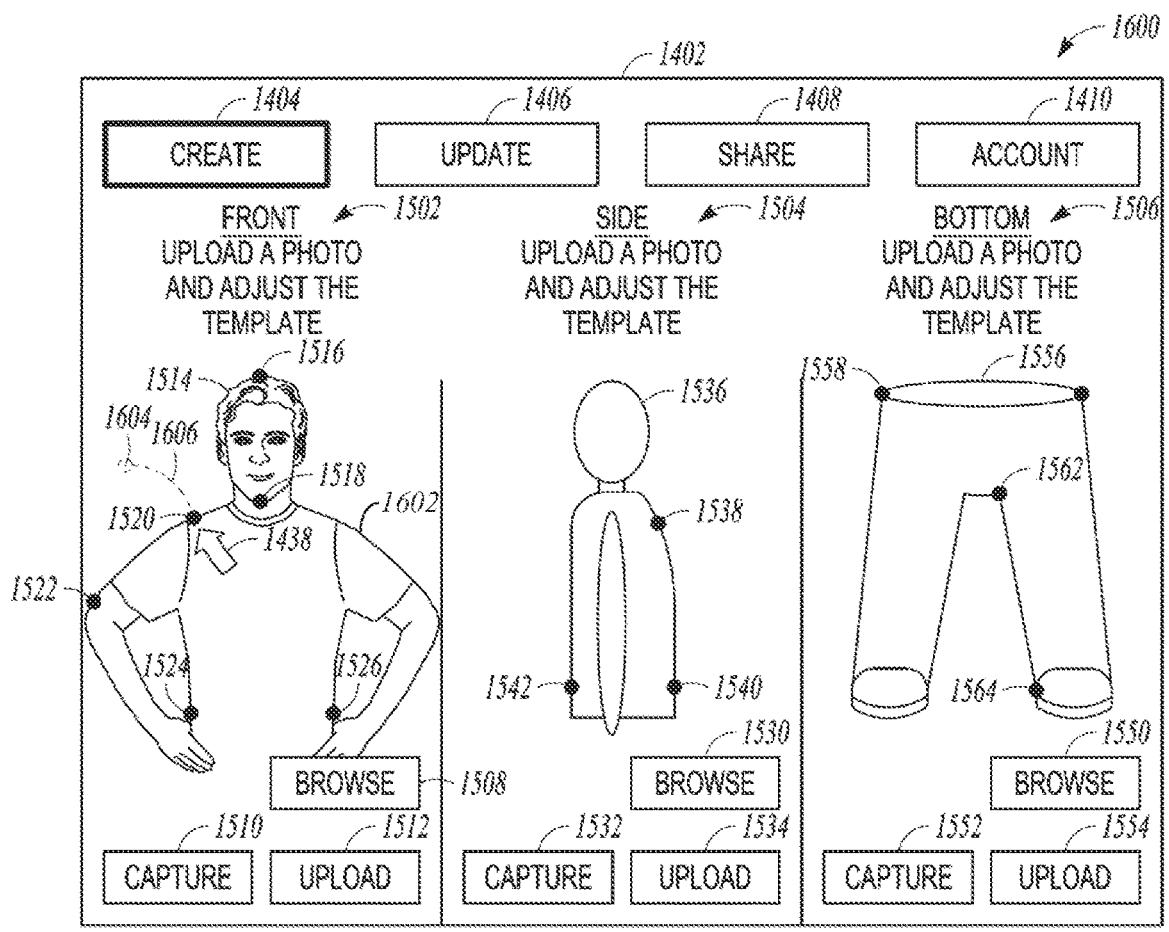
Figure 17:
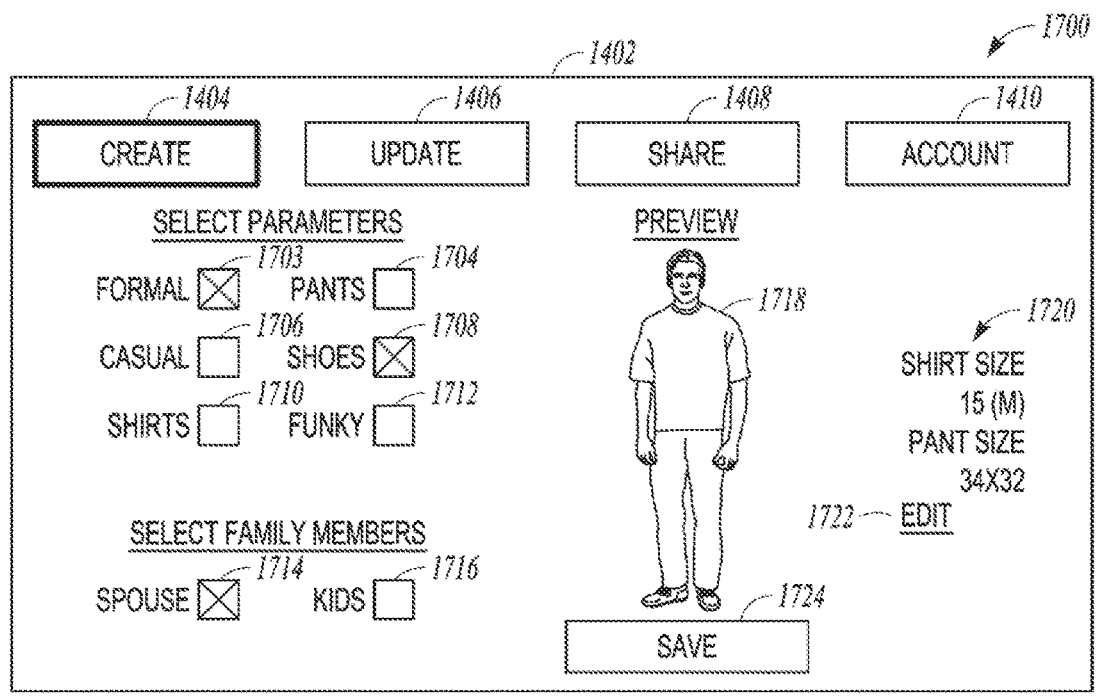

The user interface 1400 includes a frame 1402, which may include user interface elements 1404-1436, and a pointer 1438 to interact with the elements 1404-1436. The user interface elements 1404, 1406, 1408, 1410 may correspond to display elements or control elements associated with functions of a digital avatar website or application. For example, in the illustrated example, the elements 1404, 1406, 1408, 1410 indicate that the user interface 1400 is for creating a user account (e.g., element 1404), updating a user account (e.g., element 1406), sharing a user account (e.g., element 1408), managing account information (e.g., element 1410). In operation, a graphical indication may indicate which one of the elements 1404-1410 is active. For example, the element 1404 of FIG. 14 is highlighted to indicate that the user interface 1400 corresponds to an interface for creating a user account. FIGS. 15, 16, and 17 show additional user interfaces that may be used in connection with creating a user account. User interfaces for updating a user account (e.g., in connection with element 1406) may be similar to the user interfaces 1600, 1700, 1800, 1900, 2000. Moreover, user interfaces for the functions corresponding to elements 1408, 1410 will be described later in greater detail in connection with FIGS. 18 and 20. If the elements 1404-1410 correspond to control elements, then the user may select one of the control elements 1404-1410 to switch to another function.

The elements 1412-1420 may receive user input that is indicative of personal information to configure the user's account. For example, in the illustrated embodiment, the user may input the user's name, an email address, a mailing address, a phone number, and a password in respective text boxes. In an example embodiment, one or more of the elements 1412-1420 may be designated as being required input (e.g., such as the user's name, email, address, and password; as indicated by an asterisks) or optional input (e.g., phone #). In an alternative embodiment, more or less information may be provided and more or less information may be required input.

The elements 1422, 1424 may receive user input that is indicative of the user's gender. For example, in operation, the user may position the pointer 1438 over a selected one of the elements 1422, 1424 to select male or female. The element 1426 may correspond to a control element for receiving user input that is indicative of the user's age. In the illustrated embodiment, the control element 1426 may correspond to a drop-down menu for selecting the range of ages. In alternative embodiments, the control element 1426 may instead correspond to a text box in which the user may provide user input that is indicative of the user's age or date of birth. The elements 1428, 1430 may receive user input that is indicative of the user's height. The element 1434 may receive user input that is indicative of the user's weight. The element 1436 may receive user input that is indicative of a request to accept the user input received by the elements 1412-1434 and to proceed to the next user interface.

Although the elements 1412-1436 are shown as corresponding to various types of user interface elements—such as, but not limited to, text boxes, drop-down menus, and/or buttons—it will be appreciated that in alternative embodiments the elements 1412-1436 may be any suitable type of user interface element for receiving the corresponding user input.

FIG. 15 illustrates an example user interface 1500 of a webpage or software application executing on a client device (e.g., client machine 110 of FIG. 1) which may facilitate providing user measurement data as part of the process of creating a user account, such as an account corresponding to the data structure 802 of FIG. 8. In one example embodiment, the user interface 1500 may correspond to a user interface provided by the digital avatar system 500 of FIG. 5 in response to a user selecting interface element 1436 of FIG. 14. Elements common to the interfaces of FIGS. 14 and 15 share common reference indicia, and only differences between the interfaces are described herein for the sake of brevity.

In the illustrated embodiment of the user interface 1500, the frame 1402 may include elements 1404-1410 and sub-frames 1502, 1504, 1506. The sub-frame 1502 may include user interface elements 1508-1526. The sub-frame 1504 may include user interface elements 1530-1542. The sub-frame 1506 may include user interface elements 1550-1564.

The sub-frames 1502, 1504, 1506 may receive user inputs for determining measurements of the user and/or image data of the user. The user inputs may correspond to one or more images of the user, for example, posed in accordance respective templates. For example, the sub-frame 1502 may prompt the user to provide a first image of the user facing the camera and posed as shown by template 1514. In an alternative embodiment, a template may include a full-body view. The sub-frame 1504 may prompt the user to provide a second photo of the user showing a side view of the user in accordance with template 1536. The sub-frame 1506 may prompt the user to provide a third photo of the user showing a waist-down view of the user in accordance with template 1556. To facilitate providing the images, the user interface 1500 may provide elements 1508, 1530, 1550 for browsing a file system for a file to be uploaded to the digital avatar system 500.

Additionally or alternatively, the user interface 1500 may provide elements 1510, 1532, 1552 for capturing a new image of the user in order to provide image data for the respective sub-frames 1502, 1504, 1506. For example, in response to the user selecting the capture element 1510, a camera may be activated for capturing images or a video of the user, and the images or video may be displayed in the sub-frame 1502 in substantially real time and with the template 1514 superimposed on the images or video. The user may then position the user's body to substantially match the template 1514, and an image from the images or video may be captured either automatically (e.g., detecting the user's pose matching the template 1514) or in response to a user input (e.g., by a voice command or by selecting the capture element 1510 a second time). As such, the interface 1500 may provide integrated image capturing capabilities. The capture elements 1532, 1552 may be configured in a similar way.

In operation, once images have been provided to the sub-frames 1502, 1504, 1506, one or more points (POIs) may be placed on the images for determining measurements. For example, sub-frame 1502 includes points 1516-1526 to be positioned on the front-view image of the user. The template 1536 of the sub-frame 1504 includes POIs 1538-1542 to be positioned on the side view image of the user. The template 1556 of the sub-frame 1506 includes POIs 1558-1564 to be positioned on the bottom-view image of the user. The distances between POIs and a reference measurement (the user's height and/or weight) may be indicative of one or more measurements of the user that are suitable for generating a digital avatar model. Positioning of the POIs will be described in greater detail later in connection with FIG. 16.

Additionally or alternatively, the user interface 1500 may provide elements 1512, 1534, 1554 for uploading the images provided to the sub-frames 1502, 1504, 1506, respectively. For example, in operation, the user may select the upload element 1512 after a front-view image has been selected and the POIs 1516-1526 have been positioned. When the image is uploaded, the digital avatar system 500 may determine measurements based on the distances between points 1516-1526. The upload elements 1534, 1554 may be configured in a similar way.

FIG. 16 illustrates an example user interface 1600 of a webpage or software application executing on a client device (e.g., client machine 110 of FIG. 1) which may facilitate providing user measurement data as part of the process of creating a user account, such as an account corresponding to the data structure 802 of FIG. 8. The user interface 1600 may correspond to the user interface 1500 of FIG. 15 in response to the user uploading an image to the sub-frame 1502. Elements common to the interfaces of FIGS. 14, 15, and 16 share common reference indicia, and only differences between the interfaces are described herein for the sake of brevity.

In the illustrated embodiment of the user interface 1600, the sub-frame 1502 may include an image 1602 of the user posed in accordance with the template 1514 of FIG. 15. As stated, the image 1602 may have been provided by the user by the user selecting the user interface element 1508 or the capture element 1510. In operation, the user may select the POIs 1516-1526 for positioning the points on the image 1602 of the user. For example, the illustrated embodiment shows that the user has selected the point 1520 and has moved the point 1520 from an initial position 1604 along a path 1606 to a shoulder point of the image 1602. After the POIs 1516-1526 have been positioned, the user may select the upload element 1512 for providing to the digital avatar system 500 the image 1602 and the positions of the points 1516-1526 relative to the image 1602.

FIG. 17 illustrates an example user interface 1700 of a webpage or software application executing on a client device (e.g., client machine 110 of FIG. 1) which may facilitate saving user account data as part of the process of creating a user account, such as an account corresponding to the data structure 802 of FIG. 8. The user interface 1700 may correspond to a user interface provided by the digital avatar system 500 in response to the user completing uploading images to the sub-frames 1502, 1504, 1506 of FIG. 15. Elements common to the interfaces of FIGS. 14 and 17 share common reference indicia, and only differences between the interfaces are described herein for the sake of brevity.

In the illustrated embodiment of the user interface 1700, the frame 1402 includes elements 1703-1724 for receiving user inputs that are indicative of user attributes and saving to the user account. For example, the elements 1703-1712 may receive user inputs that are indicative of one or more attributes to be applied to the user account. The attributes may correspond to preferences of the user. For example, in the illustrated embodiment, the user may select one or more categories indicating that the user prefers formal clothing (element 1703), pants (element 1704), casual clothing (element 1706), shoes (element 1708), shirts (element 1710), and/or funky clothing (element 1712).

Additionally or alternatively, the elements 1714, 1716 may receive user inputs that are indicative of relationships with other users. In the illustrated embodiment, for example, the element 1714 of the frame 1402 may receive user input for indicating that the user account and the user account of the user's spouse should be linked. Moreover, the element 1716 of the frame 1402 may receive user input for indicating that the user account and the user account of the user's children should be linked.

The frame 1402 may also display a preview of the digital avatar 1718 for confirmation and/or adjustment. As stated, the preview of the digital avatar 1718 may be generated by the digital avatar system 500 based on the distances between a plurality of points of one or more images of the user. Moreover, the frame 1402 may display a preview of the size information determined by the digital avatar system 500. For example, in the illustrated embodiment, the element 1720 displays the shirt size and pant size of the user as determined by the digital avatar system 500. The element 1722 may receive user input for editing the digital avatar 1718 or the size information element 1720. The element 1724 may receive user input for saving the avatar data to the user account.

Figure 18:
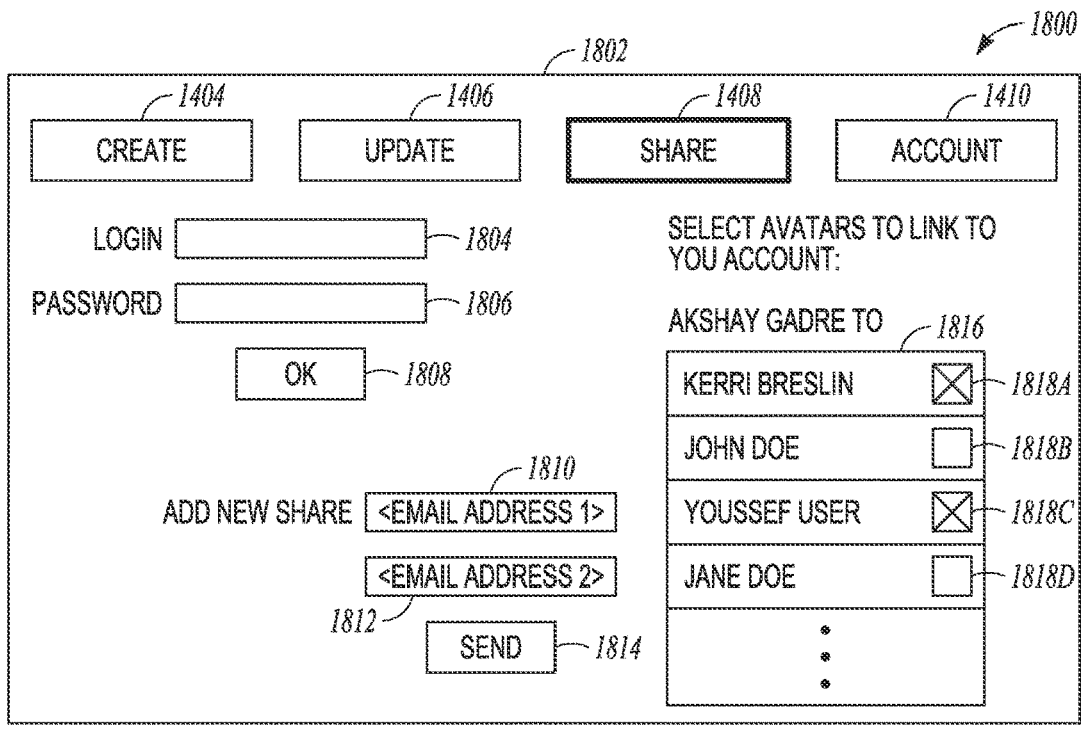

FIG. 18 illustrates an example user interface 1800 of a webpage or software application executing on a client device (e.g., client machine 110 of FIG. 1) which may facilitate sharing user accounts, such as accounts corresponding to the data structure 802 of FIG. 8. The user interface 1800 may include a frame 1802 having elements 1404-1410 and elements 1804-1816. Moreover, the element 1816 may correspond to a table comprising one or more rows 1818A-D. Elements common to the interfaces of FIGS. 14-18 share common reference indicia, and only differences between the interfaces are described herein for the sake of brevity.

The elements 1804, 1806 may receive user input that corresponds to login data for accessing a user account. For example, the user interface 1800 may receive user inputs indicative of a username and a password via the login element 1804 in the password element 1806, respectively. Selection of the element 1808 may cause the user interface 1800 to provide the login and password data to the digital avatar system 500 for authentication. If authentication is successful, the digital avatar system 500 may send user interface data to activate elements 1810-1816.

The elements 1810, 1812 may facilitate sharing user account data between users. For example the elements 1810, 1812 may receive user input indicative of one or more email addresses of other users. If the element 1814 receives user input that corresponds to a user selection of element 1814, the user interface 1800 may transmit the email address data to the digital avatar system 500 for linking the user account with the user accounts associated with the email addresses. In an example, linking the user account includes providing the users associated with the email addresses access to the user account. In another example, linking the user account includes sending the users associated with the email addresses a notification requesting permission for the user to access their user accounts.

The element 1816 of the frame 1802 may correspond to a table of one or more entries, each entry corresponding to a contact of the user. The contacts may correspond to contacts to whom the user has sent share requests via elements 1810, 1812, 1814 and/or contacts who have sent share requests to the user. Furthermore, the entries of the element 1816 may include respective user interface rows 1818A-D for receiving user input that is indicative of the user activating or deactivating the corresponding entry. Deactivating an entry of the element 1816 may correspond to disabling sharing with the corresponding contact (e.g., temporarily preventing access to user account data), and activating an entry of the element 1816 may correspond to enabling sharing with the corresponding contact (e.g., allowing access to user account data). In this way, the user may dynamically manage shared contacts.

Figure 19:
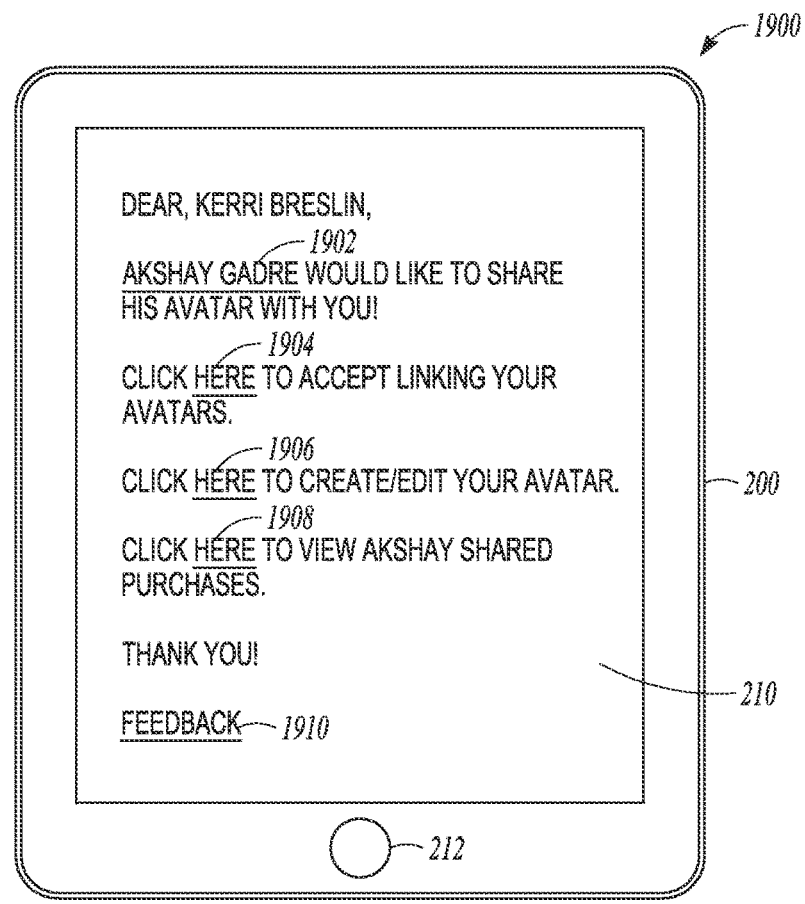

FIG. 19 illustrates an example user interface 1900 of a webpage or software application rendered on a client device (e.g., mobile phone 200 of FIG. 2 or any client machine 110 of FIG. 1) which may display a share request for a user. For example, the mobile phone 200 includes a display 210 and I/O button 212. The user interface 1900 may correspond to a notification sent to the mobile phone 200 in response to another user transmitting a share request. The notification may include one or more selectable elements, such as hyperlinks 1902-1910, for facilitating responses to the notification. The hyperlink 1902 may correspond to a link to a profile page of the requesting user ("Akshay Gadre"). The hyperlink 1904 may correspond to a link for accepting the share request. The hyperlink 1906 may correspond to a link for creating or editing the user's account. The hyperlink 1908 may correspond to a link for viewing shared purchases of the share request recipient and the share request sender. The hyperlink 1910 may correspond to a link to provide feedback to the digital avatar system 500.

Figure 20:
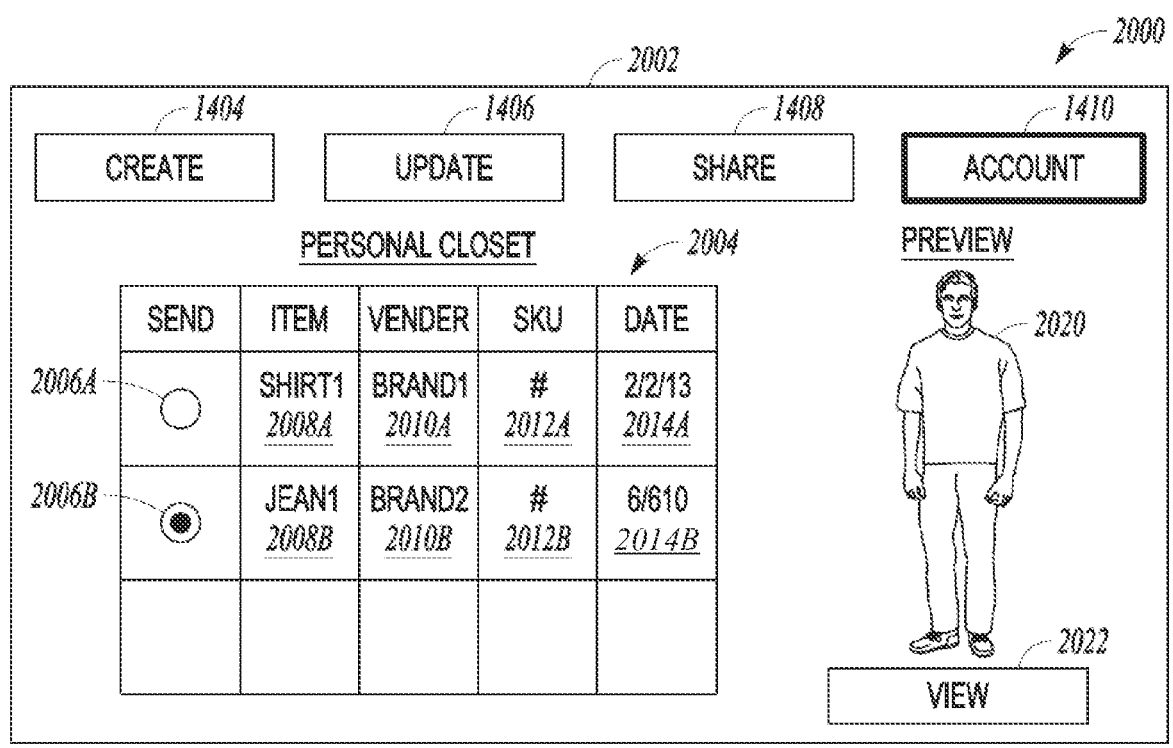

FIG. 20 illustrates an example user interface 2000 of a webpage or software application to be rendered on a client device (e.g., client machine 110 of FIG. 1) which may facilitate managing a user account, such as an account corresponding to the data structure 802 of FIG. 8. The user interface 2000 may include a frame 2002 having elements 1404-1410 and elements 2004 corresponding to a table of one or more rows formed by elements 2006A-2014A, 2006B-2014B. The frame 2002 may further include display element 2020 and a control element 2022.

The element 2004 may correspond to a personal closet of the user. The personal closet may include products that the user has purchased using the digital avatar system 500 and/or products that have been entered into the digital avatar system 500. Each product may have a corresponding row. For example, the row including the elements 2006A-2014A may represent a first product corresponding to a shirt, and the row including the elements 2006B-2014B may represent a second product corresponding to a pair of jeans. The elements 2006A, 2006B may receive user input that is indicative of selecting the corresponding product. The elements 2008A, 2008B may display text that describes the corresponding product. The elements 2010A, 2010B may provide text that is indicative of the vendor of the corresponding product. The elements 2012A, 2012B may provide text that is indicative of an identification number (e.g., stock keeping unit (SKU) number) of the corresponding product. The elements 2014A, 2014B may provide text that is indicative of the date on which the corresponding product was purchased or entered into the digital avatar system 500.

The display element 2020 of the frame 2002 may correspond to a preview of the digital avatar wearing the selected products from the table in element 2004 in accordance with the selection of the elements 2004A, 2004B and in response to the user selecting the control element 2022.

Example User Interfaces for Displaying Avatars

FIGS. 21-26 are interface diagrams illustrating example user interfaces with multiple display elements delivered to a client device for utilizing digital avatars, according to example embodiments. In particular, the user interfaces of FIGS. 21-26 may be provided by online marketplace servers, such as the marketplace application 120 of FIG. 1. The online marketplace servers may provide the user interfaces as part of the retailer's or vendor's website or application. Digital avatars may be displayed as part of the website or application to improve the user's shopping experience. Elements common to the user interfaces of FIGS. 21-26 share common reference indicia, and only differences between the user interfaces are described herein for the sake of brevity.

Figure 21:
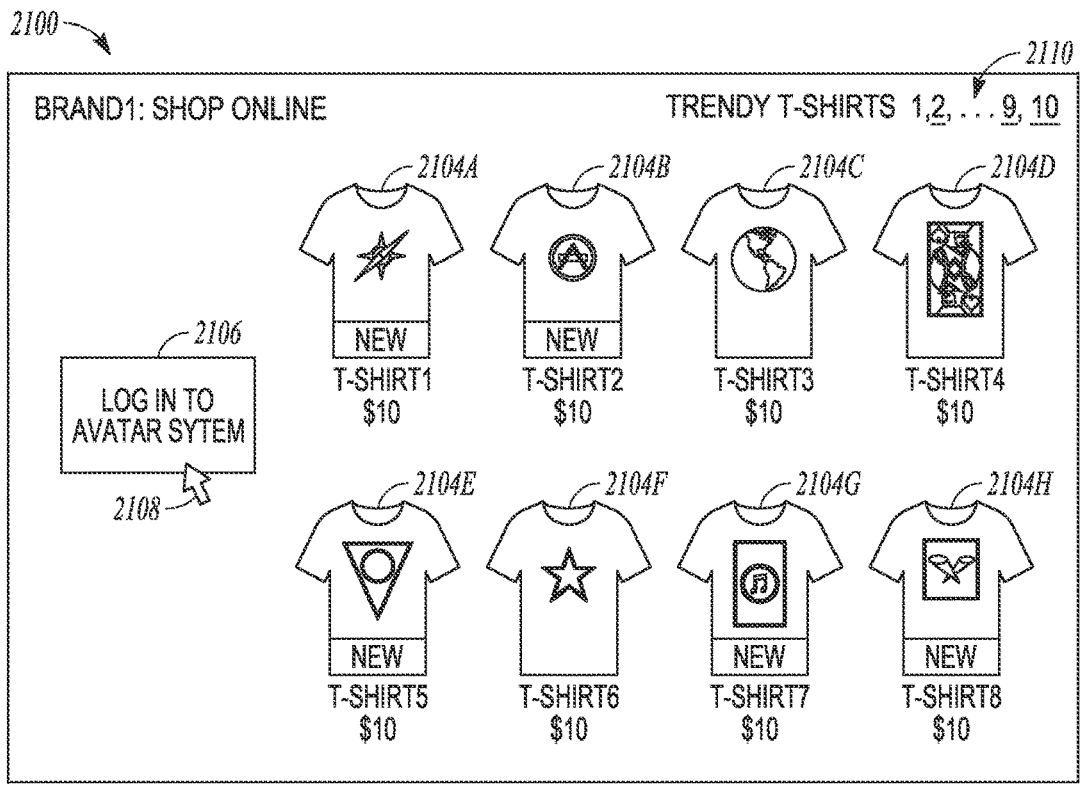
FIGS. 21-26 are interface diagrams illustrating example user interfaces with multiple display elements delivered to a client device for utilizing digital avatars, according to example embodiments.

FIG. 21 illustrates an example user interface 2100 of a webpage or software application of an online marketplace to be rendered on a client device (e.g., client machine 110 of FIG. 1). The user interface 2100 may include a frame having elements 2104A-2104H, 2106, 2108, 2110. The elements 2104A-H of the illustrated embodiment may correspond to various products (e.g., shirts) for purchase. The element 2106 may correspond to a button that is selectable for logging into the digital avatar system 500. The element 2108 may correspond to a pointer of an input device. The element 2110 may correspond to control elements used to navigate between a plurality of pages displaying products of the online marketplace.

Figure 22:
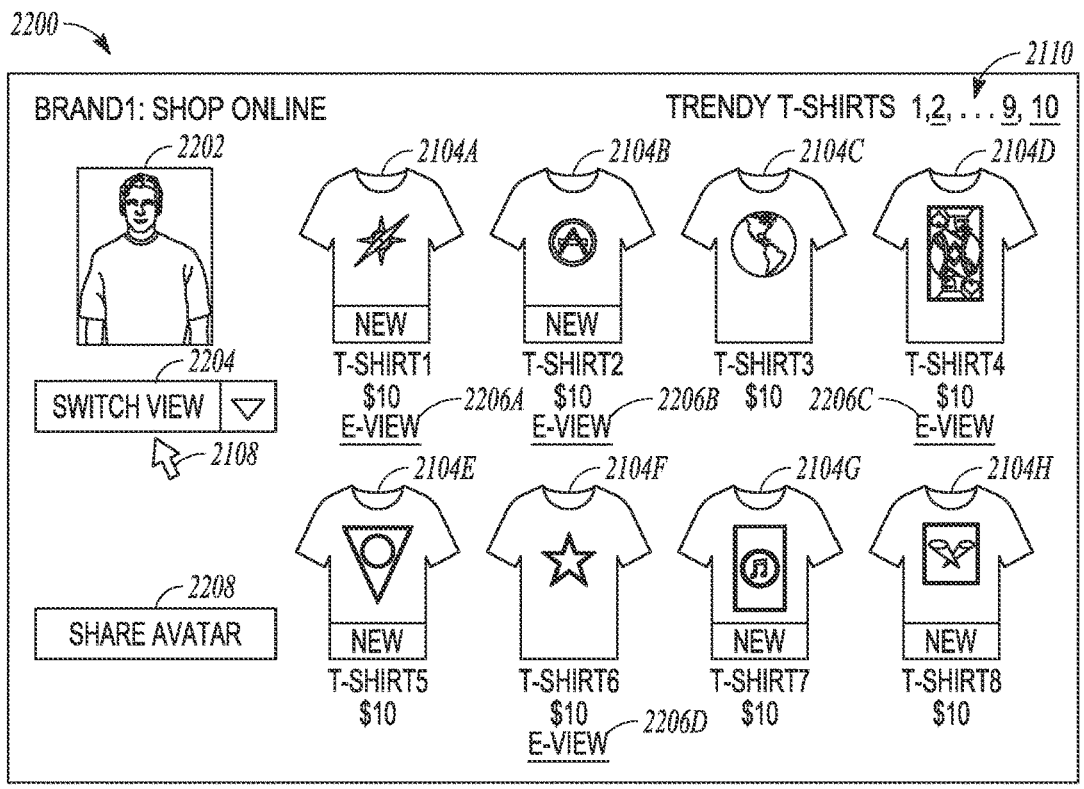

FIG. 22 illustrates an example user interface 2200 of a webpage or software application of an online marketplace to be rendered on a client device (e.g., client machine 110 of FIG. 1). The user interface 2200 may correspond to a user interface provided by the digital avatar system 500 in response to a user selection of the element 2108 of FIG. 21 and successful authentication. In particular, after the user successfully logs into the digital avatar system 500, the user interface 2200 displays elements 2202, 2204, 2206A-D, 2208. The element 2202 may correspond to a display element for displaying the user's digital avatar. In the illustrated embodiment of FIG. 22, the digital avatar is shown in a default configuration (e.g., blank shirt). The element 2204 may correspond to a selectable button or pull-down menu for changing the element 2202 to a different user. The elements 2206A-F may correspond to selectable control elements for configuring the digital avatar displayed in element 2202, as will be described in greater detail below in connection with FIG. 23. As shown, not all products of the online marketplace may support digital avatar views (e.g., the products of elements 2104E, G, H). The element 2208 may correspond to a selectable button for sharing the digital avatar displayed in element 2202 with another user or to post to a social network for commenting.

Figure 23:
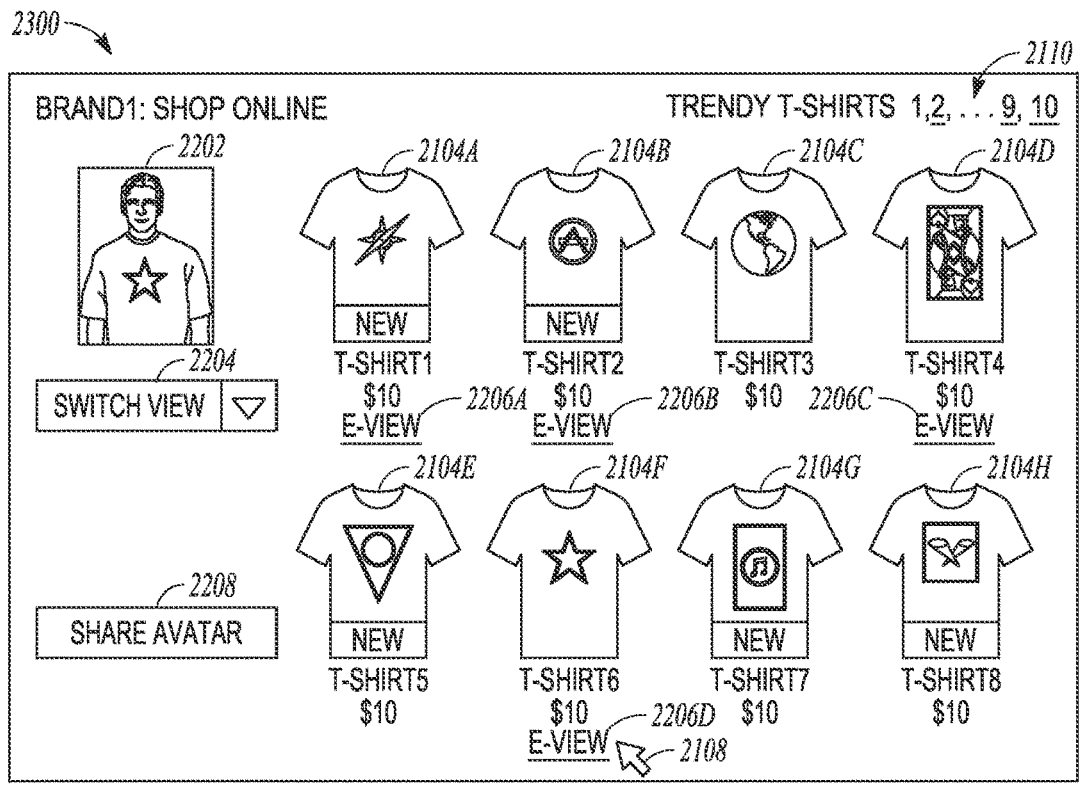

FIG. 23 illustrates an example user interface 2300 of a webpage or software application of an online marketplace to be rendered on a client device (e.g., client machine 110 of FIG. 1). The user interface 2300 may correspond to a user interface provided by the digital avatar system 500 in response to a user selection of the element 2206D of FIG. 22. In particular, in accordance with a user selection of the element 2206D, the element 2202 displays the digital avatar of the user as wearing the shirt corresponding to the element 2206D. The user may then select one of the elements 2206A-2206D to change the shirt of the digital avatar again.

Figure 24:
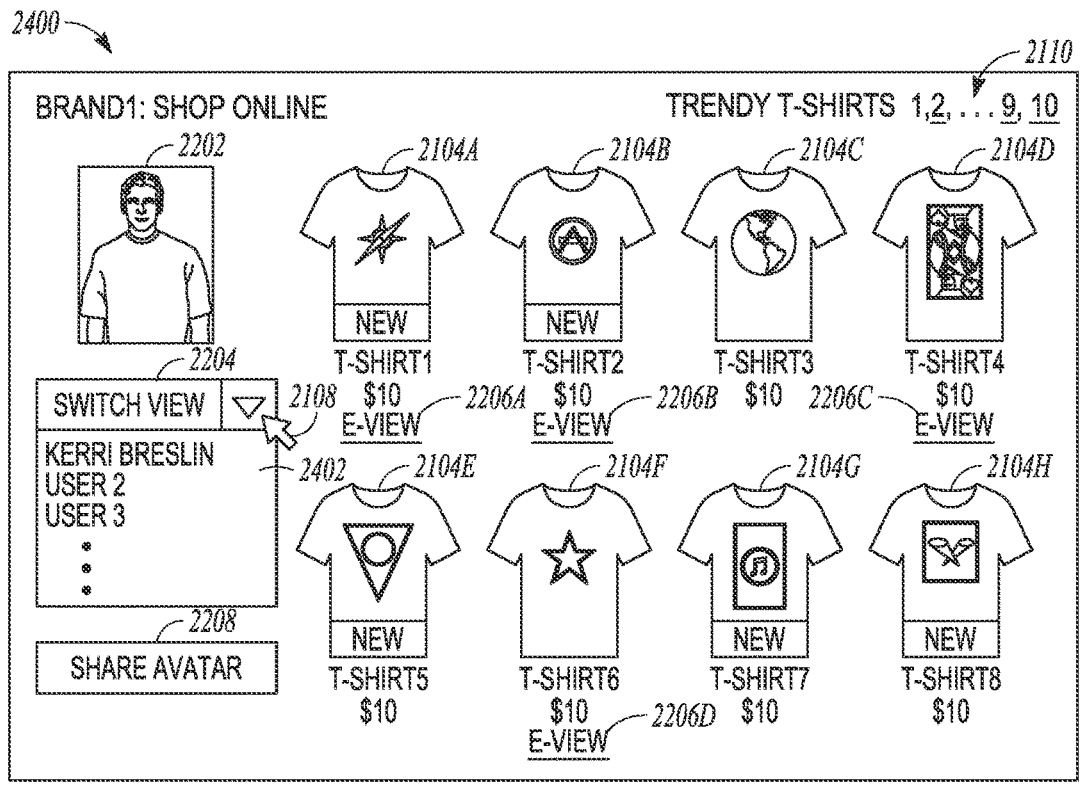

FIG. 24 illustrates an example user interface 2400 of a webpage or software application of an online marketplace to be rendered on a client device (e.g., client machine 110 of FIG. 1). The user interface 2400 may correspond to a user interface provided by the digital avatar system 500 in response to a user selection of the element 2204 of FIG. 22. In particular, in accordance with a user selection of the element 2204, the element 2204 displays a list of contacts who shared their digital avatars with the user. Accordingly the user may select a contact who is listed in element 2402 in order to use the selected contact's avatar, as shown below in connection with FIGS. 25 and 26.

Figure 25:
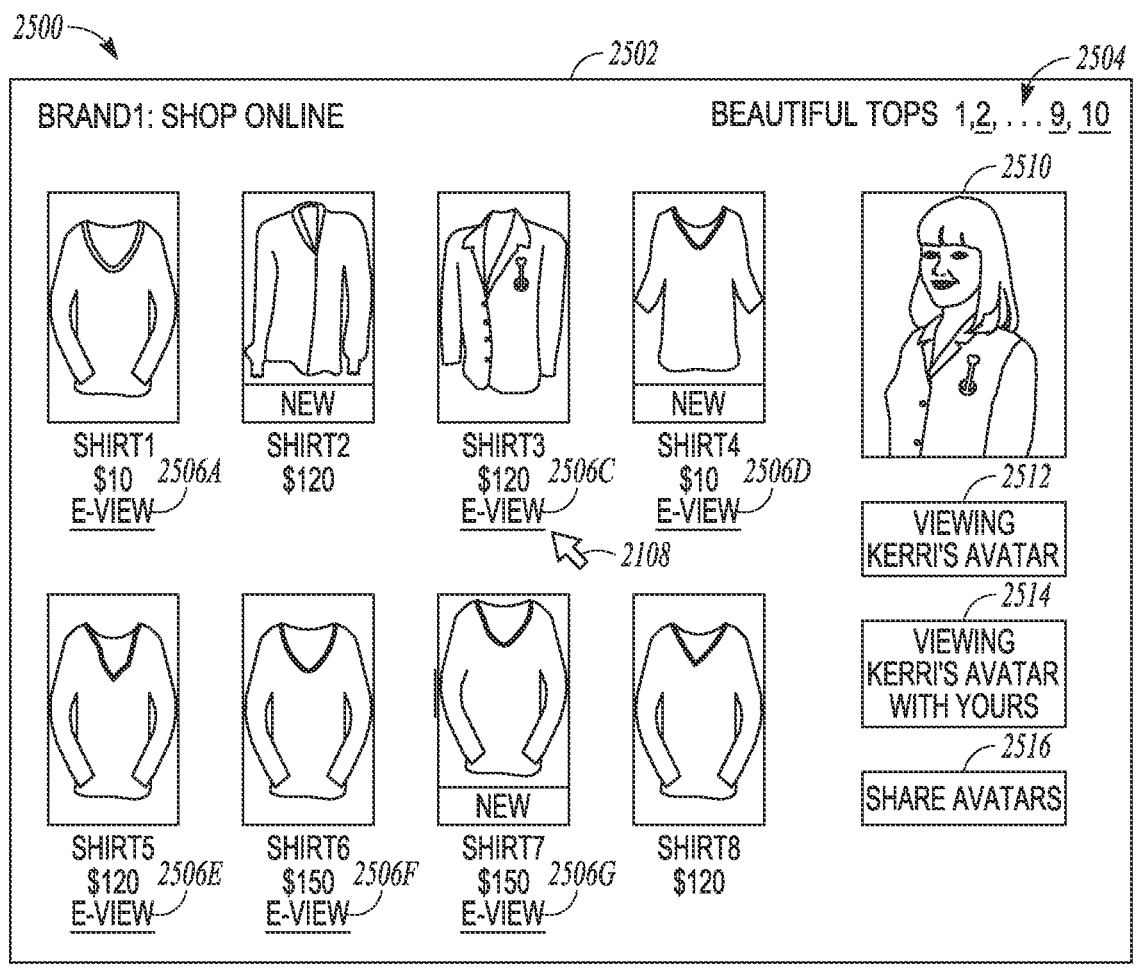

FIG. 25 illustrates an example user interface 2500 of a webpage or software application of an online marketplace to be rendered on a client device (e.g., client machine 110 of FIG. 1). The user interface 2500 may correspond to a user interface provided by the digital avatar system 500 in response to a user selection of the contact "Kerri Breslin" from the element 2402 of FIG. 24. In particular, the user interface 2500 includes a frame 2502 comprising elements 2504 for navigating product webpages and elements 2506A-G for configuring a digital avatar of the contact with the corresponding products. An element 2510 of the frame 2502 may display the digital avatar of the contact in accordance with user selections of elements 2506A-G. For example, the digital avatar displayed in element 2510 is shown as wearing the product corresponding to the element 2506C selected by the pointer element 2108. An element 2512 of the frame 2502 may display the user name of the contact currently being displayed. An element 2514 of the frame 2502 may be selected for adding the current user's avatar with the contact's avatar. An element 2516 of the frame 2502 may be selected for sharing the avatars being displayed.

Figure 26:
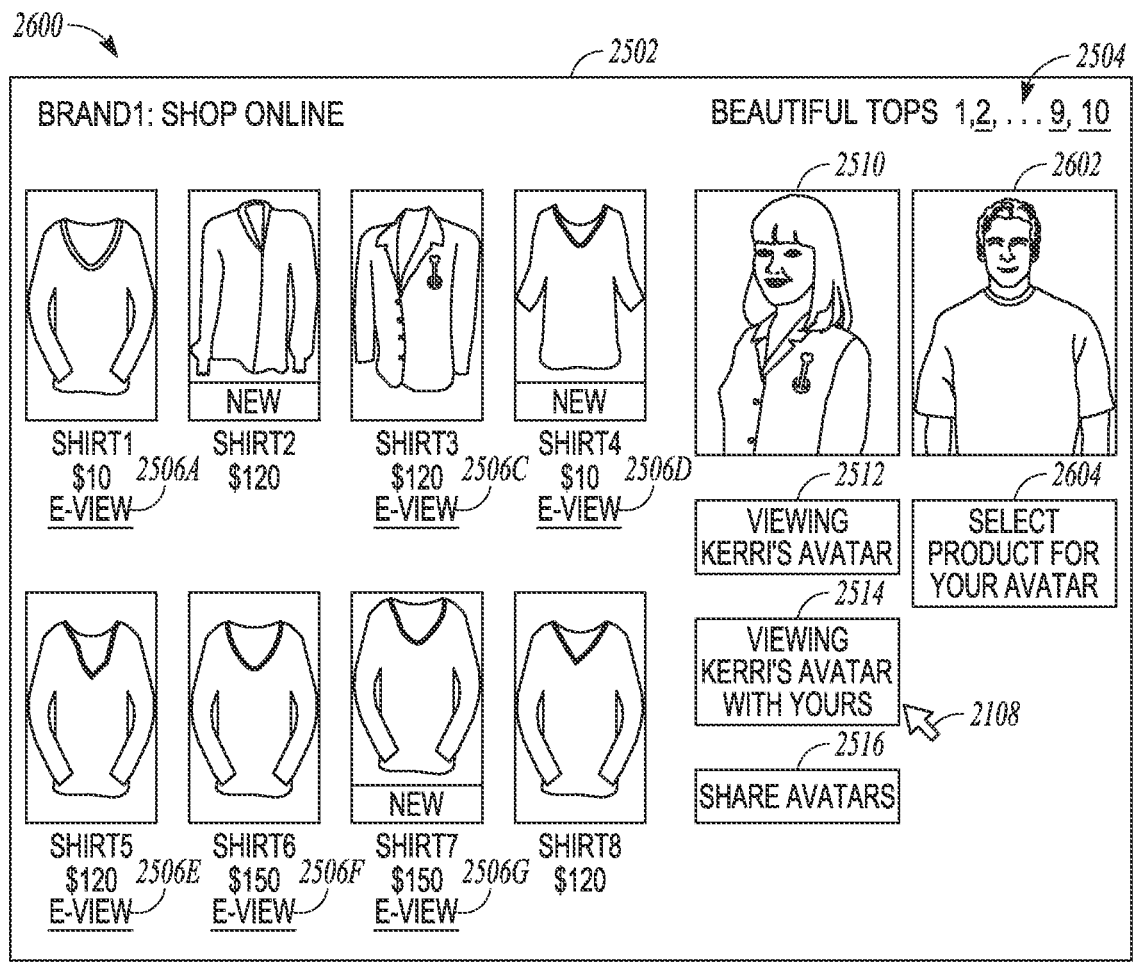

FIG. 26 illustrates an example user interface 2600 of a webpage or software application of an online marketplace to be rendered on a client device (e.g., client machine 110 of FIG. 1). The user interface 2600 may correspond to a user interface provided by the digital avatar system 500 in response to a user selecting the element 2514 of FIG. 25 for viewing the user's avatar and the contact's avatar together. In particular, the user interface 2600 includes the display element 2602 for displaying the digital avatar of the user. Furthermore, the user interface 2600 includes the element 2604, which may correspond to a selectable button for selecting to configure the user's avatar. For example, after selecting the element 2604, selecting an "e-view" link element causes the display element 2602 to display the corresponding product on the user's avatar instead of the contact's avatar of display element 2510.

Example User Interface for Vendor Accounts

Figure 27:
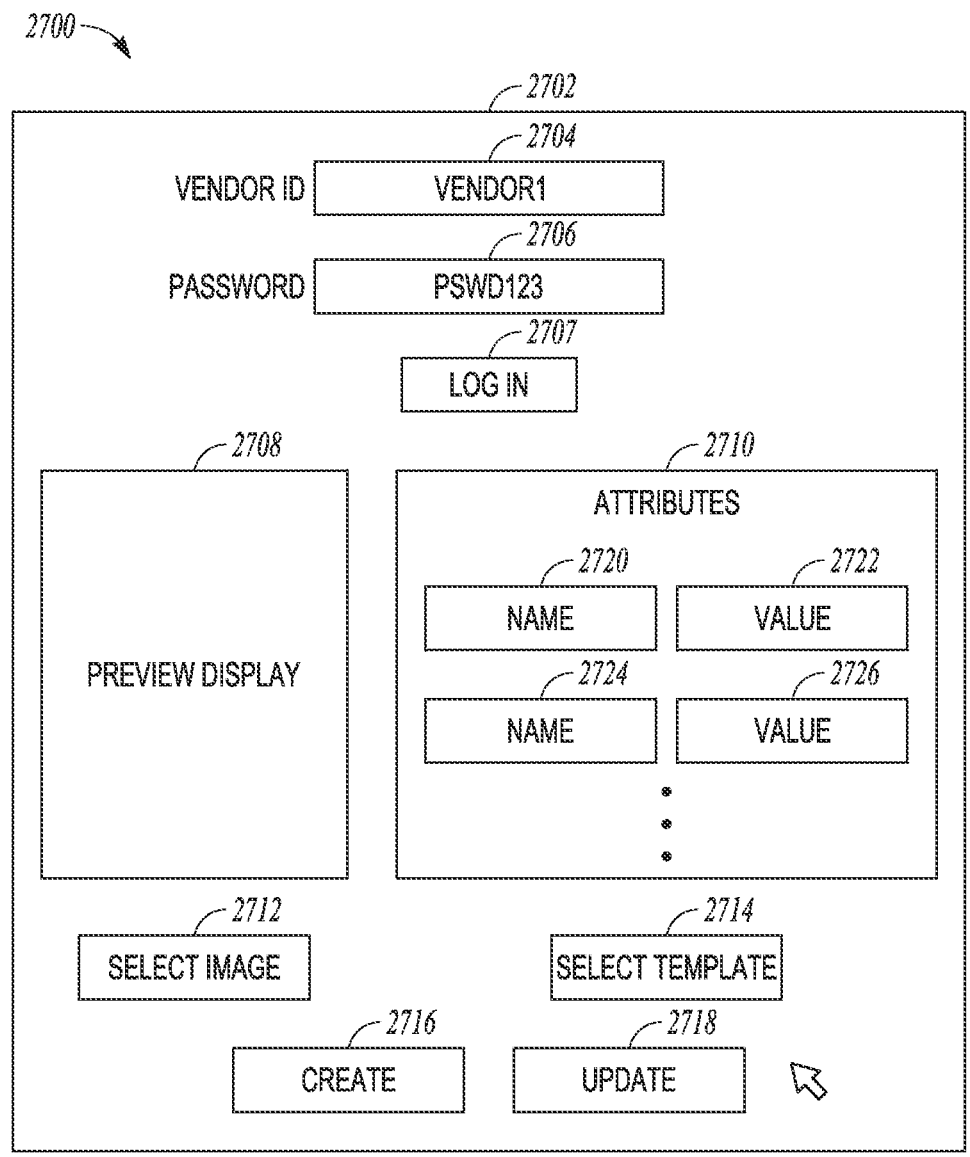
FIG. 27 is an interface diagram illustrating an example user interface with multiple display elements delivered to a client device for providing product records, according to example embodiments.

FIG. 27 is an interface diagram illustrating an example user interface 2700 with multiple display elements delivered to a client device for providing product records, according to example embodiments. For example, a user of an online marketplace server 118A-M of FIG. 3 may provide user input to create a product record of a vendor account stored by the digital avatar server 118N using the database 126N. The user interface 2700 may include a frame 2702 which has elements 2704-2718. The element 2710 may correspond to a table having one or more entries, such as a pair of elements 2720, 2722 forming one entry and a pair of element 2724, 2726 forming another entry.

In the illustrated embodiment, the elements 2704, 2706 may correspond to text boxes for receiving user input (e.g., username and password) for logging into the digital avatar system 500. The element 2707 may correspond to a button that is selectable for initiating an authentication process based on the user input received by the elements 2704, 2706. Upon a successful authentication, the user (e.g., a vendor) may access the elements 2708 through 2722 for creating a product record for the vendor account of the user.

The element 2708 may correspond to a display element for rendering a preview image of the avatar version of the product. The preview image may be selected in response to a user selection of element 2712, which may correspond to a selectable button for browsing a file hierarchy for a selected image file. Upon selection, the image file is displayed in the preview display element 2708. The image may correspond to a view of the product in a specified size and worn by an avatar of a specified size. Furthermore, the image may correspond to a specified view, such as a front view, side view, waist-up view, waist-down view, or the like. For example, the vendor user may select a first image file of a front view of a size-15 avatar wearing a shirt in size medium.

As described previously in connection with FIG. 8, each product record may have more than one image. Accordingly, the vendor user may repeat the process of selecting and uploading images for variations of the digital avatar. For example, the vendor user may select and upload a second image of a different view (e.g., side view), a third image of a different size avatar (e.g., a size-15.5 avatar), a fourth image of a different size shirt (e.g., a large shirt), for the product record being created or edited. It will be appreciated that variations of the images are not limited to sizes of the product and avatar and the perspective of the view, but may include any suitable variation for modeling the product or a group of users. For example, variations of the images may include color of the product, skin color of the user, and the like.

The element 2710 may correspond to a frame including one or more elements for receiving and displaying user input that is indicative of one or more attributes of the product and or selected image. Each entry of element 2710 may correspond to an attribute-value pair. For example, the elements 2720, 2722 may receive and display user input associated with an attribute name and an attribute value pair. The respective attributes may have a value, such as a binary logic, a numerical value, or string value suitable for expressing the degree or nature of the attribute. For example, an attribute named "Sale" may have a value "30%" to indicate that the product of the product record is on sale for 30%. Other example attribute-value pairs may include (Color, Red), (Shirt, True), (ButtonFly, No), (OnlineOnly, Yes), and the like.

Moreover, the attribute-value pair may be indicative of the variation of the image. For example, an image corresponding to a front view of a size-15 avatar wearing a particular shirt in size medium may have entries of element 2710 corresponding to (ProductSize, M), (AvatarSize, 15), and (View, Front). In this way, in response to a user of the online marketplace selecting a specified product, size, and view, the digital avatar system 500 may select the corresponding image for display.

It will be appreciated that the attributes may be global attributes or image attributes. Global attributes are attributes that are applied to each image variation of the product. An example global attribute may be (Sale, 30%), which may be applied to each image of the product. Accordingly, global attributes may facilitate searching for products that satisfy one or more search conditions. An image attribute may be an attribute that is only applied to the selected image of the product. Examples of image attributes include (ProductSize, M), (AvatarSize, 15), and (View, Front). Accordingly, image attributes may facilitate selecting an image from a plurality of images of a product for display as part of a digital avatar.

To facilitate populating the element 2710 of attributes, the user interface 2700 may include the element 2718, which may correspond to a selectable button for selecting a template on file. A template includes data for automatically generating one or more attribute-value pairs of element 2710.

It will be understood by a person of ordinary skill that other embodiments of the user interfaces of FIGS. 6-20 need not include each element shown in the figures and other embodiments may include more or fewer elements.

Example Digital Avatar Processes

Figure 28:
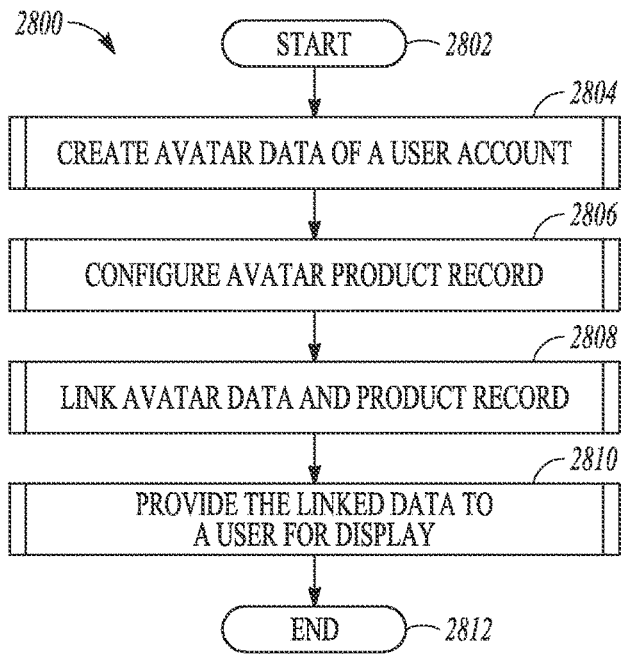
FIG. 28 is a flowchart illustrating an example method of generating avatar data for users, in accordance with an example embodiment.

FIG. 28 is a flowchart illustrating an example method 2800 of generating avatar data for users, in accordance with an example embodiment. In this example, the method 2800 may include operations such as creating avatar data of a user account (block 2804), configuring an avatar product record (block 2806), linking avatar data and a product record (block 2808), and providing the link data to a user for display (block 2810). The example method 2800 will be described below, by way of explanation, as being performed by certain modules. It will be appreciated, however, that the operations of the example method 2800 can be performed in any suitable order by any number of the modules shown in FIG. 5.

The method 2800 starts at block 2802 and proceeds to block 2804 for creating avatar data of a user account. For example, the digital avatar system 500 (e.g., via the web-front module(s) 512) may provide data for a user interface to be displayed on a user device. The user interface may correspond to the example user interfaces described previously in connection with FIGS. 14-17. Accordingly, the digital avatar system 500 may determine measurement data of the user based on one or more images provided by the user. Furthermore, the measurement data of the user may be based additionally on one or more user inputs, such as the height and/or weight of the user. The data related to the height and/or weight of the user may be inputted by the user manually via the elements 1428, 1430, 1434 of FIG. 14.

In an example embodiment, the graphics processing module(s) 506 may determine the measurement data based on the one or more images and, if provided, data related to the height and/or weight of the user. For example, the graphics processing module(s) 506 may utilize the height measurement of the user to scale the distances between the POIs of the images to physical measurements. It will be appreciated, however, that in alternative embodiments, measurement data may be obtained in alternative ways, such as body scan data and/or manual user input.

The measurement data may be stored in the sizing data field 822 of the data structure 802 of FIG. 8. The received image data may be stored in the image data field 824 of the data structure 802. An example embodiment of block 2804 will be described later in greater detail in connection with FIG. 29.

The method 2800 may include block 2806 for configuring an avatar product record. For example, a vendor user may create or modify a product record data structure 804 that is linked to the vendor account (e.g., data structure 806). In an example embodiment, the digital avatar system 500 (e.g., using the web-front module(s) 512) may provide data to display a user interface on a client device of the vendor user. The user interface may, for instance, correspond to the user interface 2700 described previously in connection with FIG. 27. Accordingly, the digital avatar system 500 may receive one or more images and one or more attributes of the product from the user vendor. In turn, the vendor database sub-module(s) 522 may store the received product data in the product record data structure 804. For example, the one or more images, as well as attributes of the images, may be stored in the image data array 836. Global attributes may be stored in the attributes array 834. An example embodiment of block 2806 will be described later in greater detail in connection with FIG. 30.

The method 2800 may include the block 2808 for linking avatar data and a product record. By linking the data, model data for a digital avatar wearing the selected product may be generated for display on a user device. In an example embodiment, the digital avatar system 500 may provide data for a user interface of an online market to allow the user to view digital avatars. The user interface may correspond to the interfaces described previously in connection with FIGS. 21-26. Linking avatar data of the user and a product record may be responsive to a user request to generate an avatar wearing a selected product. For example, the digital avatar system 500 may perform block 2808 in response to the user selecting, for example, the element 2206D of FIG. 23. The linking may include mapping the user's measurements to a product image of the corresponding product record. An example embodiment of block 2808 will be described later in greater detail in connection with FIG. 31.

After the linked data is generated at block 2808, the method 2800 may include block 2810 for providing the linked data to a user for display. In an example embodiment, the communication interface module(s) 508 may provide the link data to a user device in accordance with the user request of block 2808. The user device may correspond to the requesting user or to another user (e.g., the requesting user sharing avatar data with a second user). An example embodiment of block 2810 will be described later in greater detail in connection with FIG. 33. The method 2800 ends at block 2812.

Figure 29:
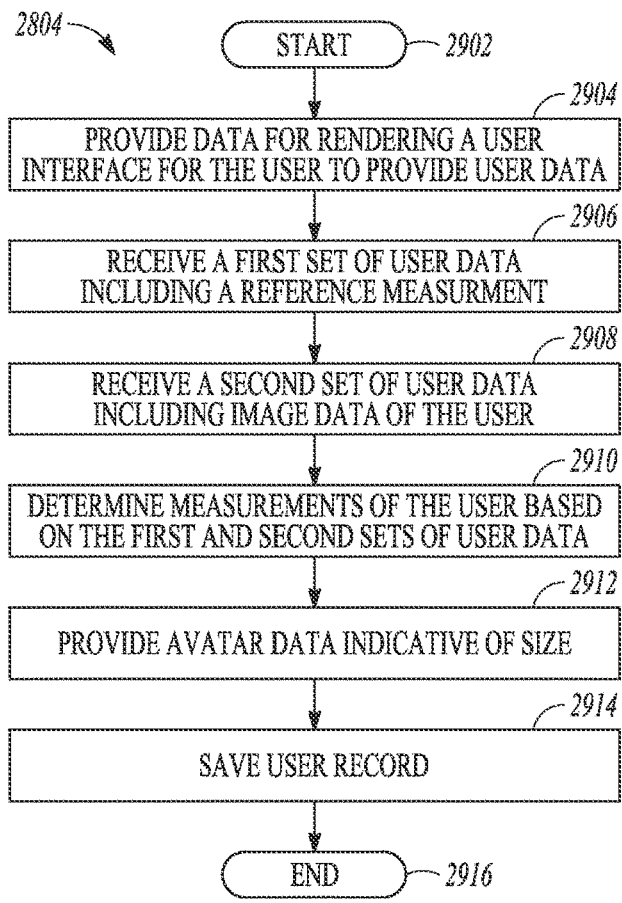
FIG. 29 is a flowchart illustrating an example method of creating avatar data, in accordance with an example embodiment.

FIG. 29 is a flowchart illustrating an example embodiment of block 2804 for creating avatar data, in accordance with an example embodiment. In this example, the method 2804 may include operations such as providing data for rendering a user interface (block 2904), receiving a first set of user data that includes a reference measurement (block 2906), receiving a second set of user data including image data (block 2908), determining dimensions of the user based on the first and second sets of user data (block 2910), providing avatar data indicative of size data (block 2912), and saving the avatar data to a user record (block 2914). The example method 2804 will be described below, by way of explanation, as being performed by certain modules. It will be appreciated, however, that the operations of the example method 2804 can be performed in any suitable order by any number of the modules shown in FIG. 5.

The method 2804 starts at block 2902 and proceeds to block 2904 for providing data for rendering the user interface. In an example embodiment, the web-front module(s) 512 may provide data for a user interface to a user device via the user facing sub-module(s) 514. The user interface may correspond to the user interfaces shown in FIG. 14-20. In particular, the user interface may include elements 1412-1436 of FIG. 14 for creating a user account. The user may supply user input that is indicative of the user's height and weight via the elements 1428, 1430, 1434. Additionally or alternatively, the user interface may include elements for providing image data, such as sub-frames 1502, 1504, 1506.

The method 2804 may further include block 2906 for receiving a first set of user data including a reference measurement. In an example embodiment, the first of the data may correspond to data provided by the user via the elements 1428, 1430, 1434 for providing the user's height and weight. In one aspect, the user's height may be used as a reference measurement in order to determine a scale of images provided by the user, as will be described in greater detail below. Additionally or alternatively, data that is indicative of the user's height and weight may be stored in the data structure 802 of the user account (e.g., in the sizing data field 822).

The method 2804 may further include block 2908 for receiving a second set of user data that includes image data of the user. In an example embodiment, the second set of data may correspond to data provided by the user via the sub-frames 1502, 1504, 1506 of FIG. 15. Moreover, a plurality of POIs elements (e.g., point 1516-1526, 1538-1542, 1558-1564) may have been positioned within the respective images. In an example embodiment, the graphics processing module 506 may determine the positioning of the POI elements automatically. Additionally or alternatively, the user interface may facilitate the user positioning the point of interest elements within the images. The distances between the POIs elements and the reference measurement may be used to determine the physical measurements of the user, as will be described below in greater detail. The image data may be stored in the data structure 802 of the user account (e.g., in the image data field 824). For example, an image of the user's head and neck may be captured for superimposing onto a body model that is selected or sized based on the user's measurements.

The method 2804 may include block 2910 for determining measurements of the user based on the first and second sets of user data. In an example embodiment, the digital avatar system 500 may receive the first and second sets of data from the user device. The graphics processing module(s) 506 may determine the one or more distances between POI elements in terms of the image space. For example, the graphics processing module(s) 506 may determine the distance between the top-of-the-head POI element and the foot POI element, which may measure, for example, 1 inch or 1000 pixels in the image. The measurement in the image space may be related to the reference measurement (e.g., the user's height provided at block 2906) in order to determine the scale the image relative the real-world physical measurements. For example, in the case that the user has indicated a height of 6 feet, each inch or 1000 pixels in the image space would correspond to 6 feet. Accordingly, physical measurements of the user may be estimated by scaling the distances between the POI elements in accordance with the determined scale.

In an example embodiment, the block 2910 may further include matching the measurement data to sizing data (e.g., clothing sizes). For example, the graphics processing module(s) 506 may access a database of body measurements paired with clothing sizes. The pairings may be based on the average clothing sizes worn by people having such body measurements. Accordingly, the graphics processing module(s) 506 may determine the clothing sizes of the user by matching the determined measurements to the measurements of the database. The graphics processing module(s) 506 may select the clothing sizes that are paired with the stored measurements that most closely matches the determined measurements of the user. Examples of the clothing sizes may include shirt sizes, pant sizes (waist, inseam, drop, etc.), shoe sizes (length, width, etc.), hat sizes (small, medium, large, diameter, etc.), glove sizes (S, M, L, etc.), and the like. Based on the clothing sizes, the digital avatar system 500 may access a database of avatar body models to select a body model that closely matches the determined clothing sizes.

The method 2804 may include block 2912 for providing avatar data that is indicative of the size of the user. In one example embodiment the communication interface module(s) 508 may provide data that is indicative of the clothing sizes to the user device for display. Moreover, the communication interface module(s) 508 may provide data that is usable to generate a preview digital avatar of the user. For example, the data may correspond to model data that includes image data of the user's face and image data of a digital model of the user's body. The digital model may be selected from one or more candidate model based on at least one of the determined user measurements or the determined user clothing sizes.

The method 2804 may include block 2914 for saving the user record. For example, the user database sub-module(s) 520 of the database management module(s) 504 may store the determined measurement data and/or the clothing sizes in the sizing data field 822 of the data structure 802. The method 2804 ends at block 2916.

Figure 30:
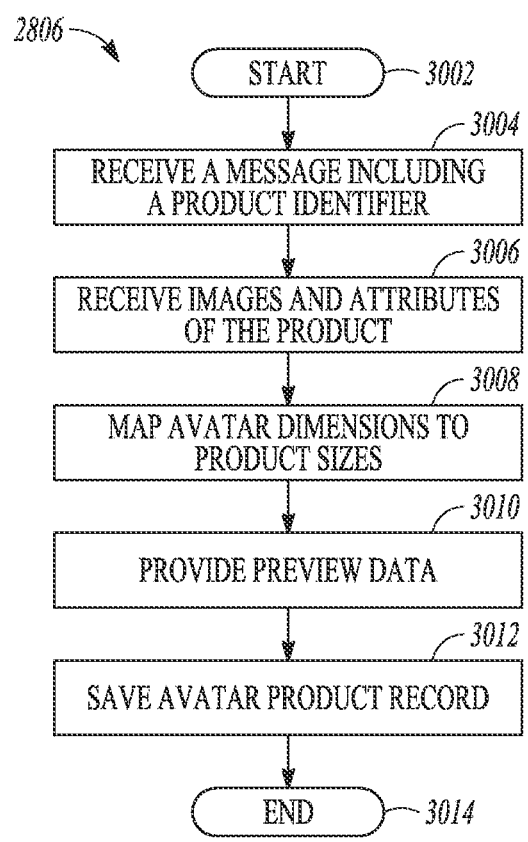
FIG. 30 is a flowchart illustrating an example method of configuring an avatar product record, in accordance with an example embodiment.

FIG. 30 is a flowchart illustrating an example embodiment of the block 2806 for configuring an avatar product record, in accordance with an example embodiment. In this example, the method 2806 may include operations such as receiving a message that includes a product identifier (block 3004), receiving images and attributes of the product (block 3006), mapping avatar dimensions to product sizes (block 3008), providing preview data (block 3010), and saving the avatar product records (block 3012). The example method 2806 will be described below, by way of explanation, as being performed by certain modules. It will be appreciated, however, that the operations of the example method 2806 can be performed in any suitable order by any number of the modules shown in FIG. 5.

The method 2806 starts at block 3002 and proceeds to block 3004 for receiving a message that includes a product identifier. For example, after a successful authentication process, the vendor-facing sub-module(s) 516 of the application interface module(s) 502 may receive a request to create or edit a product record from a vendor. The request may include data that is capable of identifying a product record from one or more product records linked to the vendor account. In an example embodiment, the request may be provided by the vendor to the digital avatar system 500 in response to a selection of the element 2716 (FIG. 27) for creating a product record or a selection of the element 2718 for updating the product record.

The method 2806 may include block 3006 for receiving images and attributes of the product. The images may correspond to models of the product worn by digital avatars. The model of the product may include the portion of an avatar related to or coinciding with the product. For example, a model for a shirt may be an image of the avatar from the waist up and the neck down. A model for a pair of pants may be an image of the avatar from the ankle up in the waist down. Each image may correspond to a particular variation of the users (e.g., sizes of the user, color, etc.), a particular variation of the product (e.g., sizes, color, etc.), in a particular variation of the view (e.g., front view, a side view, a back view, a waist-up view, a waist-down view, etc.). To account for the variations, a plurality of images may be provided to cover a range of variations. In operation, the database management module(s) 504 may select the image that most closely matches a requested variation in accordance with an avatar request message.

The received attributes may include metadata that describes the product and/or images. For example, each image that is received may be accompanied by attributes data that describes the corresponding image. The attributes may be indicative of the product view, product size, product color, avatar size, avatar color, and/or the like. As such, the attributes of the images may facilitate determining which image most closely matches a requested variation of an avatar request message.

Furthermore, received attributes may include global attributes or metadata that describes the product independent of the images. For example, the attributes may designate the product as being plus sized or subject to a sale or discount. The global attributes may facilitate filtering search results. As stated, and the attributes may be provided by the vendor via the elements 2720-2726 of the user interface 2700.

The method 2806 may include block 3008 for mapping avatar dimensions to product sizes. As stated, images may be received that correspond to a respective product size. Furthermore, the images may correspond to a particular sized avatar wearing the product of a particular size. Accordingly, dimensions of digital avatars are mapped to the received images. In one example embodiment, the database management module(s) 504 may perform the mapping of the product record using the product database sub-module(s) 526.

The method 2806 may include block 3010 for providing preview data. In an example embodiment, the graphics processing module(s) 506 of the digital avatar system 500 may provide a preview image to the vendor to provide visual feedback. The vendor may adjust the attributes of the product or the image in order to adjust the preview image.

The method 2806 may include block 3012 for saving the avatar product record. For example, in an example embodiment, the product database sub-module(s) 526 may save the attributes and image data and the corresponding attributes array 834 and/or image data array 836 of the data structure 804. The method 2806 may end at block 3014.

Figure 31:
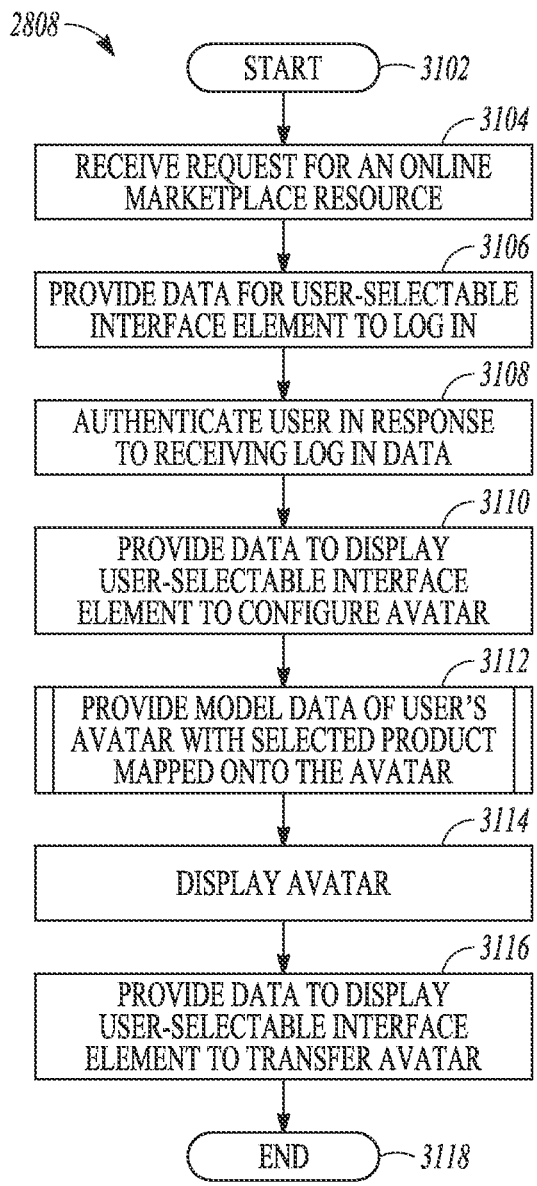
FIG. 31 is a flowchart illustrating an example method of linking avatar data, in accordance with an example embodiment.

FIG. 31 is a flowchart illustrating an example embodiment of the block 2808 for linking avatar data, in accordance with an example embodiment. In this example, the method 2808 may include operations such as receiving a request for an online marketplace resource (block 3104), providing data for user selectable interface elements for login (block 3106), authenticating the user (block 3108), providing data to display user selectable interface elements to configure the avatar display (block 3110), providing model data of the user's avatar (block 3112), displaying the avatar (block 3114), and providing data to display user selectable interface elements to transfer the avatar (block 3116). The example method 2808 will be described below, by way of explanation, as being performed by certain modules. It will be appreciated, however, that the operations of the example method 2808 can be performed in any suitable order by any number of the modules shown in FIG. 5.

The method 2808 starts at block 3102 and proceeds to block 3104 for receiving a request for an online marketplace resource. The request may be initiated by a user device requesting data for a webpage or application displaying a user interface of an online marketplace. In an example embodiment, a user device 110 of FIG. 1 may transmit the request to the marketplace application 120. In response, the marketplace application 120 may transmit online marketplace resources to the user device 110 for display.

At block 3106, the method 2808 may include providing data for user selectable interface elements for logging into the digital avatar system 500. In response to the user logging in, digital avatar user interface elements may be exposed on the user interface so that the user may request digital avatar services. In an example embodiment, the user selectable interface elements may correspond to element 2106, which when selected may prompt the user to provide username and password information.

At block 3108, the method 2808 may include authenticating the user. In an example embodiment, the application interface module(s) 502 may receive login data from the user in connection with the user selectable interface element of block 3106. The login data may be passed to the authentication module(s) 510 for authenticating the user. The digital avatar system 500 may provide digital avatar services in response to a successful authentication.

At block 3110, the method 2808 may include providing data to display user selectable interface elements for configuring an avatar display. For instance, user selectable interface elements may be provided for products that support the digital avatar system (e.g., the product has a corresponding avatar product record data structure 804). In an example embodiment, the user selectable interface elements may correspond to elements 2206A-D as shown in FIG. 22. As stated, the elements 2206A-D may facilitate configuring the user's avatar to display selected products.

At block 3112, the method 2808 may include providing model data of the user's avatar with a selected product mapped onto the avatar. For example, the providing of the model data may be in response to a user selection of one of the user selectable interface elements of block 3110. In an embodiment, the application interface module(s) 502 may receive an indication of the selection and access avatar data via the database management module(s) 504. The digital avatar system 500 may provide, to the user, the model data for display using the application interface module(s) 502 and the communication interface module(s) 508. Block 3112 will be described in greater detail later in connection with FIG. 32.

At block 3114, the method 2808 may include displaying the user's avatar configured with the selected product based on the model data provided at block 3112. At block 3116, the method 2808 may include providing data to display a user selectable interface element to transfer the avatar to a second user. In an example embodiment, the user selectable interface element may correspond to the element 2208 of FIG. 22. At block 3118, the method 2808 may end.

Figure 32:
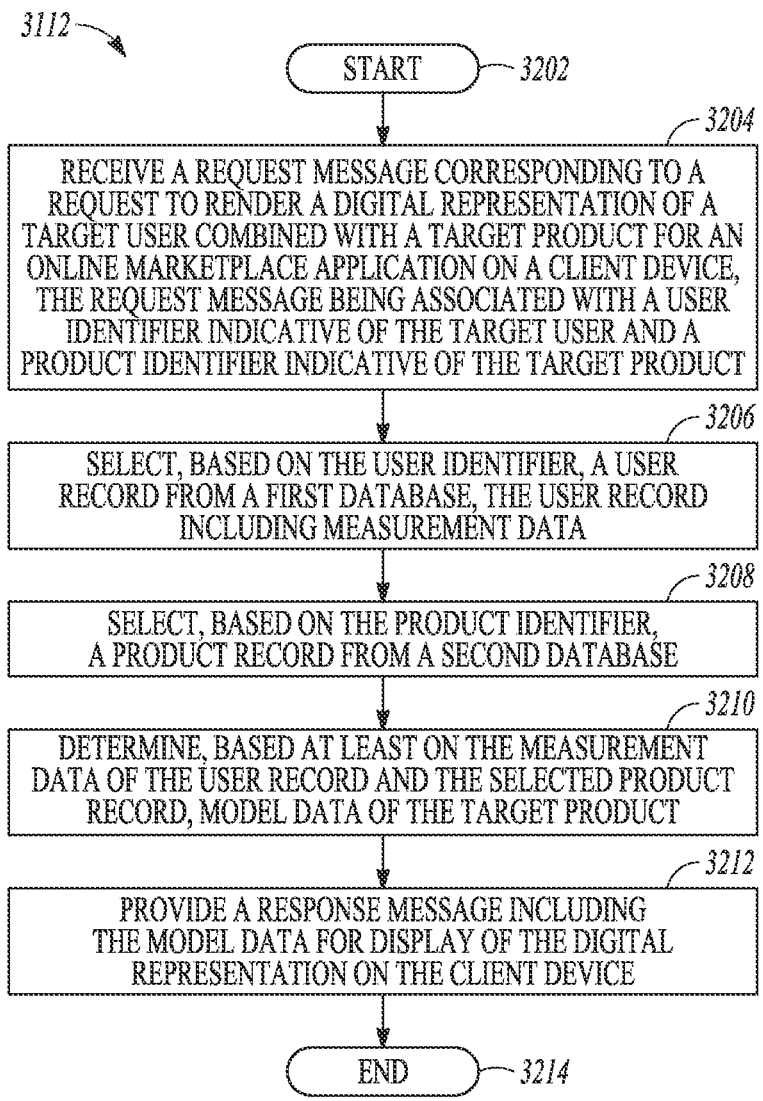
FIG. 32 is a flowchart illustrating an example method of providing model data of a user's avatar with a product, in accordance with an example embodiment.

FIG. 32 is a flowchart illustrating an example embodiment of the block 3112 for providing model data of a user's avatar with a product, in accordance with an example embodiment. In this example, the method 3112 may include operations such as receiving a request message (block 3204), selecting a user record that includes measurement data (block 3206), selecting a product record (block 3208), determining model data of the target product (block 3210), and providing a response message (block 3212). The example method 3112 will be described below, by way of explanation, as being performed by certain modules. It will be appreciated, however, that the operations of the example method 3112 can be performed in any suitable order by any number of the modules shown in FIG. 5.

The method 3112 starts at block 3202 and proceeds to block 3204 for receiving a request message corresponding to a request to render a digital representation of a target user combined with a target product. The digital representation may correspond to a digital avatar of the target user wearing the target product, which may be an article of clothing, an accessory (shoes, hats, glasses, watches, scarves, belts, bags, etc.), wearable devices (headphones, wearable computing devices, etc.), or the like.

The user of the client device may provide the request message to configure the user's avatar or another user's avatar. Accordingly, the target user may be different from the user of the client device. An example of a user interface for configuring the user's avatar is shown in FIG. 23. An example of a user interface for configuring another user's avatar is shown in FIG. 25.

In an example embodiment, the application interface module(s) 502 may receive the request message from a user device or from an online marketplace application. The request message may be associated with a user identifier that is indicative of the target user. The first request message may also be associated with a product identifier that is indicative of the target product. For example, the request message may include the user identifier and the product identifier as a data packet. Alternatively, the user identifier and the product identifier may be transmitted to the digital avatar system 500 separately from the request message.

At blocks 3206, 3208, the method 3112 may include selecting a user account (or also referred to as a "record") and a product record from databases. The selection of the user account may be based on the user identifier associated with the request message. For example, the database management module(s) 504 may compare the user identifier associated with the request message to a user identifier of a user account. In accordance with a determination of a match, the database management module(s) 504 may select the user account. In an example embodiment, the user account may correspond to the data structure 802 of FIG. 8. As such, the user account may include the measurement data in the sizing data field 822.

The selection of the product record may be based on the product identifier associated with the request message received at block 3204. For example, the database management module(s) 504 may compare the product identifier associated with the request message to a product identifier of a product record. In accordance with a determination of a match, the database management module(s) 504 may select the product record. In an example embodiment, the product record may correspond to the data structure 804 of FIG. 8. As such, the product record may include the one or more images in the image data array 836.

At block 3210, the method 3112 may include determining model data of the target product. Model data may correspond to image data for generating a digital avatar that is configured with the target product. The model data may include user model data and product model data that may be combined to generate the configured avatar. The user model data may correspond to an image of the user's face, which may be superimposed on an avatar body. The product model data may be representative of an image of a portion of a model avatar that coincides with the product. For example, if the target product is a shirt, the product model data may correspond to an image of a torso region of a model avatar wearing the target shirt.

As such, the product model data may be determined based on attributes of the target product and the target user. In particular, the determining of the product model data may be based at least on the measurement data of the user record and the selected product record. In operation, in an example embodiment, the database management module(s) 504 may select an element 838 of the image data array 836 in accordance with attributes of the target user and the target product. For example, each element 838 of the image data array 836 may correspond to a specified user measurement and a product size. Accordingly, the database management module(s) 504 may select the element of the image data array 836 that provides the closest match to the target user's measurements and the target product's size. It will be appreciated that the element 838 of the image data array 836 may be selected based on more or fewer attributes. For example, the element 838 may be selected based on the skin color or palette of the target user, the color of the target product, and/or the like variations of the target user or target product.

Furthermore, the element 838 may include one or more views of the selected variation of the product. Accordingly, the request message may include data that is indicative of a selected view, and the database management module(s) 504 may select an image of the view data fields 842-846 based on the view indicated by the request message. As a result, the selected image may serve as the product model data.

At block 3212, the method 3112 may include providing a response message that includes the model data for display on the client device. In an example embodiment, the application interface module(s) 502 may transmit the model data to a user device using the communication interface module(s) 508. At block 3214, the method 3112 may end.

Figure 33:
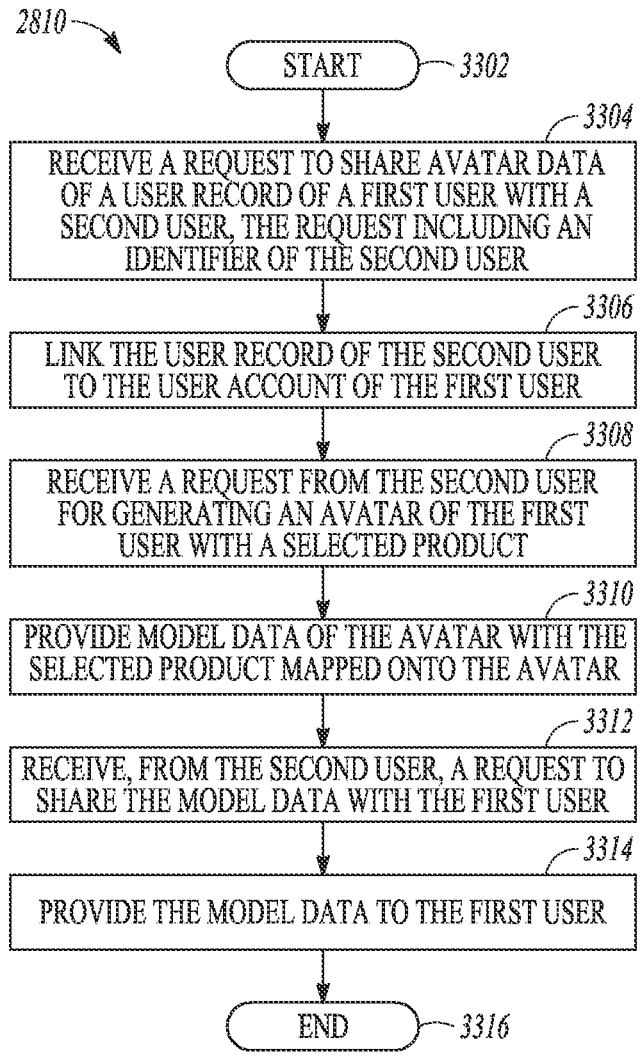
FIG. 33 is a flowchart illustrating an example method of providing avatar data to users, in accordance with an example embodiment.

FIG. 33 is a flowchart illustrating an example embodiment of the block 2810 for sharing avatar data, in accordance with an example embodiment. In this example, the method 2810 may include operations such as receiving a request to share avatar data (block 3304), linking a user record to the avatar data (block 3306), receiving a request for generating an avatar (block 3308), providing model data of the avatar (block 3310), receiving a request to share the model data (block 3312), and providing the model data (block 3314). The example method 2810 will be described below, by way of explanation, as being performed by certain modules. It will be appreciated, however, that the operations of the example method 2810 can be performed in any suitable order by any number of the modules shown in FIG. 5.

The method 2810 starts at block 3302 and proceeds to block 3304 for receiving a request to share avatar data of a user record. For example, the application interface module(s) 502 may receive the request from a first user for sharing avatar data of the first user with a second user. To this end, the request may be associated with an identifier of a second user. In an example embodiment, the request may correspond to a data packet that includes the identifier of the second user.

At block 3306, the method 2810 may include linking the user record of the second user to the user account of the first user. An example embodiment, the database management module(s) 504 may provide linking data to the second user record. The linking data may facilitate providing the second user access to the avatar data of the first user record. For example, the linking data may be indicative of a location of the user record for accessing the avatar data. Additionally or alternatively, the database management module(s) 504 may write data to the user record of the first user that is indicative of access privileges for the second user.

At block 3308, the method 2810 may include receiving a request from the second user for generating an avatar of the first user with a selected product. At block 3310, the method 2810 may include providing model data of the avatar with the selected product mapped onto the avatar. In an example embodiment, the application interface module(s) 502 may provide the model data to the second user by using the communication interface module(s) 508.

At block 3312, the method 2810 may include receiving, from the second user, a request to share the model data with the first user. For example, the second user may provide the request to share the avatar generated using the model data provided at block 3310. As such, the user may select the element 2208 of the user interface 2200 of FIG. 22. The application interface module(s) 502 of the digital avatar system 500 may receive an indication of the user's selection.

At block 3314, the method 2810 may include providing the model data to the first user. The providing of the model data may be responsive to receiving an indication of a request to share and avatar. In an example embodiment, the digital avatar system 500 may provide the first user the model data that was provided to the second user at block 3310.

In an example embodiment, products displayed on a digital avatar may be selectable for navigating a user interface to a product page of the selected product. For example, the second user may dress the avatar of the first user with a shirt and may send the avatar to the first user. In turn, the first user may select the shirt on the avatar display to bring up a webpage of the shirt. On this webpage, the user may purchase the shirt. Moreover, the model data may include data for tracking purchases made by the first user. Accordingly, in response to the first user purchasing a product included with the avatar, the second user may receive a reward, such as points, discount, free merchandise, or the like. At block 3316, the method 2810 may end.

The example methods 2800, 2804, 2806, 2808, 3112, 2810 were described above, by way of explanation, as utilizing certain data structures. It will be appreciated, however, that the data accessed or stored by the example methods can be stored in any suitable data structure, including, but not limited to, the data structures shown in FIG. 8.

MODULES, COMPONENTS AND LOGIC

Certain embodiments are described herein as including logic or a number of components, modules, or mechanisms. Modules (including "sub-modules") may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 34:
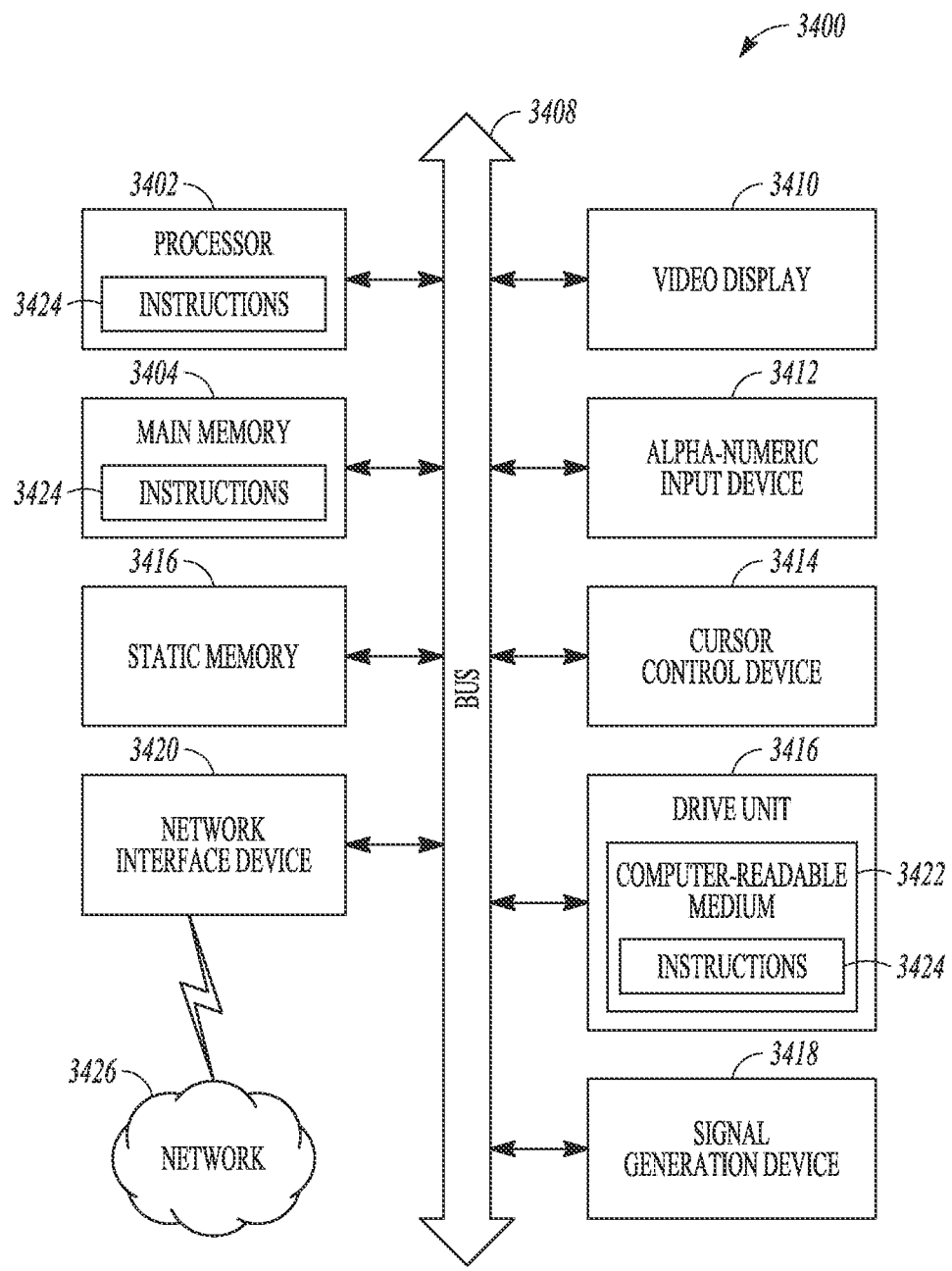
FIG. 34 is a block diagram of a machine in the example form of a computer system within which instructions may be executed for causing the machine to perform any one or more of the methodologies discussed herein.

FIG. 34 is a block diagram of a machine in the example form of a computer system 3400 within which instructions 3424 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3400 includes a processor 3402 (e.g., a central processing unit (CPU), a graphics processing unit (GPU) or both), a main memory 3404 and a static memory 3416, which communicate with each other via a bus 3408. The computer system 3400 may further include a video display unit 3410 (e.g., a liquid crystal display (LCD) or a cathode ray tube (CRT)). The computer system 3400 also includes an alphanumeric input device 3412 (e.g., a keyboard or a touch-sensitive display screen), a user interface (UI) navigation (or cursor control) device 3414 (e.g., a mouse), a disk drive unit 3416, a signal generation device 3418 (e.g., a speaker) and a network interface device 3420.

Machine-Readable Medium

The disk drive unit 3416 includes a machine-readable or computer-readable medium 3422 on which is stored one or more sets of data structures and instructions 3424 (e.g., software) embodying or utilized by any one or more of the methodologies or functions described herein. The instructions 3424 may also reside, completely or at least partially, within the main memory 3404 and/or within the processor 3402 during execution thereof by the computer system 3400, the main memory 3404 and the processor 3402 also constituting machine-readable media.

While the machine-readable medium 3422 is shown in an example embodiment to be a single medium, the term "machine-readable medium" may include a single medium or multiple media (e.g., a centralized or distributed database, and/or associated caches and servers) that store the one or more instructions 3424 or data structures. The term "machine-readable medium" shall also be taken to include any non-transitory, tangible medium that is capable of storing, encoding or carrying instructions (e.g., instructions 3424) for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 3424 may further be transmitted or received over a communications network 3426 using a transmission medium. The instructions 3424 may be transmitted using the network interface device 3420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions 3424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
   one or more processors; and
   a non-transitory machine-readable storage medium coupled to the one or more processors, the machine-readable storage medium embodying instructions that, when executed by the one or more processors, cause the one or more processors to perform operations comprising:
   receiving a request message from a client device, the request message comprising a first product identifier, a view selection, and a request to determine measurements of a user;
   accessing, in response to the receiving of the request message, first and second sets of data, the first set of data being indicative of locations in a first image, the locations corresponding to points of the user's body in the first image, the second set of data being indicative of a reference physical measurement of the user specified by a user input;
   determining, based on the reference physical measurement of the user and a distance between two or more of the locations in the first image, an estimate of a physical space measurement of the user;
   generating, based at least on the estimate of the physical space measurement, avatar data comprising a digital representation of the user;
   retrieving a first product record, the first product record corresponding to the first product identifier and the first product record corresponding to model data for a first product represented by the first product record, the first product record being associated with a stored first indication that the first product record is avatar-enabled, a second product record being associated with a stored second indication that the second product is not avatar-enabled, the retrieving the first product record comprises:
   selecting, based on the view selection received in the request message, product image data from a plurality of product image data associated with the first product identifier, each of the plurality of product image data being associated with a different one of a plurality of views; and
   retrieving the selected product image data based on the estimated physical space measurement of the user;
   based on retrieving the first product record, configuring the avatar data as the digital representation of the user wearing the first product, using the retrieved product mage data and according to the view selection included in the request message; and
   causing display of the avatar data on the client device.

2. The system of claim 1, wherein the estimate of the physical-space measurement of the user corresponds to at least one clothing size of the user, the operations further comprising:
   retrieving one or more second product records based on the request message that correspond to a product history of the user, wherein the avatar data is configured based on the one or more second product records as a representation of the user wearing the second product of the one or more second product records.

3. The system of claim 1, wherein the operations further comprise:
   determining a scale of the first image based on the reference physical measurement of the user and a first image-space distance between a first pair of the locations, the determination of the estimate of the physical-space measurement being based further on the scale.

4. The system of claim 1, wherein the determining of the estimate of the physical-space measurement of the user further comprises:
   determining a first image-space distance between a first pair of the locations of the points of the user's body;
   determining a scale by comparing the first image-space distance and a reference characteristic comprising the reference physical measurement; and
   scaling a second image-space distance between a second pair of locations of the points of the user's body in accordance with the determined scale, the determination of the estimate of the physical-measurement being based at least on the scaled distance.

5. The system of claim 4, wherein the operations further comprise:
   determining the estimate by performing a data lookup operation based at least on the scaled second image-space distance; and
   storing, in a database, a plurality of images of a particular product, each of the plurality of images of the particular product being associated with a different physical measurement.

6. The system of claim 1, wherein the user is a first user, wherein the operations further comprise:
   enabling a second user to access the avatar data comprising a digital representation of the first user;
   receiving input from the second user configuring the avatar data comprising the digital representation of the first user wearing a product selected by the second user; and
   presenting to the first user the avatar data comprising the digital representation of the first user wearing the product selected by the second user.

7. The system of claim I, wherein the operations further comprise:
   accessing, in response to the receiving of the request message, a third set of data indicative of locations within a second image of the user, the locations within the second image corresponding to the points of the user's body; and
   determining the estimate based further on the locations within the second image.

8. The system of claim 1, wherein the operations further comprise:
   identifying points of interest common in the first image and a second image;
   computing a physical-space distance between the points of interest in the first image;
   identifying the points of interest in the second image that are in common with the points of interest in the first image; and
   using the computed physical-space distance between the points of interest in the first image as a reference characteristic to compute a distance between the points of interest in the second image to determine the estimate of the physical space measurement of the user.

9. The system of claim 8, wherein the operations further comprise:

providing user interface data for display on the user device, the user interface data displaying interface elements indicating the determined locations within the first image, the interface elements being movable by the user.

10. A computer-implemented method to generate avatar data, the method comprising:

receiving a request message from a client device, the request message comprising a first product identifier, a view selection, and a request to determine measurements of a user;

accessing, in response to the receiving of the request message, first and second sets of data, the first set of data being indicative of locations in a first image, the locations corresponding to points of the user's body in the first image, the second set of data being indicative of a reference physical measurement of the user specified by a user input;

determining, based on the reference physical measurement of the user and a distance between two or more of the locations in the first image, an estimate of a physical space measurement of the user;

generating, based at least on the estimate of the physical space measurement, avatar data comprising a digital representation of the user;

retrieving a first product record, the first product record corresponding to the first product identifier and the first product record corresponding to model data for a first product represented by the first product record, the first product record being associated with a stored first indication that the first product record is avatar-enabled, a second product record being associated with a stored second indication that the second product is not avatar-enabled, the retrieving the first product record comprises:

selecting, based on the view selection received in the request message, product image data from a plurality of product image data associated with the first product identifier, each of the plurality of product image data being associated with a different one of a plurality of views; and retrieving the selected product image data based on the estimated physical space measurement of the user;

based on retrieving the first product record, configuring the avatar data as the digital representation of the user wearing the first product, using the retrieved product image data and according to the view selection included in the request message; and causing display of the avatar data on the client device.

11. The computer-implemented method of claim 10, wherein the estimate of the physical-space measurement of the user corresponds to at least one clothing size of the user, the method further comprising:

retrieving one or more second product records based on the request message that correspond to a product history of the user, wherein the avatar data is configured based on the one or more second product records as a representation of the user wearing the second product of the one or more second product records.

12. The computer-implemented method of claim 10, further comprising determining a scale of the first image based on the reference physical measurement of the user and a first image-space distance between a first pair of the locations, the determination of the estimate of the physical-space measurement being based further on the scale.

13. The computer-implemented method of claim 10, wherein the determining of the estimate of the physical-space measurement of the user further comprises:

determining a first image-space distance between a first pair of the locations of the points of the user's body;

determining a scale by comparing the first image-space distance and a reference characteristic comprising the reference physical measurement; and scaling a second image-space distance between a second pair of locations of the points of the user's body in accordance with the determined scale, the determination of the estimate of the physical-measurement being based at least on the scaled distance.

14. A non-transitory machine-readable storage medium embodying instructions that, when executed by a machine, cause the machine to perform operations comprising:

receiving a request message from a client device, the request message comprising a first product identifier, a view selection, and a request to determine measurements of a user;

accessing, in response to the receiving of the request message, first and second sets of data, the first set of data being indicative of locations in a first image, the locations corresponding to points of the user's body in the first image, the second set of data being indicative of a reference physical measurement of the user specified by a user input;

determining, based on the reference physical measurement of the user and a distance between two or more of the locations in the first image, an estimate of a physical space measurement of the user;

generating, based at least on the estimate of the physical space measurement, avatar data comprising a digital representation of the user;

retrieving a first product record, the first product record corresponding to the first product identifier and the first product record corresponding to model data for a first product represented by the first product record, the first product record being associated with a stored first indication that the first product record is avatar-enabled, a second product record being associated with a stored second indication that the second product is not avatar-enabled, the retrieving the first product record comprises:

selecting, based on the view selection received in the request message, product image data from a plurality of product image data associated with the first product identifier, each of the plurality of product image data being associated with a different one of a plurality of views; and retrieving the selected product image data based on the estimated physical space measurement of the user;

based on retrieving the first product record, configuring the avatar data as the digital representation of the user wearing the first product, using the retrieved product image data and according to the view selection included in the request message; and causing display of the avatar data on the client device.

15. The non-transitory machine-readable storage medium of claim 14, wherein the estimate of the physical-space measurement of the user corresponds to at least one clothing size of the user, the operations further comprising:

retrieving one or more second product records based on the request message that correspond to a product history of the user, wherein the avatar data is configured based on the one or more second product records as a representation of the user wearing the second product of the one or more second product records.

16. The non-transitory machine-readable storage medium of claim 14, wherein the operations further comprise: determining a scale of the first image based on the reference physical measurement of the user and a first image-space distance between a first pair of the locations, the determination of the estimate of the physical-space measurement being based further on the scale.

17. The non-transitory machine-readable storage medium of claim 14, wherein the determining of the estimate of the physical-space measurement of the user further comprises:
   determining a first image-space distance between a first pair of the locations of the points of the user's body;
   determining a scale by comparing the first image-space distance and a reference characteristic comprising the reference physical measurement; and
   scaling a second image-space distance between a second pair of locations of the points of the user's body in accordance with the determined scale, the determination of the estimate of the physical-measurement being based at least on the scaled distance.

\* \* \* \* \*